(12) United States Patent
Bertram et al.

(10) Patent No.: US 12,109,731 B2
(45) Date of Patent: Oct. 8, 2024

(54) FOAM-IN-BAG SYSTEMS AND COMPONENTS THEREOF

(71) Applicant: Sealed Air Corporation (US), Charlotte, NC (US)

(72) Inventors: George Bertram, Southbury, CT (US); David Carson, Mahopac, NY (US); Kenneth John Mierzejewski, Waxhaw, NC (US); Mark H. Salerno, Stratford, CT (US); Douglas Walker, Middlebury, CT (US)

(73) Assignee: Sealed Air Corporation (US), Charlotte, NC (US)

( * ) Notice: Subject to any disclaimer, the term of this patent is extended or adjusted under 35 U.S.C. 154(b) by 1086 days.

(21) Appl. No.: 16/997,463

(22) Filed: Aug. 19, 2020

(65) Prior Publication Data
US 2020/0376713 A1   Dec. 3, 2020

Related U.S. Application Data

(63) Continuation of application No. PCT/US2019/018865, filed on Feb. 21, 2019.
(Continued)

(51) Int. Cl.
*B29B 7/74* (2006.01)
*B01F 23/20* (2022.01)
(Continued)

(52) U.S. Cl.
CPC .......... *B29B 7/7631* (2013.01); *B01F 23/291* (2022.01); *B01F 23/49* (2022.01); *B01F 23/711* (2022.01); *B01F 35/187* (2022.01); *B01F 35/2113* (2022.01); *B01F 35/2115* (2022.01); *B01F 35/2144* (2022.01); *B01F 35/2209* (2022.01); *B01F 35/2215* (2022.01); *B01F 35/513* (2022.01); *B01F 35/7176* (2022.01); *B01F 35/71805* (2022.01);
(Continued)

(58) Field of Classification Search
CPC ..... B29C 44/182; B29C 66/439; B29C 65/18; B29C 65/22–224; B29C 66/91421
See application file for complete search history.

(56) References Cited

U.S. PATENT DOCUMENTS

| | | |
|---|---|---|
| 1,914,690 A | 6/1933 | Hunt |
| 4,759,475 A | 7/1988 | Munthe |

(Continued)

FOREIGN PATENT DOCUMENTS

| | | |
|---|---|---|
| WO | 2004101245 A2 | 11/2004 |
| WO | 2016019948 A2 | 2/2016 |
| WO | 2020028034 A1 | 2/2020 |

*Primary Examiner* — Carson Gross
(74) *Attorney, Agent, or Firm* — Jon M. Isaacson

(57) ABSTRACT

A longitudinal sealer includes a housing, an arm, and a heating element. The housing is configured to be installed in a foam-in-bag system. The arm is movably coupled to the housing. The heating element has a leading edge exposed through an exterior surface of the arm. A position of the arm with respect to the housing is controllable so that the arm is movable between a first location where the leading edge of the heating element is not in contact with a film in a film path of the foam-in-bag system and a second location where the leading edge of the heating element is in contact with the film in the film path of the foam-in-bag system.

20 Claims, 33 Drawing Sheets

Related U.S. Application Data

(60) Provisional application No. 62/634,262, filed on Feb. 23, 2018.

(51) Int. Cl.

| | | |
|---|---|---|
| *B01F 23/40* | (2022.01) | |
| *B01F 23/70* | (2022.01) | |
| *B01F 35/00* | (2022.01) | |
| *B01F 35/21* | (2022.01) | |
| *B01F 35/214* | (2022.01) | |
| *B01F 35/22* | (2022.01) | |
| *B01F 35/221* | (2022.01) | |
| *B01F 35/513* | (2022.01) | |
| *B01F 35/71* | (2022.01) | |
| *B01F 35/92* | (2022.01) | |
| *B29B 7/76* | (2006.01) | |
| *B29C 44/18* | (2006.01) | |
| *B29C 44/34* | (2006.01) | |
| *B29C 65/00* | (2006.01) | |
| *B29C 65/18* | (2006.01) | |
| *B67D 7/02* | (2010.01) | |
| *B67D 7/36* | (2010.01) | |
| *B67D 7/62* | (2010.01) | |
| *B67D 7/76* | (2010.01) | |
| *G01N 21/27* | (2006.01) | |
| *G01N 21/35* | (2014.01) | |
| *B01F 35/90* | (2022.01) | |
| *B01F 101/00* | (2022.01) | |
| *B67D 7/74* | (2010.01) | |

(52) U.S. Cl.
CPC ............ *B01F 35/92* (2022.01); *B29B 7/7404* (2013.01); *B29B 7/7615* (2013.01); *B29B 7/7657* (2013.01); *B29B 7/7689* (2013.01); *B29C 44/182* (2013.01); *B29C 44/3442* (2013.01); *B29C 65/18* (2013.01); *B29C 66/91421* (2013.01); *B67D 7/0294* (2013.01); *B67D 7/36* (2013.01); *B67D 7/62* (2013.01); *B67D 7/76* (2013.01); *G01N 21/272* (2013.01); *G01N 21/35* (2013.01); *B01F 2035/99* (2022.01); *B01F 2101/2204* (2022.01); *B67D 7/743* (2013.01)

(56) References Cited

U.S. PATENT DOCUMENTS

| | | |
|---|---|---|
| 4,800,708 A * | 1/1989 | Sperry ............... B29C 66/8322 53/238 |
| 4,854,109 A | 8/1989 | Pinarer et al. |
| 4,898,327 A | 2/1990 | Sperry et al. |
| 4,938,007 A | 7/1990 | Sperry |
| 4,989,760 A | 2/1991 | Songzeng |
| 5,139,151 A | 8/1992 | Chelak |
| 5,255,847 A | 10/1993 | Sperry et al. |
| 5,376,219 A | 12/1994 | Sperry et al. |
| 5,575,435 A | 11/1996 | Sperry et al. |
| 5,679,208 A | 10/1997 | Sperry et al. |
| 5,727,370 A | 3/1998 | Sperry |
| 5,862,948 A | 1/1999 | Duchon et al. |
| 5,964,378 A | 10/1999 | Sperry et al. |
| 6,003,288 A | 12/1999 | Sperry et al. |
| 6,131,375 A | 10/2000 | Sperry |
| 6,178,725 B1 | 1/2001 | Sperry et al. |
| 6,472,638 B1 | 10/2002 | Sperry et al. |
| 6,550,229 B2 | 4/2003 | Sperry et al. |
| 6,675,557 B2 | 1/2004 | Sperry et al. |
| 8,434,536 B2 * | 5/2013 | Piucci, Jr. ............ B29C 66/932 156/379 |
| 8,544,689 B2 | 10/2013 | Bertram et al. |
| 8,869,859 B2 | 10/2014 | Knaak et al. |
| 8,875,950 B2 | 11/2014 | Hayduk |
| 9,028,238 B2 | 5/2015 | Garceau et al. |
| 9,033,694 B2 | 5/2015 | Garceau et al. |
| 9,056,410 B2 | 6/2015 | Burke et al. |
| 9,102,429 B2 | 8/2015 | Corradi et al. |
| 9,138,921 B2 | 9/2015 | Cocciadiferro |
| 9,476,752 B2 | 10/2016 | Vilag et al. |
| 9,527,647 B2 | 12/2016 | Knaak et al. |
| 9,610,715 B2 | 4/2017 | Bertram et al. |
| 9,745,086 B2 | 8/2017 | Allen |
| 9,827,699 B2 | 11/2017 | Burke et al. |
| 9,827,711 B2 | 11/2017 | Wetsch et al. |
| 9,853,263 B2 | 12/2017 | Baek et al. |
| 9,957,070 B2 | 5/2018 | Allen |
| 9,977,423 B2 | 5/2018 | Wetsch et al. |
| 10,126,735 B2 | 11/2018 | Wetsch et al. |
| 10,160,177 B2 | 12/2018 | Wetsch et al. |
| 10,227,171 B2 | 3/2019 | Wetsch et al. |
| 10,266,361 B2 | 4/2019 | Bertram et al. |
| 10,329,080 B1 | 6/2019 | Weissbrod |
| 10,351,287 B2 | 7/2019 | Eberbach |
| 10,370,130 B2 | 8/2019 | Salerno et al. |
| 10,494,127 B2 | 12/2019 | Salerno et al. |
| 10,641,255 B2 | 5/2020 | Salerno |
| 2013/0047551 A1 | 2/2013 | Jones |
| 2013/0047554 A1 | 2/2013 | Bertram et al. |
| 2015/0033669 A1 | 2/2015 | Dobreski et al. |
| 2015/0291335 A1 | 10/2015 | Wetsch |
| 2015/0291336 A1 | 10/2015 | Wetsch |
| 2015/0375469 A1 | 12/2015 | Wetsch et al. |
| 2015/0378352 A1 | 12/2015 | Wetsch et al. |
| 2015/0378750 A1 | 12/2015 | Wetsch et al. |
| 2015/0379462 A1 | 12/2015 | Wetsch et al. |
| 2018/0083242 A1 | 3/2018 | Baek et al. |
| 2018/0093441 A1 | 4/2018 | Wetsch |
| 2018/0326626 A1 | 11/2018 | Gray et al. |
| 2019/0030767 A1 | 1/2019 | Vilag et al. |
| 2019/0114581 A1 | 4/2019 | Vilag et al. |
| 2019/0270607 A1 | 9/2019 | Bertram et al. |
| 2020/0115087 A1 | 4/2020 | Hagestedt et al. |

\* cited by examiner

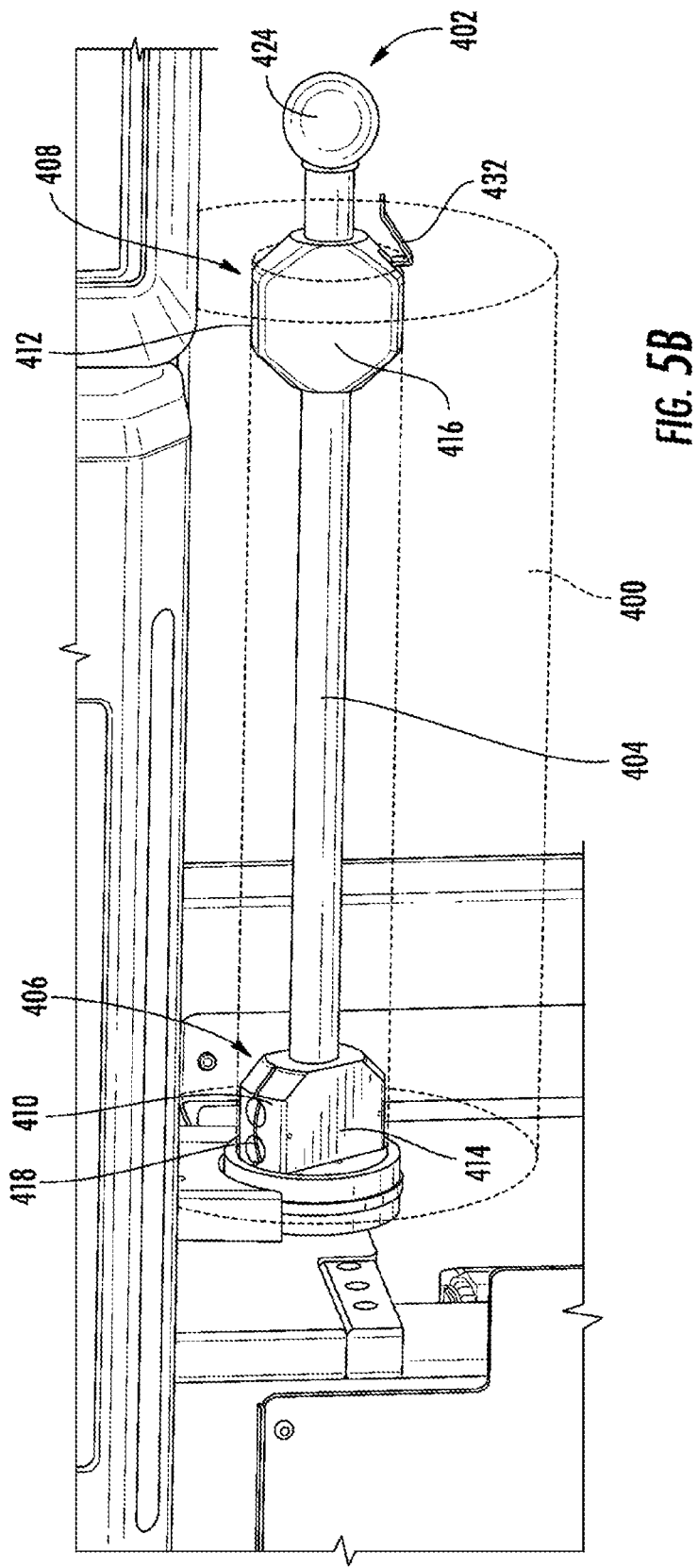

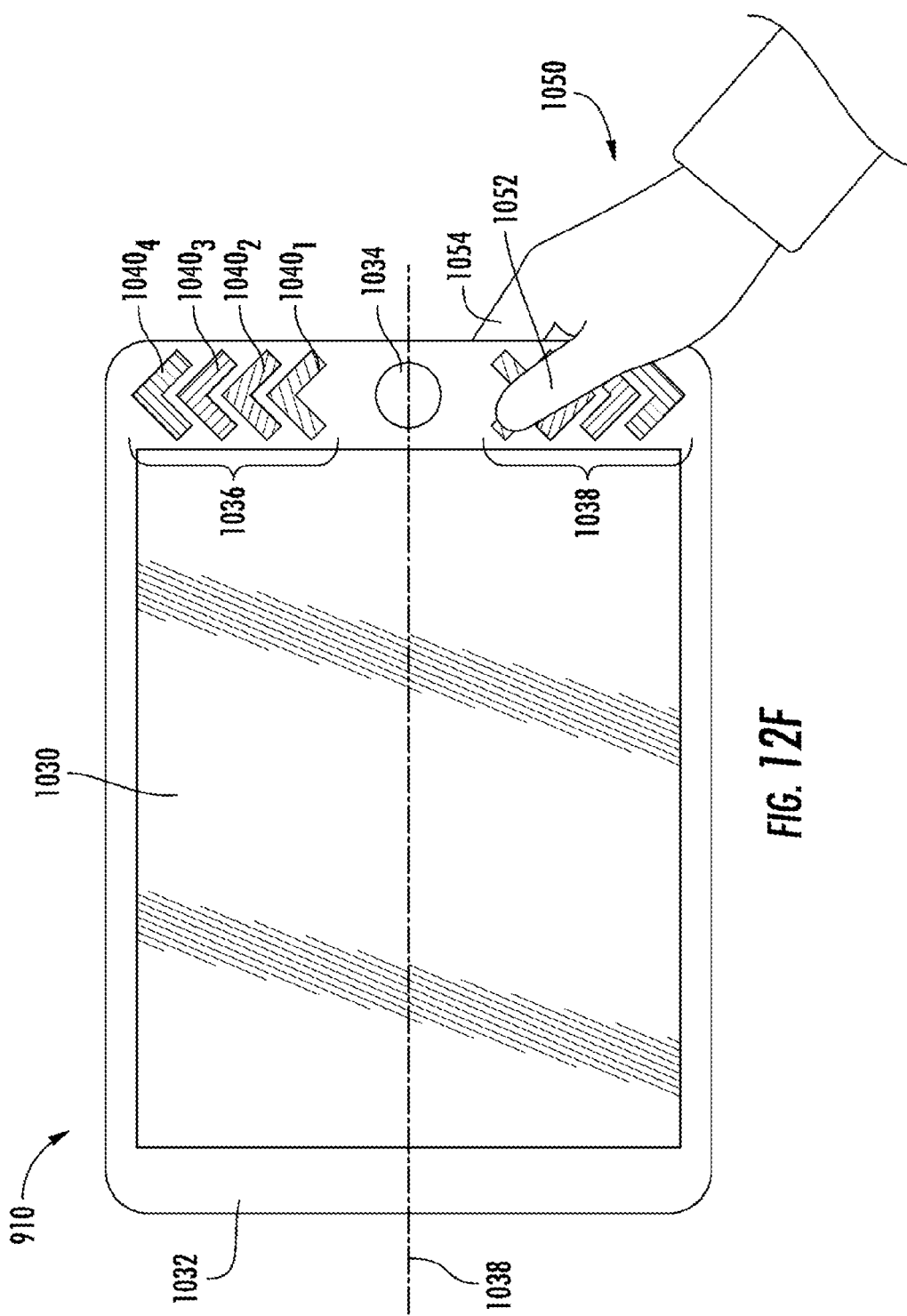

FOAM-IN-BAG SYSTEMS AND COMPONENTS THEREOF

CROSS-REFERENCE TO RELATED APPLICATIONS

The present application is a continuation of International Application No. PCT/US2019/018865, filed Feb. 21, 2019, which claims the benefit of U.S. Provisional Application No. 62/634,262, filed Feb. 23, 2018, the contents of each of which are hereby incorporated by reference in their entirety.

BACKGROUND

The present disclosure is in the technical field of foam-in-bag systems. More particularly, the present disclosure describes embodiments of foam-in-bag systems, embodiments of components of foam-in-bag systems, embodiments of functions of foam-in-bag systems, and embodiments of methods associated with foam-in-bag systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system is capable of dispensing a first chemical precursor and a second chemical precursor. The system includes a dispenser, a first feed line, a second feed line, a first transfer pump, a first metering pump, a second transfer pump, and a second metering pump. The dispenser is configured to dispense the first chemical precursor and the second chemical precursor. The first feed line is configured to feed the first chemical precursor from a source of the first chemical precursor to the dispenser. The second feed line is configured to feed the second chemical precursor from a source of the second chemical precursor to the dispenser. The first transfer pump is located on the first feed line and configured to pump the first chemical precursor through the first feed line. The first metering pump located on the first feed line downstream of the first transfer pump and configured to pump the first chemical precursor through the first feed line. The second transfer pump located on the second feed line and configured to pump the second chemical precursor through the second feed line. The second metering pump located on the second feed line downstream of the second transfer pump and configured to pump the second chemical precursor through the second feed line.

In one example, the first and second metering pumps are configured to operate based on an expected dispense amount of the first and second chemical precursor by the dispenser. In another example, the first transfer pump is configured to operate based on a pressure differential between an outlet of the first metering pump and an inlet of the first metering pump and the second transfer pump is configured to operate based on a pressure differential between an outlet of the second metering pump and an inlet of the second metering pump. In another example, the system further includes a first input pressure transducer configured to measure an inlet pressure in the first feed line upstream of the first metering pump and a first output pressure transducer configured to measure an outlet pressure in the first feed line downstream of the first metering pump, where the pressure differential between the outlet of the first metering pump and the inlet of the first metering pump is determined based on the inlet pressure measured by the first input pressure transducer and the outlet pressure measured by the first output pressure transducer. In another example, the system further includes a second input pressure transducer configured to measure an inlet pressure in the second feed line upstream of the second metering pump and a second output pressure transducer configured to measure an outlet pressure in the second feed line downstream of the second metering pump, where the pressure differential between the outlet of the second metering pump and the inlet of the second metering pump is determined based on the inlet pressure measured by the second input pressure transducer and the outlet pressure measured by the second output pressure transducer.

In another example, a first hose is located between the first transfer pump and the first metering pump, the first feed line passes through the first hose, a second hose is located between the second transfer pump and the second metering pump, and the second feed line passes through the second hose. In another example, each of the first and second hoses has a length between about 1 foot and about 100 feet.

In another example, the system further includes a first dispenser manifold located on the first feed line downstream of the first metering pump, where the first dispenser manifold includes a first input block through which the first feed line passes and the first input block includes a first heating element, and a second dispenser manifold located on the second feed line downstream of the second metering pump, where the second dispenser manifold includes a second input block through which the second feed line passes and the second input block includes a second heating element. In another example, the system further includes a first hose located between the first metering pump and the first dispenser manifold, where the first feed line passes through the first hose and the first hose includes a third heating element, and a second hose located between the second metering pump and the second dispenser manifold, where the second feed line passes through the second hose and the second hose includes a fourth heating element. In another example, the first heating element is in direct contact with the first input block, the second heating element is in direct contact with the second input block, the third heating element is in direct contact with the first chemical precursor in the first feed line, and the fourth heating element is in direct contact with the second chemical precursor in the second feed line. In another example, the system further includes a first manual shutoff valve located on the first feed line between the first dispenser manifold and the dispenser, where the first manual shutoff valve is capable of being closed to prevent flow of the first chemical precursor to the dispenser, and a second manual shutoff valve located on the second feed line between the second dispenser manifold and the dispenser, where the second manual shutoff valve is capable of being closed to prevent flow of the second chemical precursor to the dispenser.

In another example, the system further includes a first check valve located in the first feed line downstream of the first transfer pump, where the first check valve is configured to permit flow of the first chemical precursor substantially only downstream in the first feed line, and a second check valve located in the second feed line downstream of the second transfer pump, where the second check valve is configured to permit flow of the second chemical precursor substantially only downstream in the second feed line. In another example, the system further includes a first return line fluidly coupling the source of the first chemical precursor and the first feed line at a location between the first transfer pump and the first metering pump and a second return line fluidly coupling the source of the second chemical precursor and the second feed line at a location between the second transfer pump and the second metering pump. In another example, the first return line includes a first bleed valve and a first prime valve arranged in parallel on the first return line, where the first bleed valve and the first prime valve are capable of being selectively and independently opened and closed, and the second return line includes a second bleed valve and a second prime valve arranged in parallel on the second return line, where the second bleed valve and the second prime valve are capable of being selectively and independently opened and closed. In another example, the first and second bleed valves are configured to be open when the first and second bleed valves are unpowered and the first and second prime valves are configured to be closed when the first and second prime valves are unpowered. In another example, at least one of the first transfer pump, the second transfer pump, the first metering pump, and the second metering pump is a gerotor pump.

In another embodiment, a system includes a dip tube, a feed line, and a check valve. The dip tube is configured to be inserted into through an opening in a source of chemical precursor and into the chemical precursor in the source. A portion of the feed line is located in the dip tube, the feed line passes out of the dip tube, and the chemical precursor is capable of flowing out of the source through the feed line in a downstream direction. The check valve is located in the portion of the feed line in the dip tube, where the check valve is configured to permit the chemical precursor to pass substantially only in the downstream direction. The feed line is configured to be coupled to a transfer pump that is configured to draw the chemical precursor out of the source through the portion of the feed line in the dip tube.

In one example, the system further includes a filter located in the portion of the feed line in the dip tube, the filter is configured to filter debris from the chemical precursor. In another example, the filter is attached to an inside diameter of the feed line along a majority of a length of the dip tube. In another example, the system further includes a transfer pump system that includes the transfer pump, where the feed line passes through the transfer pump system. In another example, the system further includes a return line, where a portion of the return line is located in the dip tube, the feed line passes out of the dip tube to the transfer pump system, and the return line is in fluid communication with the feed line at a location downstream of the transfer pump.

In another example, the system further includes a bleed valve and a prime valve located in parallel on the return line. In another example, the bleed valve is configured to be open when the bleed valve is unpowered and the prime valve is configured to be closed when the prime valve is unpowered. In another example, the system further includes a check valve located in the feed line between the transfer pump and the location at which the return line is in fluid communication with the feed line downstream of the transfer pump. In another example, the system further includes at least one hose coupled to the dip tube and coupled to the transfer pump system, where the feed line and the return line pass through the at least one hose. In another example, the system further includes a pressure transducer configured to measure pressure in the feed line upstream of the transfer pump, where the pressure transducer is located outside of the source of the chemical precursor. In another example, the pressure transducer is located inside the transfer pump system. In another example, the pressure measurement of the pressure transducer is indicative of a level of the chemical precursor in the source of the chemical precursor. In another example, the pressure measurement of the pressure transducer is indicative of a blockage in the feed line. In another example, the pressure measurement is indicative that cavitation is possible in the feed line. In another example, the system further includes a temperature sensor configured to measure temperature in the feed line upstream of the transfer pump, where the temperature sensor is located outside of the source of the chemical precursor, and where the temperature measurement is further indicative that cavitation is possible in the feed line.

In another embodiment, a system includes a dispenser, a first feed line, a second feed line, and a plurality of heating zones. The dispenser is configured to dispense a first chemical precursor and a second chemical precursor. The first feed line is configured to permit flow of the first chemical precursor from a first source to the dispenser. The second feed line configured to permit flow of the second chemical precursor from a second source to the dispenser. The plurality of heating zones are located along the first and second feed lines, where the plurality of heating zones includes a first heating zone located around a first portion of the first feed line passes and a second heating zone located around a first portion of the second feed line. The first heating zone and the second heating zone are independently controllable to independently control temperature around the first portion of the first feed line that passes through the first heating zone and temperature around the first portion of the second feed line that passes through the second heating zone.

In one example, the plurality of heating zones includes a third heating zone located around a second portion of the first feed line and a second portion of the second feed line, where the third heating zone is controllable independently of the first and second heating zones. In another example, the second portion of the first feed line is downstream from the first portion of the first feed line and the second portion of the second feed line is downstream from the first portion of the second feed line. In another example, the dispenser is located in the third heating zone. In another example, each of the heating zones includes a heating element configured to heat at least one of the first chemical precursor, the second chemical precursor, a block through which the first feed line passes, or a block through which the second feed line passes. In another example, each of the heating zones further includes a temperature sensor configured to measure a temperature of the at least one of the first chemical precursor, the second chemical precursor, the block through which the first feed line passes, or the block through which the second feed line passes. In another example, each of the heating zones further includes a controller configured to control the heating element based on indications of the measured temperature generated by the temperature sensor. In another example, the controller is configured to control the heating element by alternating, based on the indications of the measured temperature generated by the temperature sensor, between causing the heating element to be powered and causing the heating element to be unpowered.

In another example, the system further includes a first dispenser manifold including a first input block, where the first input block is the first heating zone and the first portion of the first feed line passes through the first input block, and a second dispenser manifold including a second input block, where the second input block is the second heating zone and the first portion of the second feed line passes through the second input block. In another example, the first dispenser manifold further includes a first output block, where the first output block is in a third heating zone through which a second portion of the first feed line passes, and the second dispenser manifold further includes a second output block, where the second output block is in a fourth heating zone through which a second portion of the second feed line passes. In another example, the first input block includes a first heating element configured to heat the first input block, a first temperature sensor configured to measure a temperature of the first input block, and a first controller configured to control operation of the first heating element based on the measured temperature from the first temperature sensor. In another example, the second input block includes a second heating element configured to heat the second input block, a second temperature sensor configured to measure a temperature of the second input block, and a second controller configured to control operation of the second heating element based on the measured temperature from the second temperature sensor. In another example, the first output block includes a third heating element configured to heat the first output block, a third temperature sensor configured to measure a temperature of the first output block, and a third controller configured to control operation of the third heating element based on the measured temperature from the third temperature sensor. In another example, the second output block includes a fourth heating element configured to heat the second output block, a fourth temperature sensor configured to measure a temperature of the second output block, and a fourth controller configured to control operation of the fourth heating element based on the measured temperature from the fourth temperature sensor. In another example, the system further includes a mixing cartridge manifold in the dispenser, where a fifth heating zone is in the mixing cartridge manifold, and where a third portion of the first feed line and a third portion of the second input line pass through the fifth heating zone in the mixing cartridge manifold. In another example, the dispenser includes a fifth heating element configured to heat the mixing cartridge manifold, a fifth temperature sensor configured to measure a temperature of the mixing cartridge manifold, and a fifth controller configured to control operation of the fifth heating element based on the measured temperature from the fifth temperature sensor. In another example, the system further includes a first hose coupled to a first input of the first dispenser manifold, where a fourth portion of the first feed line passes through the first hose and where the first hose includes a sixth heating element configured to heat the first chemical precursor passing through the fourth portion of the first feed line, and a second hose coupled to a second input of the second dispenser manifold, where a fourth portion of the second feed line passes through the second hose and where the second hose includes a seventh heating element configured to heat the second chemical precursor passing through the fourth portion of the second feed line. In another example, the system further includes a sixth temperature sensor configured to measure a temperature of the first chemical precursor passing through the fourth portion of the first feed line and a sixth controller configured to control operation of the sixth heating element based on the measured temperature from the sixth temperature sensor. In another example, the first output block further includes a secondary line configure to permit flow of a cleaning solution to the dispenser and the secondary line passes through the third heating zone.

In another embodiment, a system is capable of opening and closing a mixing manifold, where the mixing manifold includes a valving rod, the mixing manifold is open when the valving rod is retracted, and the mixing manifold is closed when the valving rod is extended. The system includes a drive motor, a cam plate, and a valving rod. The drive motor is configured to selectively impart movement in a first direction and in a second direction. The cam plate is coupled to the drive motor such that the movement imparted by the drive motor in the first direction causes a linear movement of the cam plate in a third direction and movement imparted by the drive motor in the second direction causes a linear movement of the cam plate in a fourth direction. The valving rod connector is engaged with the cam plate such that linear movement of the cam plate in the third direction causes linear movement of the valving rod connector in a fifth direction and linear movement of the cam plate in the fourth direction causes linear movement of the valving rod connector in a sixth direction. The valving rod connector is configured to be coupled to the valving rod such that linear movement of the valving rod connector in the fifth direction causes the valving rod to be retracted to open the mixing manifold and linear movement of the valving rod connector in the sixth direction causes the valving rod to be extended to close the mixing manifold.

In one example, the third and fourth directions are opposite of and parallel to each other, and the fifth and sixth directions are opposite of and parallel to each other. In another example, the third and fourth directions are substantially perpendicular to the fifth and sixth directions. In another example, the first and second directions are rotational directions that are opposite of each other. In another example, the system includes the mixing manifold. In another example, the mixing manifold includes at least two inlets and a mixing chamber and the two inlets are configured to permit flow of two chemical precursors into the mixing chamber. In another example, the mixing manifold further includes an outlet configured to permit flow of the chemical precursors out of the mixing chamber. In another example, the chemical precursors are configured to begin to react to form urethane foam in response to mixing in the mixing chamber, and the flow of the chemical precursors out of the mixing chamber includes at least some of the urethane foam formed in the mixing chamber. In another example, when the mixing manifold is closed, the valving rod is extended through the mixing chamber and the outlet, and, when the mixing manifold is closed, the valving rod is retracted back from the outlet and the mixing chamber. In another example, the drive motor is configured to impart sufficient driving force when extracting or retracting the valving rod through the mixing chamber to overcome an adhesion force between the valving rod and the mixing chamber due to remnants of the urethane foam in the mixing chamber.

In another example, the system further includes a drive coupling assembly coupled to the drive motor and to the cam plate, where the drive coupling assembly is configured to convert rotational motion of the drive motor into linear motion of the cam plate. In another example, the drive coupling assembly includes (1) a drive screw coupled to a shaft of the drive motor, where the drive screw is configured to rotate in response to rotation of the shaft of the drive motor, (2) a nut configured to engage with the drive screw, where the nut is configured not to rotate when the drive screw rotates such that the nut moves linearly when the drive screw rotates, and (3) a nut extender coupled to the nut and coupled to the cam plate, where the nut extender translates linear movements of the nut to linear movements of the cam plate. In another example, the system further includes a plurality of rollers configured to support and to guide the cam plate as the cam plate moves linearly in the third and fourth directions. In another example, at least one of the rollers is a V-shaped roller, at least one surface of the cam plate is a grooved surface, and the V-shaped roller is configured to engage the grooved surface.

In another embodiment, a system is capable of holding a roll of film, where the roll includes a core with film wound around the core and the core has an inner surface. The system includes a rod, a proximal wing, and a distal wing. The rod has an outer diameter that is smaller than an inner diameter of the core. The proximal wing is located on the rod and configured to rotate about the rod. The proximal wing includes contact surfaces configured to contact diametrically-opposed locations on a proximal side of the inner surface of the core and non-contact surfaces that span between the contact surfaces of the proximal wing. The non-contact surfaces of the proximal wing are configured to not contact the core if the core has a cylindrical shape. The distal wing is located on the rod and configured to rotate about the rod. The distal wing includes contact surfaces configured to contact diametrically-opposed locations on a distal side of the inner surface of the core and non-contact surfaces that span between the contact surfaces of the distal wing. The non-contact surfaces of the distal wing are configured to not contact the core if the core has a cylindrical shape. The distal wing is capable of rotating around the rod independently of the proximal wing.

In one example, at least one of the contact surfaces of the proximal wing includes an engagement device configured to engage the inner surface of the core and to deter rotation of the core with respect to the at least one of the contact surfaces of the proximal wing. In another example, the engagement device is biased outwardly from an axis of the rod by a biasing mechanism. In another example, the proximal wing includes a pin configured to limit how far the biasing mechanisms can move the engagement device away from the axis of the rod. In another example, the proximal wing is operatively coupled to a motor configured to rotate the proximal wing about the rod. In another example, the system further includes a proximal ring clamp releasably clampable to the rod and configured to prevent the proximal wing from sliding toward a distal end of the rod and to keep the proximal wing operatively coupled to the motor. In another example, the system further includes a roll guide configured to contact a proximal end of the core and to guide the core towards axial alignment with the proximal wing as the roll is loaded onto the system from the distal end of the rod toward the proximal wing.

In another example, the system further includes a distal ring clamp releasably clampable to the rod and configured to prevent the distal wing from sliding toward a proximal end of the rod. In another example, the system further includes an end cap releasably coupled to a distal end of the rod, where the end cap is configured to prevent the distal wing from unintentionally sliding off the distal end of the rod. In another example, the system further includes a releasable clip located on one of the contact surfaces of the distal wing such that, when the roll is loaded on the system, the releasable clip is configured to contact a distal end of the roll to deter axial movement of the roll towards the distal end of the rod.

In another embodiment, a foam-in-bag system includes a spindle system, a first drive roller assembly, a second drive roller assembly, a first nip roller assembly, and a second nip roller assembly. The spindle system is capable of holding a roll of film, where the spindle system has a first wing and a second wing rotatably mounted on a rod and where the first and second wings are configured to support first and second ends of the roll of film. Each of the first and second drive roller assembly includes a driven roller mounted on a drive shaft and configured to be driven by rotation of the drive shaft. Each of the first and second nip roller assemblies includes a nip roller configured to back one of the driven rollers such that the film can pass between the driven rollers and the nip rollers and be fed when the driven rollers are driven. Transverse positions of the first wing, the first drive roller assembly, and the first nip roller assembly are configured to remain in a particular transverse location regardless of a width of the roll of film. Transverse positions of the second wing, the second drive roller assembly, and the second nip roller assembly are configured to be changed based on the width of the roll of film.

In one example, the foam-in-bag system further includes a dispenser configured to dispense chemical precursors into a bag formed from the film. In another example, the dispenser has a transverse location that is independent of the transverse positions of the second wing, the second drive roller assembly, and the second nip roller assembly. In another example, the dispenser is configured to have a transverse location based on at least one of a midway point between the first and second wings, a midway point between the first and second drive roller assemblies, or a midway point between the first and second nip roller assemblies. In another example, the foam-in-bag system further includes a sensor configured to generate an indication of a transverse position of at least one of the second wing, the second drive roller assembly, and the second nip roller assembly. In another example, the foam-in-bag system further includes a controller configured to adjust the transverse location of the dispenser based on the indication of the transverse position generated by the sensor. In another example, the foam-in-bag system further includes a controller configured to adjust an amount of the chemical precursors dispensed by the dispenser based on the indication of the transverse position generated by the sensor. In another example, a user is capable of adjusting the transverse positions of the second wing, the second drive roller assembly, and the second nip roller assembly by hand without the use of tools. In another example, the first and second nip roller assemblies are located on a front cover of the foam-in-bag system, the front cover is configured to be closed during ordinary operation and to be open during servicing of the foam-in-bag system. In another example, the second nip roller assembly includes a clamping mechanism, and the clamping mechanism is configured to be selectively clamped to the second drive roller assembly when the front cover is closed.

In another embodiment, a longitudinal sealer includes a housing configured to be installed in a foam-in-bag system, an arm movably coupled to the housing, and a heating element having a leading edge exposed through an exterior surface of the arm. A position of the arm with respect to the housing is controllable so that the arm is movable between a first location where the leading edge of the heating element is not in contact with a film in a film path of the foam-in-bag system and a second location where the leading edge of the heating element is in contact with the film in the film path of the foam-in-bag system.

In one example, a longitudinal sealer further includes a temperature sensor configured to generate one or more signals indicative of one or more temperatures of the heating element. In another example, the temperature sensor includes a first resistance temperature detector located on an exterior surface on the heating element. In another example, the temperature sensor further includes a second resistance temperature detector embedded within the heating element. In another example, when the housing is installed in the foam-in-bag system, the longitudinal sealer is configured to be communicatively coupled to a controller of the foam-in-bag system. In another example, the longitudinal sealer is configured to send the one or more signals generated by the temperature sensor to the controller, and the controller is configured to control a temperature of the heating element based on the one or more signals. In another example, the controller is configured to control the temperature of the heating element within a range of any one of 1° C., 2° C., or 5° C. of a target temperature. In another example, the controller is configured to control the position of the arm with respect to the housing. In another example, the foam-in-bag system includes an actuator configured to engage the longitudinal sealer to move the arm, and the controller is configured to control the position of the arm with respect to the housing by controlling the actuator. In another example, the actuator is configured to engage a plunger of the longitudinal sealer, and the plunger is configured to contact the arm to cause the arm to rotate in a first rotational direction. In another example, the housing further includes a biasing element configured to bias the arm in a second rotational direction opposite the first rotational direction, whereby the biasing element biases the arm in the second rotational direction unless the plunger exerts a force on the arm so that a torque on the arm by the plunger overcomes a torque on the arm by the biasing element to cause the arm to rotate in the first rotational direction.

In another example, the housing is configured to be installed in and removed from the foam-in-bag system manually without the use of tools. In another example, the housing includes a slot configured to be slid into a bracket of the foam-in-bag system. In another example, the slot includes a bore, the bracket includes a spring-loaded pin, and the bore is configured to receive a first end of the spring-loaded pin. In another example, a second end of the spring-loaded pin includes a handle configured to permit a user to grasp the spring-loaded pin and pull the first end of the spring-loaded pin out of the bore.

In another embodiment, a system is capable of cutting and sealing film. The system includes a jaw assembly and a backing jaw. The jaw assembly includes a bar having a lateral surface, a first heating element, a second heating element, and a third heating element. The first, second, and third heating elements are arranged across the lateral surface of the bar substantially parallel to each other and spaced out from each other in a longitudinal direction. The backing jaw has a lateral side. The jaw assembly and the backing jaw are arranged such that the lateral side of the jaw assembly is substantially aligned with the lateral side of the backing jaw. At least one of the jaw assembly and the backing jaw is capable of moving with respect to the other of the jaw assembly and the backing jaw so that the jaw assembly and the backing jaw are respectively positionable between a first position where the lateral side of the jaw assembly is withdrawn from the lateral side of the backing jaw and a second position where the lateral side of the jaw assembly abuts the lateral side of the backing jaw.

In one example, when a film is located between the lateral sides of the jaw assembly and the backing jaw and the jaw assembly and the backing jaw are in the second position, the first and third heating elements are configured to form transverse seals in the film and the second heating element is configured to make a transverse cut in the film. In another example, the system further includes a controller configured to control temperatures of the first and third heating elements based on one or more predetermined seal characteristics of the transverse seals formed by the first and third heating elements and to control a temperature of the second heating element based on one or more predetermined cut characteristics of the transverse cut made by the second heating element. In another example, the system further includes a movement mechanism configured to move the jaw assembly between the first and second positions. In another example, the system further includes a toggle having a first end coupled to a driving mechanism of the movement mechanism and a second end rotatably coupled to the bar of the jaw assembly. In another example, the driving mechanism is configured to cause linear motion of the first end of the toggle in a transverse direction, where the toggle is arranged such that the linear motion of the first end of the toggle in the transverse direction causes linear motion of the second end of the toggle in a lateral direction, and where the linear motion of the second end of the toggle in the lateral direction causes linear motion of the bar in the lateral direction. In another example, the system further includes the jaw assembly further includes lateral guides on either transverse side of the bar, where the lateral guides are arranged to properly guide movement of the bar in the lateral direction. In another example, the first end of the toggle includes a roller configured to move within a slot, and the slot is in a fixed position with respect to the movement mechanism.

In another example, the system further includes a low-adhesion mechanism having a low-adhesion material that is arranged to be wrapped around the lateral side of the bar. In another example, the low-adhesion mechanism further includes a first connector configured to be releasably coupled to one of a top of the bar and a bottom of the bar and a second connector configured to be releasably coupled to the other of the top of the bar and the bottom of the bar, where the low-adhesion material spans between the first and second connectors. In another example, the first connector includes a distal end configured to be secured to a protrusion and/or a groove on the one of the top of the bar and the bottom of the bar, and the second connector includes a distal end configured to be snapped on to a mating snap-in connector on the other of the top of the bar and the bottom of the bar. In another example, the low-adhesion material between the first and second connectors is a flexible material. In another example, the low-adhesion friction material is wrapped around the lateral side of the bar so that the first and third heating elements are covered by the low-adhesion friction material and the second heating element is not covered by the low-adhesion friction material. In another example, the system further includes a first set of posts configured to hold the first heating element across the lateral side of the bar, a second set of posts configured to hold the second heating element across the lateral side of the bar, and a third set of posts configured to hold the third heating element across the lateral side of the bar, where the first, second, and third sets of posts are quick-release elements that are configured to be disengaged from the bar by a user by hand without the use of tools.

In another embodiment, a method of using a foam-in-bag system to form bags of foam includes forming a bottom transverse seal near a first transverse cut in two plies of film, where the first transverse cut forms a bottom of a bag made from the film. The method further includes forming at least one longitudinal seal near at least one longitudinal side of the two plies of the film, where the at least one longitudinal seal forming at least one side of the bag. The method further includes closing pinching jaws across a transverse width of the bag and above the bottom transverse seal of the bag with the two plies of film in between the pinching jaws. The method further includes, while pinching jaws are closed, dispensing foaming chemical precursors between the two plies of the film, where the closed pinching jaws deter the dispensed foaming chemical precursors from flowing to the bottom transverse seal. The method further includes, after at least a portion of the dispensed foaming chemical precursors have reacted to form foam, opening the pinching jaws so that the film with the dispensed foaming chemical precursors inside is capable of passing through the open pinching jaws.

In one example, the method further includes, after opening the pinching jaws, feeding the film so that the portion of the film with the dispensed foaming chemical precursors passes below the open pinching jaws. In another example, the method further includes, after opening the pinching jaws, forming a top transverse seal in the two plies of film.

In another example, the method further includes making a second transverse cut in the two plies of film, the second transverse cut forming a top of the bag and separating the bag from the film. In another example, the second transverse cut also forms a bottom of a subsequent bag made from the film. In another example, the method further includes forming a bottom transverse seal near the second transverse cut; continuing forming the at least one longitudinal seal near the at least one longitudinal side of the two plies of the film, where the at least one longitudinal seal forms at least one side of the subsequent bag; closing pinching jaws across a transverse width of the subsequent bag and above the bottom transverse seal of the subsequent bag with the two plies of film in between the pinching jaws; while pinching jaws are closed, dispensing foaming chemical precursors between the two plies of the film, the closed pinching jaws deter the dispensed foaming chemical precursors from flowing to the bottom transverse seal of the subsequent bag; and, after at least a portion of the dispensed foaming chemical precursors have reacted to form foam, opening the pinching jaws so that the film with the dispensed foaming chemical precursors inside is capable of passing through the open pinching jaws. In another example, closing the pinching jaws includes closing the pinching jaws at a distance away from the bottom transverse seal based on an expected height of the bag. In another example, the distance away from the pinching jaws is approximately half of the expected height of the bag. In another example, the distance away from the pinching jaws is approximately half of the expected height of the bag less an offset. In another example, the offset is based on an amount of expected foam formed from the dispensed foaming chemical precursors before opening the pinching jaws.

In another example, a first pinching jaw of the pinching jaws has a circular cross-section, and a second pinching jaw of the pinching jaws has an L-shaped cross-section. In another example, the pinching jaws include first and second pinching jaws that are rotationally coupled to each other so that rotation of the first pinching jaw in one rotational direction causes rotation of the second pinching jaw in an opposite rotational direction. In another example, at least one of the first and second pinching jaws is operatively coupled to a motor. In another example, the method further includes controlling operation of the motor to cause the closing and the opening of the pinching jaws. In another example, at least one of the first and second pinching jaws is coupled to a biasing element, where the biasing element is arranged to bias the first and second pinching jaws to an open position when the motor is unpowered.

In another embodiment, a system is capable of detecting foaming chemical precursors in a foam-in-bag system. The foam-in-bag system configured to dispense the foaming chemical precursors between two plies of film into a bag formed from the two plies of film. The system includes a source, a detector, and a controller. The source is positioned on a first side of the two plies of film and configured to emit electromagnetic energy toward the two plies of film. At least a portion of the emitted electromagnetic energy is within a range of wavelengths. The detector is positioned on a second side of the two plies of film and arranged to detect electromagnetic energy propagating away from the two plies of film. The detector is configured to detect electromagnetic energy within the range of wavelengths and generate signals indicative of intensity of detected electromagnetic energy within the range of wavelengths. The controller is configured to receive the signals indicative of the detected electromagnetic energy within the range of wavelengths and to control operation of the foam-in-bag system based at least in part on the signals indicative of the detected electromagnetic energy within the range of wavelengths. The film is transmissive of electromagnetic energy in the range of wavelengths. At least one of the foaming chemical precursors or foam formed from a reaction of the foaming chemical precursors is opaque to electromagnetic energy in the range of wavelengths.

In one example, the range of wavelengths is within a range of infrared electromagnetic energy, the film is transmissive of electromagnetic energy in the range of infrared electromagnetic energy, and the at least one of the foaming chemical precursors or foam formed from a reaction of the foaming chemical precursors is opaque to electromagnetic energy in the range of infrared electromagnetic energy. In another example, the signals indicative of the detected electromagnetic energy within the range of wavelengths are indicative of a distance between a dispenser in the foam-in-bag system and the foam formed from a reaction of the foaming chemical precursors. In another example, the signals indicative of the detected electromagnetic energy within the range of wavelengths are indicative of a geometry of a stream of the foaming chemical precursors being dispensed by the dispenser.

In another example, the source includes a plurality of distinct sources of the electromagnetic energy. In another example, the plurality of distinct sources of the electromagnetic energy are arranged across a transverse width of the film. In another example, the detector includes a plurality of distinct detectors of the electromagnetic energy. In another example, the plurality of distinct detectors of the electromagnetic energy are arranged across a transverse width of the film. In another example, the source and the detector are located vertically between a dispenser and set of rollers configured to feed the film. In another example, the operation of the foam-in-bag system that the controller is configured to control includes one or more of causing a dispenser to stop dispensing the foaming chemical precursors or further feeding the film to increase the size of the bag.

In another embodiment, a system includes a foam-in-bag system, a user interface device, and an arm. The foam-in-bag system is configured to form bags from film and to dispense foaming chemical precursors in to the bags. The foam-in-bag system includes a controller configured to control at least a portion of operation of the foam-in-bag system. The user interface device is communicatively coupled to the controller. The user interface device is configured to receive user inputs and to send signals indicative of the user inputs to the controller. The arm is coupled to both a housing of the foam-in-bag system and to the user interface device. The arm is configured to selectively hold the user interface device in at least two different positions with respect to the foam-in-bag system. The arm is configured such that a user is capable of repositioning the user interface device between the at least two different positions by hand without the use of tools.

In one example, the arm includes a first arm segment rotatably coupled to the housing. In another example, the system further includes a first position bracket configured to engage the first arm segment when the arm is positioned to hold the user interface device in a first position of the at least two different positions and a second position bracket configured to engage the first arm segment when the arm is positioned to hold the user interface device in a second position of the at least two different positions. In another example, the first position bracket includes a first magnet configured to exert a magnetic force on the first arm segment when the arm is positioned to hold the user interface device in the first position, where the magnetic force exerted by the first magnet is arranged to bias the first arm segment toward the first position bracket when the arm is positioned to hold the user interface device in the first position. In another example, the second position bracket includes a second magnet configured to exert a magnetic force on the first arm segment when the arm is positioned to hold the user interface device in the second position, where the magnetic force exerted by the second magnet is arranged to bias the first arm segment toward the second position bracket when the arm is positioned to hold the user interface device in the second position. In another example, the system further includes a biasing mechanism configured to exert a mechanical force on the first arm segment to bias the first arm segment toward one of the first and second position brackets. In another example, the mechanical force causes the first arm segment to be rotationally biased towards the one of the first and second position brackets.

In another example, the arm further includes a second arm segment rotatably coupled to the first arm segment and rotatably coupled to the user interface device. In another example, the second arm segment includes two separate bars, each of which is rotatably coupled to the first arm segment and rotatably coupled to the user interface device and the two separate bars of the second arm segment are arranged such that rotation of the second arm segment about the first arm segment causes a rotation of the user interface device about the second arm segment. In another example, the arm further includes a latching bracket configured to selectively hold the two separate bars of the second arm segment with respect to each other. In another example, the latching bracket includes a disengagement mechanism that, when activated, is configured to permit rotation of the second arm segment with respect to the user interface device. In another example, the second arm segment is rotatably coupled to the user interface device about two axes.

In another embodiment, a system includes a base, a stem, a foam-in-bag system, a vertical counterbalance, and a motor. The base is configured to be placed on a substantially horizontal surface. The stem extends from the base, where the stem includes a movable support that extends in a substantially vertical direction. The foam-in-bag system is configured to dispense foaming chemical precursor into bag and to form seals in the bags, where at least some components of the foam-in-bag system are supported by the movable support. The vertical counterbalance is configured to exert a force between the base and the movable support to offset at least a portion of the weight of the movable support and the at least some of the components of the foam-in-bag system that are supported by the movable support. The motor is configured to selectively move the movable support vertically up and down.

In one example, at least one characteristic of the vertical counterbalance is selected based on an expected weight of the movable support and the at least some of the components of the foam-in-bag system that are supported by the movable support. In another example, the expected weight is one of an expected minimum weight of the movable support and the at least some of the components of the foam-in-bag system that are supported by the movable support, an expected maximum weight of the movable support and the at least some of the components of the foam-in-bag system that are supported by the movable support, or an expected average weight of the movable support and the at least some of the components of the foam-in-bag system that are supported by the movable support. In another example, the motor is configured to move the movable support at a rate of up to 5 inches per second (12.7 cm per second) while generating a torque within an acceptable safety range.

In another example, the components of the foam-in-bag system include a user interface device, and the user interface device is supported by the movable support. In another example, the user interface device includes a housing, the user interface device is configured to detect inputs received on the housing, and the system is configured to control operation of the motor based on detected inputs received on the housing. In another example, a front of the user interface device includes a first vertical input device and a second vertical input device, and the system is configured to control movement of the movable support based on inputs received by the first and second vertical input devices. In another example, the user interface device is positioned such that the first vertical input device is located above a horizontal center of the user interface device and the second vertical input device is located below the horizontal center of the user interface device, where the system is configured to move the movable support upward based on an input received by the first vertical input device, and where the system is configured to move the movable support downward based on an input received by the second vertical input device. In another example, the system is further configured to control an upward speed of the movable support based on a distance of the input received by the first vertical input device away from the horizontal center of the user interface device and to control a downward speed of the movable support based on a distance of the input received by the second vertical input device away from the horizontal center of the user interface device. In another example, the system is further configured to control an upward speed of the movable support based on a pressure applied by a user when inputting the input received by the first vertical input device and to control a downward speed of the movable support based on a pressure applied by a user when inputting the input received by the second vertical input device. In another example, a back of the user interface device includes a touch-sensitive area. In another example, the system is configured to cause movement of the movable support only when an input is received by one the first and second vertical input devices and the touch-sensitive area registers a touch. In another example, the touch-sensitive area is configured to register a touch based on any detected touch of the touch-sensitive area. In another example, the touch-sensitive area is configured to register a touch based on an amount of pressure being applied to the touch-sensitive area exceeding a predetermined amount of pressure. In another example, the touch-sensitive area is approximately behind the first and second vertical input devices.

In another example, the motor is configured to be selectively operated in a low-torque mode and in a high-torque mode. In another example, when the motor is operated in low-torque mode, the motor is operable to provide torque in a range that can move the movable support with assistance of the vertical counterbalance and that cannot move the movable support without assistance of the vertical counterbalance. In another example, when the motor is operated in high-torque mode, the motor is operable to provide torque in a range that can move the movable support either with or without assistance of the vertical counterbalance.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 5A and 5B depict views of an embodiment of a roll of a film web on a spindle system of a foam-in-bag system, in accordance with the embodiments described herein;

FIG. 12F depicts an embodiment of a user's hand grasping or pinching the user interface device shown in FIGS. 12D and 12E to control movement of the movable support, in accordance with the embodiments described herein;

DETAILED DESCRIPTION

Polyurethane foam may be formed by mixing foaming chemical precursors, such as an isocyanate compound with a hydroxyl-containing material, such as a polyol (i.e., a compound that contains multiple hydroxyl groups), typically in the presence of water and a catalyst. As the isocyanate and polyol foam precursors react in the presence of the catalyst to form polyurethane, the water reacts with isocyanate to produce carbon dioxide gas, which acts as a blowing or foaming agent to expand the polyurethane into a foamed cellular structure (i.e., a polyurethane foam).

With foam-in-bag packaging, the foam precursors may be mixed and dispensed into flexible plastic bags, for example, as the bags are formed from plastic film. As the precursors react to form expanding foam within the bag, the bag may be sealed closed. The bag may then be placed into a box holding an object to be cushioned. The foam tends to expand within the bag into the available space inside the box to form a custom foam cushions around the packaged object. Machines for producing foam-in-bag cushions are described, for example, in U.S. Pat. Nos. 4,800,708; 4,854, 109; 5,376,219; 5,727,370; 6,003,288; 6,550,229; and 6,675,557; each of which is incorporated herein in its entirety by reference; and such machines are available, for example, from Sealed Air Corporation under the Instapak®, SpeedyPacker Insight®, and Instapacker® trademarks.

Machines that produce foam-in-bag packaging may use a dispenser in which foam precursors enter the dispenser to mix with one another in an internal mixing chamber of the dispenser to form a foamable composition. The resultant foamable composition then exits the dispenser via a discharge outlet. See for example, U.S. Pat. Nos. 4,898,327 and 5,255,847, each of which is incorporated herein in its entirety by reference.

In some embodiments, foam-in-bag systems include sources of chemical precursors. When mixed, these chemical precursors react to form foam that expands to fill a volume that is many times greater (e.g., hundreds of times greater) than the volume of the chemical precursors themselves.

Figure 1A:
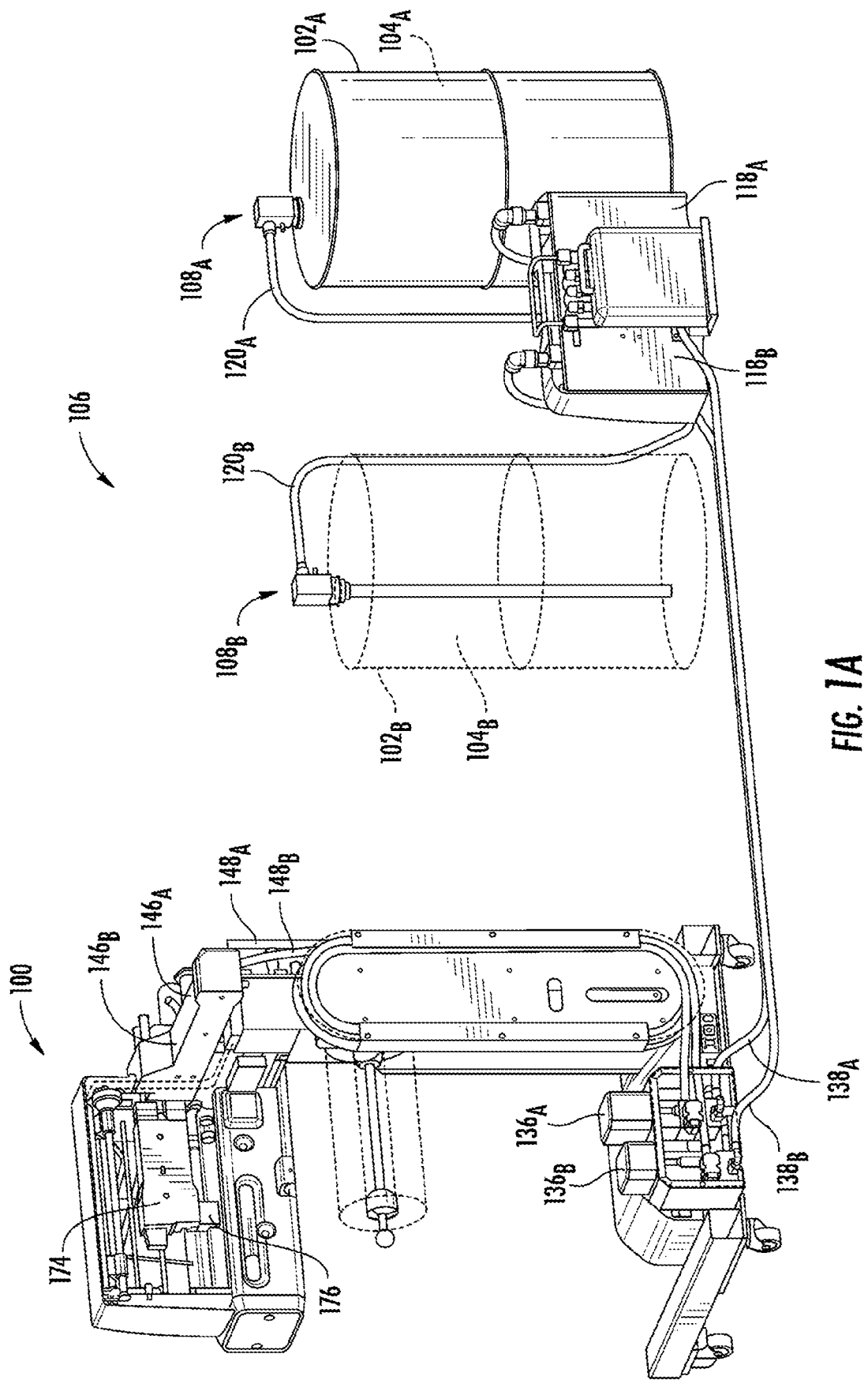
FIG. 1A depicts an embodiment of a foam-in-bag system with a first source of a first chemical precursor and a second source of a second chemical precursor, in accordance with the embodiments described herein.

Depicted in FIG. 1A is an embodiment of a foam-in-bag system 100 with a first source $102_A$ of a first chemical precursor $104_A$ and a second source $102_B$ of a second chemical precursor $104_B$. Where the figures herein show multiple instances of an item using the same reference number and a different subscript to differentiate the individual instances (e.g., the first source $102_A$ and the second source $102_B$), the items collectively will be referred to herein using only the reference number (e.g., the first and second sources 102). The first and second sources 102 hold the first and second chemical precursors 104 separately and allow the foam-in-bag system 100 to draw the first and second chemical precursors 104 for dispensing into a formed bag. In some examples, the first and second sources 102 are drums, barrels, tanks, vats, bottles, or other containers that are capable of holding the chemical precursors. In the depicted embodiment, the first and second sources 102 are in the form of metal drums. Each of the first and second sources 102 holds an amount of the first and second chemical precursors 104, respectively, and allows the foam-in-bag system 100 to draw out the first and second chemical precursors 104 over time as the foam-in-bag system 100 forms bags and dispenses small amounts of the first and second chemical precursors 104 into each bag.

Figure 1B:
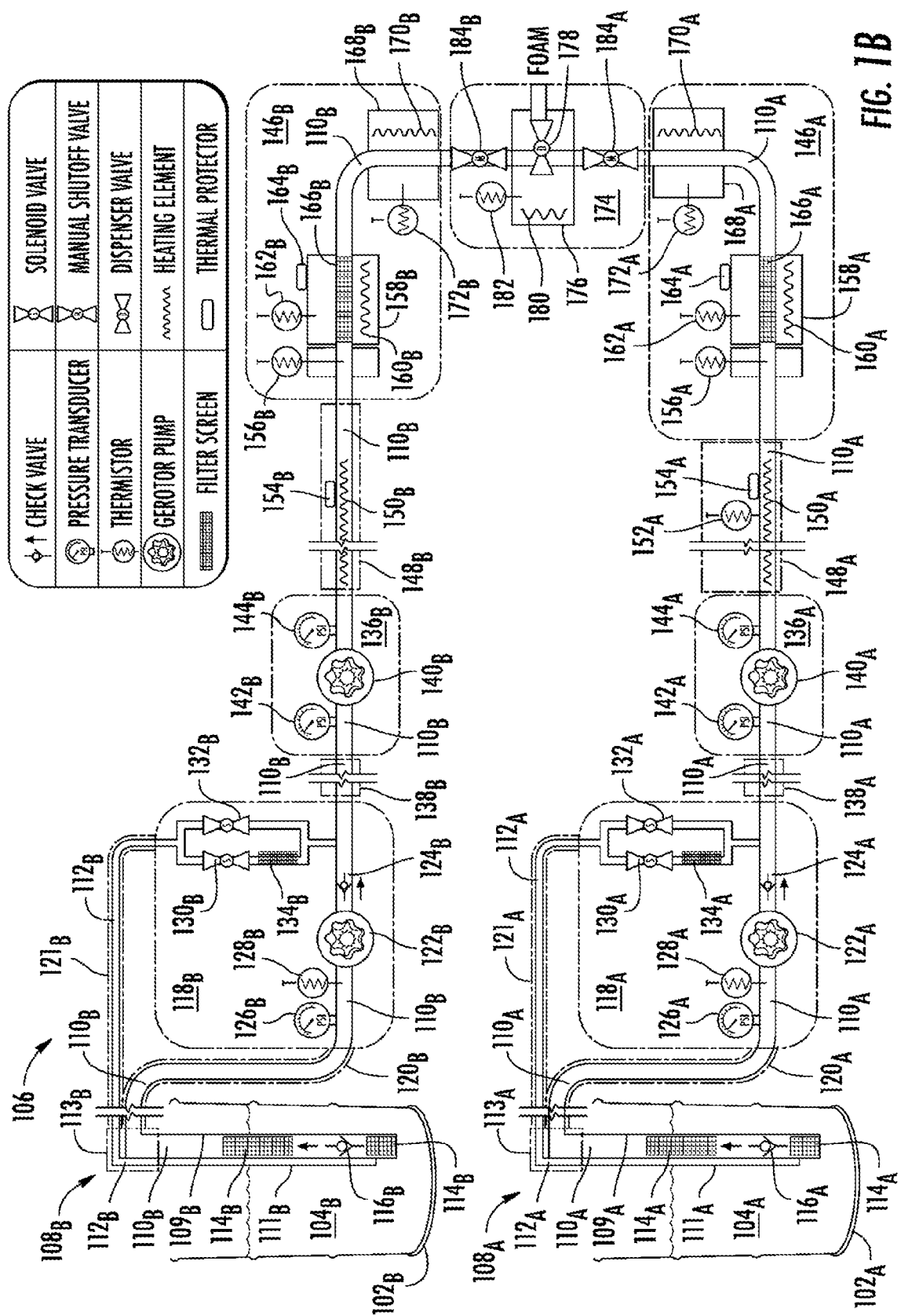
FIG. 1B depicts a schematic diagram of a pumping system for providing the first and second chemical precursors to the foam-in-bag system shown in FIG. 1A, in accordance with the embodiments described herein.

In addition to the depiction shown in FIG. 1A, a schematic diagram of a pumping system 106 for providing the first and second chemical precursors 104 to the foam-in-bag system 100 is shown in FIG. 1B. The pumping system 106 includes a first dip tube system $108_A$ capable of drawing the first chemical precursor $104_A$ out of the first source $102_A$ and a second dip tube system $108_B$ capable of drawing the second chemical precursor $104_B$ out of the second source $102_B$. In some embodiments, the first and second dip tube systems 108 have a weight that allows a user to lift each of the first and second dip tube systems 108 out of the first and second sources 102 manually and replace the first and second dip tube systems 108 into different sources of chemical precursors manually without the use of tools.

In the depicted embodiment, the first dip tube system $108_A$ includes a dip tube $109_A$ through which a feed line $110_A$ passes. The feed line $110_A$ is usable to draw the first chemical precursor $104_A$ out of the first source $102_A$. The first dip tube system $108_A$ also includes a dip tube $111_A$ through which a return line $112_A$ passes. The return line $112_A$ is usable for priming and/or pressure bleeding the feed line $110_A$. The dip tubes $109_A$ and $111_A$ are coupled to a manifold $113_A$ that is configured to remain outside of the source $102_A$. Similarly, the second dip tube system $108_B$ includes a dip tube $109_B$ through which a feed line $110_B$ passes. The feed line $110_B$ is usable to draw the second chemical precursor $104_B$ out of the second source $102_B$. The first dip tube system $108_B$ also includes a dip tube $111_B$ through which a return line $112_B$ passes. The return line $112_B$ is usable for priming and/or pressure bleeding the feed line $110_B$. The dip tubes $109_B$ and $111_B$ are coupled to a manifold $113_B$ that is configured to remain outside of the source $102_B$. In the depicted embodiment, the dip tubes $109_A$ and $111_A$ are separate dip tubes and the dip tubes $109_B$ and $111_B$ are separate dip tubes. In other embodiments, the dip tubes $109_A$ and $111_A$ can be a single dip tube through which both of the feed line $110_A$ and the return line $112_A$ pass and the dip tubes $109_B$ and $111_B$ can be a single dip tube through which both of the feed line $110_B$ and the return line $112_B$ pass.

The feed line $110_A$ includes filters $114_A$ to filter the first chemical precursor $104_A$ passing through the feed line $110_A$ and a check valve $116_A$ configured to permit the first chemical precursor $104_A$ to pass only in one direction. The feed line $110_B$ includes filters $114_B$ to filter the second chemical precursor $104_B$ passing through the feed line $110_B$ and a check valve $116_B$ configured to permit the second chemical precursor $104_B$ to pass only in one direction. In some embodiments, the check valves 116 are umbrella style one-way valves configured to prevent residual chemical from flowing back out when the dip tube systems 108 are changed from an empty container to a full container. In some embodiments, the filters 114 upstream of the check valves 116 are coarse filters configured to prevent large debris from reaching the check valves 116 and the filters 114 downstream of the check valves 116 are fine filters configured to prevent small debris from passing through the feed lines 110 with the chemical precursors 104. Various embodiments of the first and second dip tube systems 108 are described in greater detail below.

The pumping system 106 also includes a first transfer pump system $118_A$ and a second transfer pump system $118_B$. A hose $120_A$ passes between the manifold $113_A$ of the first dip tube system $108_A$ and the first transfer pump system $118_A$. The feed line $110_A$ passes through the hose $120_A$ between the manifold $113_A$ and the first transfer pump system $118_A$. A hose $121_A$ passes between the manifold $113_A$ of the first dip tube system $108_A$ and the first transfer pump system $118_A$. The return line $112_A$ passes through the hose $121_A$ between the manifold $113_A$ and the first transfer pump system $118_A$. A hose $120_B$ passes between the manifold $113_B$ of the second dip tube system $108_B$ and the second transfer pump system $118_B$. The feed line $110_B$ passes through the hose $120_B$ between the manifold $113_B$ and the second transfer pump system $118_B$. A hose $121_B$ passes between the manifold $113_B$ of the first dip tube system $108_B$ and the second transfer pump system $118_B$. The return line $112_B$ passes through the hose $121_B$ between the manifold $113_B$ and the second transfer pump system $118_B$. In the embodiment shown in FIG. 1A, the transfer pump systems 118 are located in a housing that is external to the sources 102 and external to the foam-in-bag system 100. In other embodiments, the transfer pump systems 118 can be located in the sources 102 or located in the foam-in-bag system 100. While the embodiment depicted in FIG. 1B shows the hoses 120 and 121 being separate hoses, it will be apparent that other embodiments may include a single hose that carries both the feed line $110_A$ and the return line $112_A$ between the manifold $113_A$ and the first transfer pump system $118_A$ and a single hose that carries both the feed line $110_B$ and the return line $112_B$ between the manifold $113_B$ and the second transfer pump system $118_B$.

In some embodiments, the feed lines 110, the return lines 112, and/or the hoses 120 and 121 may be transparent or semi-transparent, which allows an outside observer to see whether chemical precursors 104 are passing through the feed lines 110 and/or the return lines 112 or whether there is any gas (e.g., an air bubble) in the feed lines 110 and/or the return lines 112. In other embodiments, the feed lines 110, the return lines 112, and/or the hoses 120 and 121 may not be transparent or semi-transparent.

The first transfer pump system $118_A$ includes a transfer pump $122_A$ on the feed line $110_A$ and the second transfer pump system $118_B$ includes a transfer pump $122_B$ on the feed line $110_B$. The transfer pumps 122 may be any type of pump that is capable of drawing the chemical precursors 104 out of the sources 102. In the depicted embodiment, the transfer pumps 122 are magnetically coupled gerotor pumps. A gerotor pump is a positive displacement pump that uses inner and outer rotors with offset axes that cause dynamically-changing inner volumes to drawn in fluid and push out fluid. The magnetic couplings allow these gerotor pumps to locate and operate while minimizing or eliminating seal failures and resultant chemical leakage anywhere outside of the sources 102. In some embodiments, the gerotor pumps are configured to have an operational throughput of 1.1 cubic centimeters per revolution (cc/rev), although the transfer pumps 122 may be expected to operate at a lower throughput during normal operation due to operating conditions (e.g., back pressure in the feed lines 110, differing viscosities of the chemical precursors 104). In other embodiments, the transfer pumps 122 include one more of a piston pump, a diaphragm pump, a screw pump, a gear pump, an hydraulic pump, a peristaltic pump, or any other type of pump.

The first transfer pump system $118_A$ includes a check valve $124_A$ downstream from the transfer pump $122_A$ on the feed line $110_A$ and the second transfer pump system $118_B$ includes a check valve $124_B$ downstream from the transfer pump $122_B$ on the feed line $110_B$. In some embodiments, the check valves 124 are mounted to the outlets of the transfer pumps 122. The check valves 124 permit flow of the chemical precursors 104 substantially in only one direction in the feed lines 110 (e.g., the downstream direction). The check valves 124 also maintains the pressure in the feed lines 110 upstream of the check valves 124 without the need for the transfer pumps 122 to idle merely to maintain pressure in the feed lines 110. In some embodiments, the check valves 124 are steel ball and seat check valves configured to prevent backflow during idle to reduce wear on the transfer pumps 122. One drawback with the use of gerotor pumps is that fluid can bleed upstream through the gerotor gears when the gerotor pump is idling. Avoiding the need for the transfer pumps 122 to idle will eliminate this drawback.

The first transfer pump system $118_A$ includes a pressure transducer $126_A$ and a temperature sensor $128_A$ upstream from the transfer pump $122_A$ on the feed line $110_A$. The second transfer pump system $118_B$ includes a pressure transducer 1268 and a temperature sensor $128_B$ upstream from the transfer pump $122_B$ on the feed line $110_B$. The pressure transducers 126 are configured to provide an indication of the pressure in the feed lines 110 upstream of the check valves 124. In some embodiments, the pressure transducers 126 are configured to detect pressure within a range between −15 psi and +5 psi. The temperature sensors 128 are configured to provide an indication of the temperature of the chemical precursor 104 in the feed lines 110 upstream of the check valves 124.

The first transfer pump system $118_A$ includes a bleed valve $130_A$ and a prime valve $132_A$ arranged in parallel on the return line $112_A$, with a filter $134_A$ located on the parallel line with the bleed valve $130_A$. The second transfer pump system $118_B$ includes a bleed valve $130_B$ and a prime valve $132_B$ arranged in parallel on the return line $112_B$, with a filter $134_B$ located on the parallel line with the bleed valve $130_B$. In some embodiments, the bleed valves 130 have relatively small openings and the filters 134 decrease the likelihood of debris in the chemical precursor clogging the bleed valves 130. The bleed valves 130 and prime valves 132 can be selectively and independently opened and closed to allow the chemical precursors 104 to flow through the return lines 112 such that the chemical precursors 104 are withdrawn from the feed lines 110 at points that are downstream of the check valves 124 and returned to the sources 102. The bleed valves 130 and prime valves 132 can also be selectively and independently opened and closed to prevent flow of the chemical precursors 104 through the return lines 112. Examples of when the bleed valves 130 and prime valves 132 may be opened or closed are discussed below. In some embodiments, the bleed valves 130 have a higher pressure rating than the prime valves 132. In one example, the bleed valves 130 are rated to 850 psi (5.86 MPa) and the prime valves 132 are rated to 50 psi (345 kPa). In some embodiments, the bleed valves 130 are configured to be open when they are unpowered and the prime valves 132 are configured to be closed when they are unpowered.

The pumping system 106 also includes a first metering pump system $136_A$ and a second metering pump system $136_B$. In the depicted embodiment, the metering pump systems 136 are located in the base of the foam-in-bag system 100. In other embodiments, the metering pump systems 136 can be located elsewhere the foam-in-bag system 100 or external to the foam-in-bag system 100. A hose $138_A$ passes between the first transfer pump system $118_A$ and the first metering pump system $136_A$ and a hose $138_B$ passes between the second transfer pump system $118_B$ and the second metering pump system $136_B$. The portions of the feed lines 110 are located in the hoses 138. The hoses 138 may be a variety of different lengths, such as anywhere from 1 foot (0.3 meters) to 100 feet (30 meters) or greater than 100 feet (30 meters). Because the hoses 138 to be a variety of different lengths, the sources 102 can be placed at a number of different locations with respect to the foam-in-bag system 100 and the length of the hoses 138 can be selected so that the hoses 138 are an appropriate length for the distance between the sources 102 and the foam-in-bag system 100. In some embodiments, as the lengths of the hoses 138 are increased, the inner diameters of the feed lines 110 may be increased to minimize pressure drop over the longer length of the feed lines 110.

The first metering pump system $136_A$ includes a metering pump $140_A$ on the feed line $110_A$ and the second metering pump system $136_B$ includes a metering pump $140_B$ on the feed line $110_B$. The transfer pumps 122 may be any type of pump that is capable of pumping the chemical precursors 104 through the feed lines 110. In the depicted embodiment, the metering pumps 140 are magnetically coupled gerotor pumps. In some embodiments, the gerotor pumps are configured to have an operational throughput of 1.1 cc/rev, and the metering pumps 140 may be expected to operate at or near that operational throughput during normal operation (e.g., such as under the condition where the inlet pressure and the outlet pressure of the metering pumps 140 are the same or close to each other). In other embodiments, the metering pumps 140 include one more of a piston pump, a diaphragm pump, a screw pump, a gear pump, an hydraulic pump, a peristaltic pump, or any other type of pump.

The first metering pump system $136_A$ includes an input pressure transducer $142_A$ and an outlet pressure transducer $144_A$. The input pressure transducers 142 are located upstream of the metering pumps 140 on the feed lines 110 and the outlet pressure transducers 144 are located downstream of the metering pumps 140. In some embodiments, the input pressure transducers 142 are coupled to an input of the metering pumps 140 and the outlet pressure transducers 144 are coupled to an output of the metering pumps 140. In some embodiments, the input and output pressure transducers 142 and 144 are configured to detect pressure within a range between 0 psi and 1000 psi.

In some embodiments, the operation of the metering pumps 140 are controlled in order to minimize the pressure differential between the pressure at the input pressure transducers 142 and the pressure at the outlet pressure transducers 144. In other words, in some embodiments, the operation of the metering pump $140_A$ is controlled in order to minimize the pressure differential between the pressure at the input pressure transducer $142_A$ and the pressure at the outlet pressure transducer $144_A$. Similarly, in some embodiments, the operation of the metering pump $140_B$ is controlled in order to minimize the pressure differential between the pressure at the input pressure transducer $142_B$ and the pressure at the outlet pressure transducer $144_B$.

The pumping system 106 also includes a first dispenser manifold $146_A$ and a second dispenser manifold $146_B$. A hose $148_A$ passes between the first metering pump system $136_A$ and the first dispenser manifold $146_A$ and a hose $148_B$ passes between the second metering pump system $136_B$ and the second dispenser manifold $146_B$. In the depicted embodiment, the hose $148_A$ includes a heating element $150_A$, a temperature sensor $152_A$, and a thermal protector $154_A$. In the depicted embodiment, the hose $148_B$ includes a heating element $150_B$ and a thermal protector $154_B$. The heating elements 150 are configured to be in direct contact with and heat the chemical precursor 104 in the feed line 110. In the case of hose $148_A$, the indications of temperature generated by the temperature sensor $152_A$ may be used to control the heating element $150_A$ and/or the heating element $150_B$ to cause one or both of the chemical precursors 104 to be heated to a particular temperature or to be within a particular temperature range. In some embodiments, each of the heating elements 150 is a heater wire that is directly in contact with the chemical precursors 104 in the feed lines 110. In some cases, the heater wire is rated to 25 ohms, line voltage (e.g., 208 VAC), and/or 1750 watts. The thermal protectors 154 are configured to generate a signal indicative of an overheating condition, which may be used to stop operation of some or all of the pumping system 106.

The first dispenser manifold $146_A$ includes an input temperature sensor $156_A$ configured to be in contact with and determine a temperature of the first chemical precursor $104_A$ as it is received in the first dispenser manifold $146_A$ from the hose $148_A$. The first dispenser manifold $146_A$ also includes an input block $158_A$ (e.g., an aluminum block) through which the feed line $110_A$ passes. The input block $158_A$ includes a heating element $160_A$ configured to heat the input block $158_A$, a temperature sensor $162_A$ configured to determine a temperature of the input block $158_A$, and a thermal protector $164_A$ configured to generate a signal indicative of an overheating condition of the input block $158_A$. The first dispenser manifold $146_A$ also includes a filter $166_A$ configured to filter the first chemical precursor $104_A$ in the portion of the feed line $110_A$ that passes through the input block $158_A$. The first dispenser manifold $146_A$ also includes an output block $168_A$ (e.g., an aluminum block) through which the feed line $110_A$ passes. The output block $168_A$ includes a heating element $170_A$ configured to heat the output block $168_A$ and a temperature sensor $172_A$ configured to determine a temperature of the input block $168_A$. Signals generated by any or all of the temperature sensors $156_A$, $162_A$, and $172_A$ may be used to control operation of one or both of the heating elements $160_A$ and $170_A$.

The second dispenser manifold $146_B$ includes an input temperature sensor $156_B$ configured to be in contact with and determine a temperature of the second chemical precursor $104_B$ as it is received in the second dispenser manifold $146_B$ from the hose $148_B$. The second dispenser manifold $146_B$ also includes an input block $158_B$ (e.g., an aluminum block) through which the feed line $110_B$ passes. The input block $158_B$ includes a heating element $160_B$ configured to heat the input block $158_B$, a temperature sensor $162_B$ configured to determine a temperature of the input block $158_B$, and a thermal protector $164_B$ configured to generate a signal indicative of an overheating condition of the input block $158_B$. The second dispenser manifold $146_B$ also includes a filter $166_B$ configured to filter the second chemical precursor $104_B$ in the portion of the feed line $110_B$ that passes through the input block $158_B$. The second dispenser manifold $146_B$ also includes an output block $168_B$ (e.g., an aluminum block) through which the feed line $110_B$ passes. The output block $168_B$ includes a heating element $170_B$ configured to heat the output block $168_B$ and a temperature sensor $172_B$ configured to determine a temperature of the input block $168_B$. Signals generated by any or all of the temperature sensors $156_B$, $162_B$, and $172_B$ may be used to control operation of one or both of the heating elements $160_B$ and $170_B$.

In some embodiments, the heating elements 160 are configured to heat the input blocks 158. In some cases, the heating elements 160 are cartridge style heaters that are in direct contact with the input blocks 158 but not in direct contact with the chemical precursors 104 passing through the feed lines 110. In some examples, the heating elements 160 are cartridge style heaters rated to 500 watts. In some embodiments, the heating elements 170 are configured to heat the output blocks 168. In some cases, the heating elements 170 are cartridge style heaters that are in direct contact with the output blocks 168 but not in direct contact with the chemical precursors 104 passing through the feed lines 110. In some examples, the heating elements 170 are cartridge style heaters rated to 150 watts.

The feed lines 110 pass from the dispenser manifolds 146 into a dispenser 174. The dispenser 174 includes a mixing cartridge manifold 176 that dispenses the first and second chemical precursors $104_A$ and $104_B$ into formed bags. The mixing cartridge manifold 176 includes a mixing cartridge 178 configured to be selectively controlled to dispense specific amounts of the first and second chemical precursors $104_A$ and $104_B$ into formed bags. In some embodiments, the mixing cartridge 178 is driven by a motor (e.g., a servo motor) to provide control of the ratio of dispensing of the first chemical precursor $104_A$ and the second chemical precursor $104_B$. This also allows the motor controls to be closely synchronized with the opening and closing of the mixing cartridge 178. The mixing cartridge manifold 176 includes a heating element 180 configured to heat the mixing cartridge manifold 176 and a temperature sensor 182 configured to determine a temperature of the mixing cartridge manifold 176. Signals generated the temperature sensor 182 may be used to control operation of the heating element 180. In some embodiments, the heating element 180 is configured to heat the mixing cartridge manifold 176. In some cases, the heating element 180 is a cartridge style heater that is in direct contact with the mixing cartridge manifold 176 but not in direct contact with the chemical precursors 104. In some examples, the heating element 180 is a cartridge style heater rated to 80 watts. In some embodiments, the mixing cartridge 178 has relatively small orifices to control the amount of the chemical precursors 104 being dispensed. In order to avoid clogging the mixing cartridge 178, the filters 166 in the dispenser manifolds 146 can be fine filters to filter out small debris in the feed lines 110 before the chemical precursors 104 reach the mixing cartridge 178.

The dispenser 174 also includes a manual shutoff valve 184A on the feed line $110_A$ before the first chemical precursor $104_A$ reaches the mixing cartridge manifold 176 and a manual shutoff valve $184_B$ on the feed line $110_B$ before the second chemical precursor $104_B$ reaches the mixing cartridge manifold 176. The manual shutoff valves 184 can be closed manually by a user before the mixing cartridge manifold 176 and/or the mixing cartridge 178 is removed, such as for replacement of the mixing cartridge manifold 176 and/or the mixing cartridge 178 or cleaning of the mixing cartridge manifold 176 and/or the mixing cartridge 178. The ability to manually close the manual shutoff valves 184 allows a user to ensure that the chemical precursors 104 do not leak when the mixing cartridge manifold 176 and/or the mixing cartridge 178 is removed. In some embodiments, the manual shutoff valves 184 are ball valves.

During normal operation of the foam-in-bag system 100, the foam-in-bag system 100 will form bags, dispense chemical precursors into each formed bag, and then seal the bag after the chemical precursors have been dispensed. The chemical precursors then foam up inside the sealed bag. In this operation, the mixing cartridge 178 will dispense the chemical precursors intermittently. The mixing cartridge 178 dispenses an amount of the chemical precursors (also called a "shot" of the chemical precursors) into each bag. The foam-in-bag system 100 requires time to seal the bag into which the shot has been dispensed and time to form the next bag before the next shot of chemical precursors is dispensed by the mixing cartridge 178.

In some embodiments, components of the pumping system 106 are controlled to cause the chemical precursors 104 to flow at specific flow rates in the feed lines 110 and/or to cause specific amounts of chemical precursors 104 to be dispensed by the mixing cartridge 178. For example, during a shot of the chemical precursors, the metering pumps 140 are driven at a target speed (e.g., a target rotation per minute), determined by a desired flow rate of the chemical precursors 104 and a desired ratio of the chemical precursors 104. In some embodiments, the metering pumps 140 are accelerated to a set speed in as short a time as is feasible and then held at the set speed for a time of the duration of the shot as precisely as feasible. In some embodiments, the transfer pumps 122 are also driven in order to minimize or eliminate the pressure differential between the input and output of the metering pumps 140. For example, the speed of the transfer pumps 122 can be controlled to minimize or eliminate the difference between the signals generated by the respective set of input pressure transducers 142 and the outlet pressure transducers 144. Under many conditions, this control of the transfer pumps 122 will cause the speed of the transfer pumps 122 to be higher than the speed of the metering pumps 140.

As can be seen in FIG. 1B, the depicted embodiment of the pumping system 106 includes four pumps: the two transfer pumps 122 and the two metering pumps 140. While it is possible to pump the first and second chemical precursors from the sources 102 to the dispenser 174 using two pumps only (i.e., one pump for the first chemical precursor $104_A$ and one pump for the second chemical precursor $104_B$), the four-pump pumping system 106 provide increased precision and control of flow rate of the chemical precursors 104 and the timing of the flow of the chemical precursors 104. In some embodiments, it is desirable for the chemical precursors 104 to begin flowing out of the dispenser as soon as possible after the mixing cartridge 178 is opened. This may require a high rate of acceleration by the pumping system. The combination of metering pumps 140 to meet the acceleration demands of the dispenser and the transfer pumps 122 to provide appropriate flow rates out of the sources 102 make this high rate of acceleration possible. In some embodiments, the transfer pumps 122 and the metering pumps 140 are servo motors (e.g., gerotors) in order to meet the speed and control demands of the pumping system 106.

As noted above, the bleed valves 130 and the prime valves 132 in the transfer pump systems 118 can be selectively and independently opened and closed to allow the chemical precursors 104 to flow through the return lines 112 such that the chemical precursors 104 are withdrawn from the feed lines 110 at points that are downstream of the check valves 124 and returned to the sources 102. For example, the bleed valves 130 can be opened to allow chemical precursors 104 to pass from the feed lines 110 into the return lines 112. This may be used to prevent pressure build up in the return lines 112 downstream of the check valves 124. In some example, the bleed valves 130 is opened (either manually or automatically) to control the pressure within a predetermined pressure range at or near a pressure that is in the feed lines 110 downstream of the transfer pumps 122. In some cases, the pressure in the feed lines increases due to thermal expansion when the chemical precursors 104 are heated in the feed lines 110. In other cases, the prime valves 132 can be opened to allow chemical precursors 104 and/or gas (e.g., air) to pass from the feed lines 110 into the return lines 112. This may be helpful when priming the pumping system 106 after the dip tube systems 108 are changed from one container (e.g., an empty drum) to another container (e.g., a full drum).

In some embodiments, the transfer pumps 122 can be drum pumps. In these embodiments, the prime valves 132 and their associated controls may be omitted from the pumping system 106. In these embodiments, a bleed valves 130 may still be used. If the bleed valves 130 were located on the manifolds of the transfer pump systems 118, then the return lines 112 may be omitted from the pumping system 106.

The pumping system 106 has a number of benefits. In one example, the pumping system 106 provides reliable control of flow rates and ratios of the chemical precursors 104 when dispensing any type of shots. The control of the ratios and flow rates of the chemical precursors 104 allows for the resultant foam to have substantially the same quality under a variety of conditions of the shots being dispensed. For example, the foam quality at the very beginning of a shot will be the same as it is at the end of the shot. In another example, there is no lead or lag on the pressure or flow of the chemical precursors 104. In another example, when flow rates of the chemical precursors 104 are well regulated, the amount of the chemical precursors 104 dispensed into bags and the amount of the resultant foam in the bags is better controlled. In another example, the dip tube systems 108 can be simply removed from one source (e.g., drum) when the source is empty and inserted into another source that is full without the need for extensive manual work by a user because the pumping system 106 can automatically prime the dip tube systems 108 after they are inserted into new containers.

In practical benefits, the controls in the pumping system 106 can result in cost savings for an operator of the foam-in-bag system 100. For example, when an improper ratio of the first and second chemical precursors $104_A$ and $104_B$ are dispensed into a bag, some amount of one of the first and second chemical precursors $104_A$ and $104_B$ will not react in the bag. This results in the unused amounts of the chemical precursors 104 that add cost to each bag without adding any value. In another example, the use of two pumps on each of the feed lines 110 (i.e., one of the transfer pumps 122 and one of the metering pumps 140) reduces the overall wear that would be incurred if only one pump was used on the each of the feed lines 110. This reduced wear is especially the case if one or both of the chemical precursors 104 is a non-lubricating chemical precursor. Reduced wear on the pumps means fewer maintenance needs, less downtime for maintenance, lower maintenance costs, greater metering accuracy by the pumps, longer peak efficiency of the pumping system 106, and more efficient use of the chemical precursors 104 by the pumping system 106.

Another benefit of the pumping system 106 is the ability to monitor the condition of the four pumps in the pumping system 106. In typical operation, the transfer pumps 122 are expected to operate at a higher rate (e.g., higher revolutions per minute (RPM)) than the metering pumps 140. When the transfer pumps 122 are new, they are more efficient, and will run at a lower rate. However, as the transfer pumps 122 starts to wear, they will turn at higher rates to keep up. Thus, the condition of the transfer pumps 122 can be monitored by comparing the rates of the transfer pumps 122 with the rates of the metering pumps 140. If the differential in rates of the transfer pumps 122 and the metering pumps 140 exceeds a certain level, a signal may be generated to clean or change the transfer pumps 122.

Figure 2A:
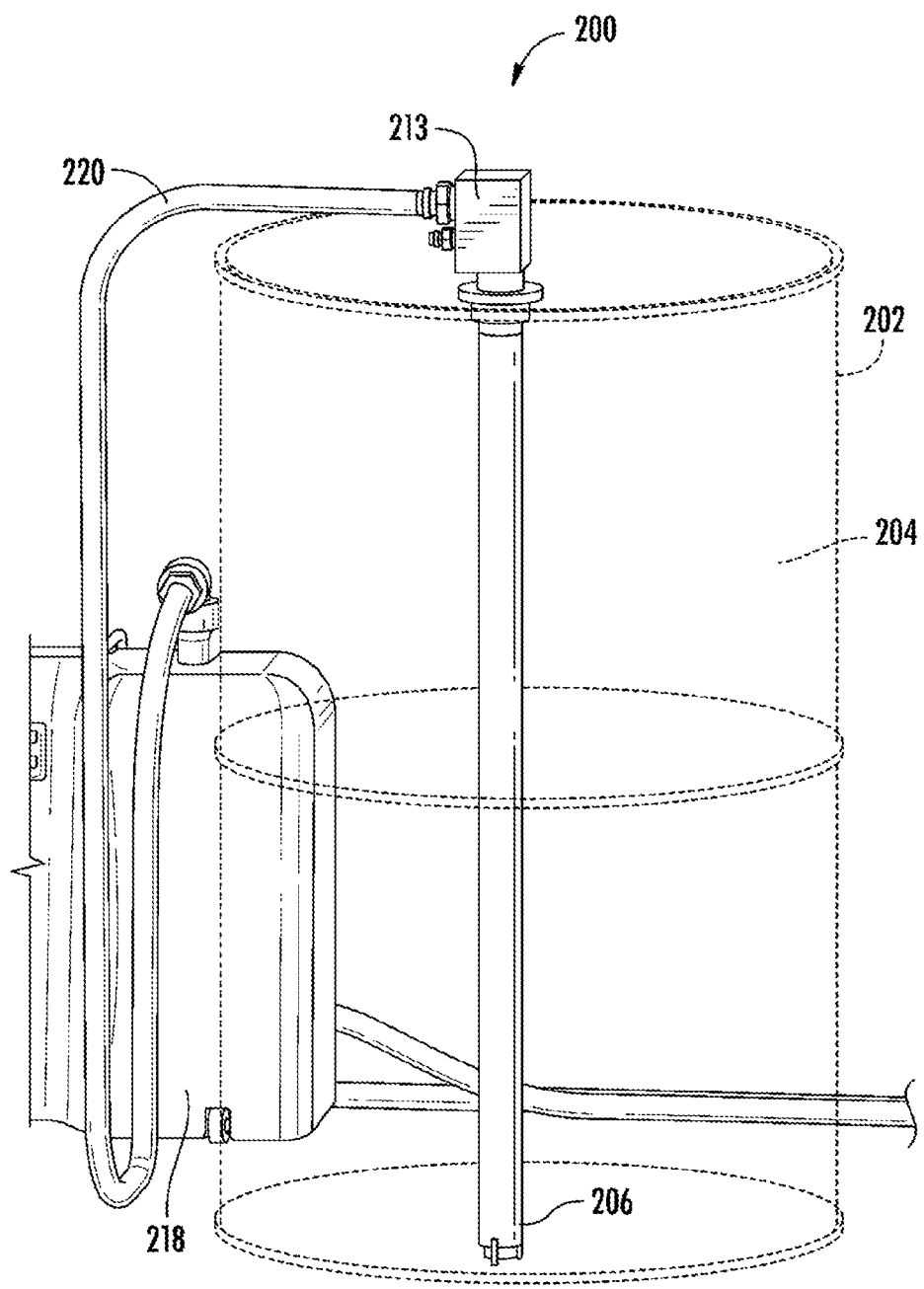
FIG. 2A depicts an embodiment of a dip tube system that can be used as either of the dip tube systems depicted in FIGS. 1A and 1B, in accordance with the embodiments described herein.

Depicted in FIG. 2A is an embodiment of a dip tube system 200 that can be used as either of the dip tube systems 108 depicted in FIGS. 1A and 1B. The dip tube system 200 is shown in FIG. 2A having been inserted into a source 202 of chemical precursor 204. The dip tube system 200 includes a dip tube 209 configured to be inserted through an opening in the source 202 into the chemical precursor 204 in the source 202. The dip tube system 200 also includes a manifold 213 that is coupled to the dip tube 209 and remains outside of the source 202. The dip tube system 200 is capable of being used to siphon the chemical precursor 204 out of the source 202.

Figure 2B:
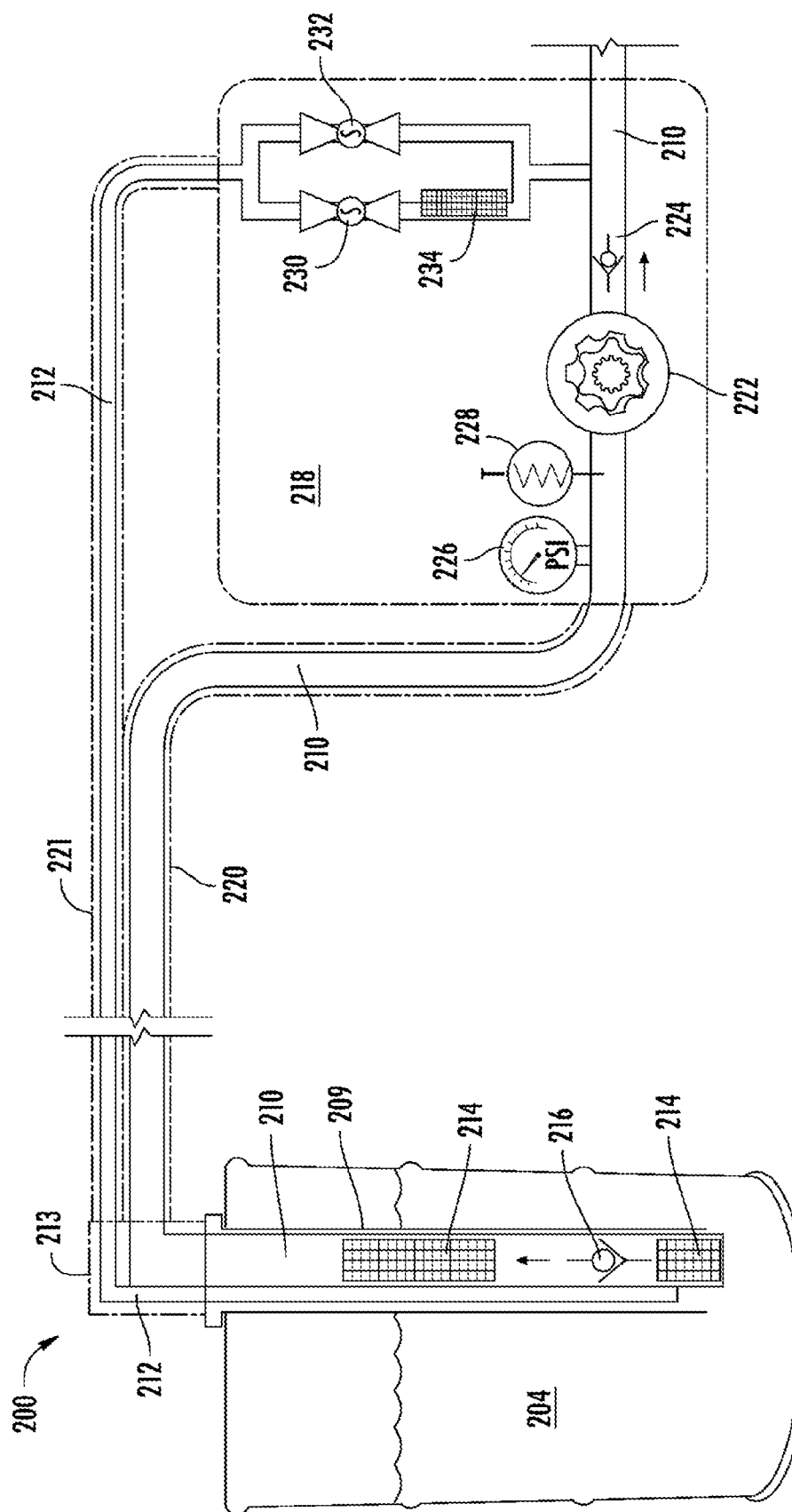
FIG. 2B depicts a schematic diagram of the dip tube system shown in FIG. 2A, in accordance with the embodiments described herein.

Also depicted in FIG. 2A is a transfer pump system 218 that is coupled to the manifold 213 of the dip tube system 200 via a hose 220. The dip tube system 200, the source 202 of the chemical precursor 204, the transfer pump system 218, and the hose 220 are all depicted in a schematic diagram in FIG. 2B. As depicted in FIG. 2B, the transfer pump system 218 can also be coupled to the manifold 213 of the dip tube system 200 via a hose 221, although the hose 221 is not depicted in FIG. 2A.

A feed line 210 usable to draw the chemical precursor 204 out of the source 202 and a return line 212 usable for priming and/or pressure bleeding the feed line 210. The feed line 210 and the return line 212 pass through the dip tube 209 and the manifold 213 of the dip tube system 200, through the hoses 220 and 221, respectively, and through the transfer pump system 218. In the depicted embodiments, the feed line 210 includes filters 214 to filter the chemical precursor 204 passing through the feed line 210 and a check valve 216 configured to permit the chemical precursor 204 to pass substantially only in the downstream direction. In some embodiments, the check valve 216 is an umbrella style one-way valve configured to prevent residual chemical precursor 204 from flowing back out when the dip tube system 200 is changed from an empty container to a full container. In some embodiments, the filter 214 upstream of the check valve 216 is a coarse filter configured to prevent large debris from reaching the check valves 116 and the filter 214 downstream of the check valve 216 is a fine filter configured to prevent small debris from passing through the feed lines 210 with the chemical precursor 204.

The transfer pump system 218 includes a transfer pump 222 on the feed line 210. The transfer pump 222 may be any type of pump that is capable of drawing the chemical precursor 204 out of the source 202. In the depicted embodiment, the transfer pump 222 is a gerotor pump. In some embodiments, the gerotor pump is configured to have an operational throughput of 1.1 cubic centimeters per revolution (cc/rev). In other embodiments, the transfer pump 222 includes one or more of a piston pump, a diaphragm pump, a screw pump, a gear pump, an hydraulic pump, a peristaltic pump, or any other type of pump.

The transfer pump system 218 includes a check valve 224 downstream from the transfer pump 222 on the feed line 210. In some embodiments, the check valve 224 is mounted to the outlet of the transfer pump 222. The check valve 224 permits flow of the chemical precursor 204 in substantially only the downstream direction in the feed line 210. The check valve 224 also monitor the pressure in the feed line 210 upstream of the check valve 224. In some embodiments, the check valve 224 is a steel ball and seat check valve configured to prevent backflow during idle to reduce wear on the transfer pump 222.

The transfer pump system 218 includes a pressure transducer 226 and a temperature sensor 228 upstream from the transfer pump 222 on the feed line 210. The pressure transducer 226 is configured to provide an indication of the pressure in the feed line 210 upstream of the check valve 224. In some embodiments, the pressure transducer 226 is configured to detect pressure within a range between −15 psi and +5 psi. The temperature sensor 228 is configured to provide an indication of the temperature of the chemical precursor 204 in the feed line 210 upstream of the check valve 224.

The transfer pump system 218 includes a bleed valve 230 and a prime valve 232 arranged in parallel on the return line 212, with a filter 234 located on the parallel line with the bleed valve 230. In some embodiments, the bleed valve 230 has a relatively small opening and the filter 234 decreases the likelihood of debris in the chemical precursor 204 clogging the bleed valve 230. The bleed valve 230 and the prime valve 232 can be selectively and independently opened and closed to allow the chemical precursor 204 to flow through the return line 212 such that the chemical precursor 204 is withdrawn from the feed line 210 at a point that is downstream of the check valve 224 and returned to the source 202. In some embodiments, the bleed valve 230 opens a higher pressure than the prime valve 232. In one example, the bleed valve 230 is configured to open at 850 psi (5.86 MPa) and the prime valve 232 is configured to open at 50 psi (345 kPa). In some embodiments, the bleed valve 230 is configured to be open when it is unpowered and the prime valve 232 is configured to be closed when it is unpowered.

There are a number of benefits attained by using the dip tube system 200 with the transfer pump system 218 depicted in FIGS. 2A and 2B. For example, the use of the parallel bleed and prime valves 230 and 232 on the return line 212 facilitates priming of the dip tube system 200 to clear the feed line 210 of gas (e.g., air). From a user's perspective, the user can merely insert the dip tube system 200 into a source of chemical precursor, and the transfer pump system 218 can prime the dip tube system 200 automatically without any further user work. In another example, the use of the parallel bleed and prime valves 230 and 232 on the return line 212 facilitates pressure relief within the feed line 210 during idle, which improve foam quality and consistency when a shot of the chemical precursor 204 is dispensed with another chemical precursor. In another example, when the bleed valve 230 is configured to be open when it is unpowered, the bleed valve 230 will open when the transfer pump system 218 is turned off to automatically bring the pressure in the feed line 210 to zero when the transfer pump system 218 is turned off. Having zero pressure in the feed line 210 when the transfer pump system 218 is turned off enhances safety of the system.

Another benefit to the dip tube system 200 depicted in FIGS. 2A and 2B is the ability to place the filters 214 inside the portion of the feed line 210 in the dip tube 209. In some embodiments, one or more of the filters 214 is a long, fine mesh screen filter attached to the inside diameter of the feed line 210. This arrangement allows for the filter to have a very large surface area. In some embodiments, the filters 214 can be located along a majority of the length of the dip tube 209. This may allow for the filters 114 to be large enough to be usable for the entire expected life of the dip tube system 200 without any maintenance. The ability to avoid maintenance of the filters 214 can be extremely beneficial in the case where the chemical precursor 204 is hazardous or otherwise dangerous. In addition, some types of chemical precursors will form crystals on the surface of the filters 214 if the filters are exposed to air, and the ability to keep the filters 214 substantially submerged in the chemical precursor 204. These crystals are potentially harmful to the feed line 210, a downstream dispenser (e.g., dispenser 174), or other parts of a pumping system (e.g., pumping system 106), and keeping the filters 214 substantially submerged in the chemical precursor 204 deters the formation of these crystals.

In another example, the pressure transducer 226 in the feed line 210 upstream of the transfer pump 222 provides a number of benefits. In one example, the pressure measurement by the pressure transducer 226 can be used to calculate a liquid level of the chemical precursor 204 in the source 202. The calculation of the liquid level can be made when the chemical precursor 204 is not flowing based on principles of hydrostatic pressure in a non-moving fluid using the height of the pressure transducer 226 and the measured pressure in the feed line 210. This alleviates the need for any kind of a liquid level sensor in the source 202 (e.g., a float inside the source 202, an optical sensor in the source 202, etc.). Because the pressure transducer 226 is not inside the source 202, when the dip tube system 200 is changed over from an empty source to a full source, there is no sensor to move dip tube system 200 and/or clean when the dip tube system 200 is moved. In addition, a controller (not shown), such as a computing device, communicatively coupled to the pressure transducer can calculate the liquid level of the chemical precursor 204 in the source 202 automatically. The controller can issue one or more signals to a user when the calculated liquid level reaches particular levels so the user knows to order a new source of the chemical precursor 204 when the liquid level reaches a low level, to replace the source 202 with a new source when the liquid level reaches an empty level, or to perform any other action based on the calculated liquid level. In this way, the source 202 does not need to be transparent or semi-transparent for the user to know how much of the chemical precursor 204 remains in the source 202.

In another example, the pressure measurement by the pressure transducer 226 can be used to detect clogs in the feed line 210 upstream of the transfer pump 222. If the feed line 210 becomes clogged anywhere between the bottom of the dip tube 209 and the pressure transducer 226, the flow of the chemical precursor 104 through the feed line 210 would cease and the pressure between the blockage and the transfer pump 222 would decrease. The pressure transducer 226 would detect the low pressure and, in response, could issue a signal. This signal would alert a user to the blockage much sooner than would otherwise be detected and would avoid waste of other chemical precursors that would otherwise be dispensed until the blockage was detected. Another benefit of the pressure measurement by the pressure transducer 226 is the ability to avoid crossovers, which can destroy a foam-in-bag system.

In another example, the pressure measurement by the pressure transducer 226 can be used to detect cavitation in the feed line 210. If the chemical precursor 204 is in liquid form, the chemical precursor 204 has a specific vapor pressure at a given temperature so that the vapor pressure is a function of temperature. Whenever a liquid pressure falls below its vapor pressure, the liquid begins to boil. Cavitation occurs when the drop below the vapor pressure is caused by suction from a pump, and cavitation can cause many problems within the feed line 210 and throughout the pumping system. In some embodiments, if the pressure transducer 226 detects a drop in pressure that approaches a cavitation pressure, the pumping system can shut down and/or provide a warning to the user that cavitation may be possible. In the depicted embodiment, the temperature sensor 228 is also capable of detecting the temperature within the feed line 210 upstream of the transfer pump 222. The temperature in the chemical precursor 204 can be used in addition to the pressure measured by the pressure transducer 226 to ensure accuracy of the determination that conditions are approaching cavitation.

Figure 3A:
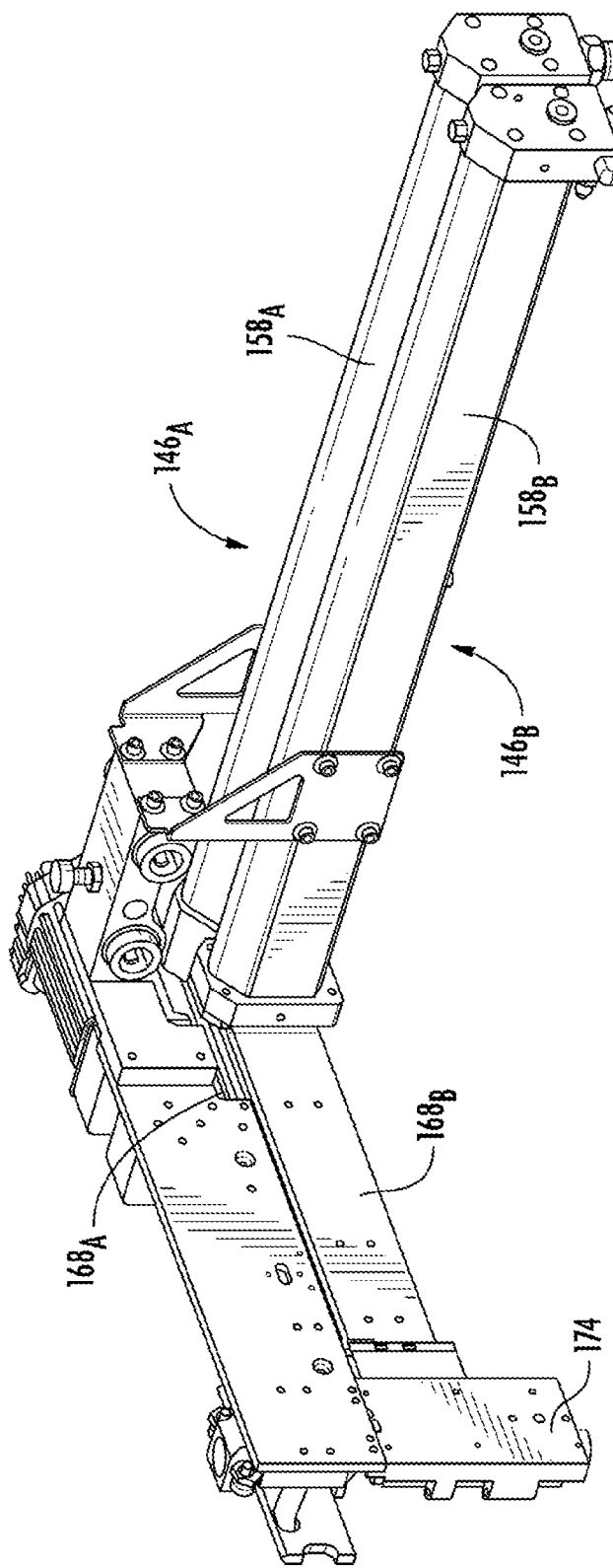
FIG. 3A depicts a perspective view of an embodiment of a dispenser manifolds and a dispenser, collectively, of a foam-in-bag system, in accordance with the embodiments described herein.
Figure 3B:
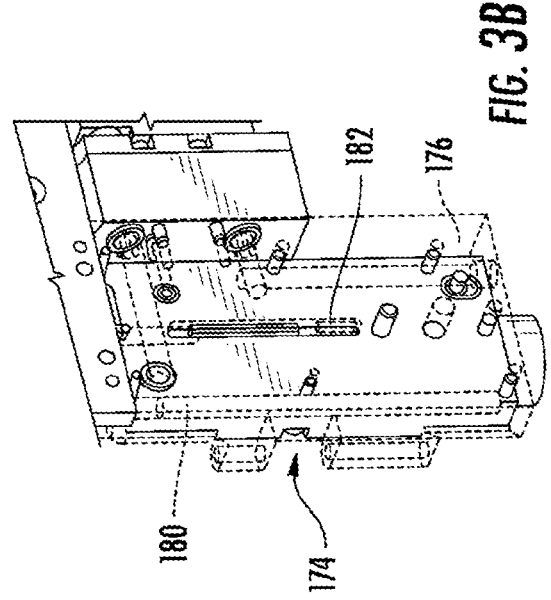
FIGS. 3B, 3C, 3D, 3E, and 3F depict perspective views, respectively, of an embodiment of the dispenser shown in FIG. 3A, of an embodiment of an output block of a second dispenser manifold, of an embodiment of an output block of a first dispenser manifold, of an embodiment of an input block of a first dispenser manifold, and of an embodiment of an input block of the second dispenser manifold, in accordance with the embodiments described herein.
Figure 3C:
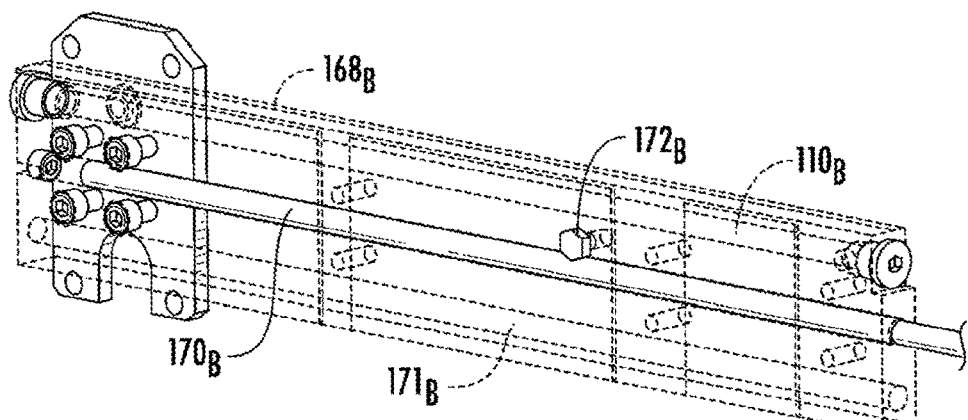
Figure 3D:
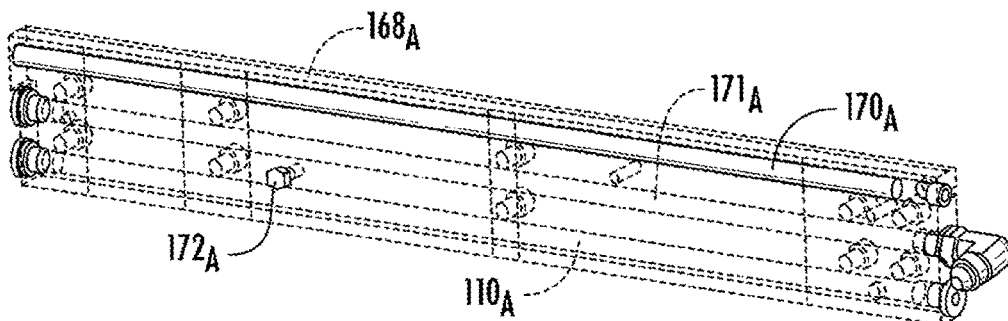
Figure 3E:
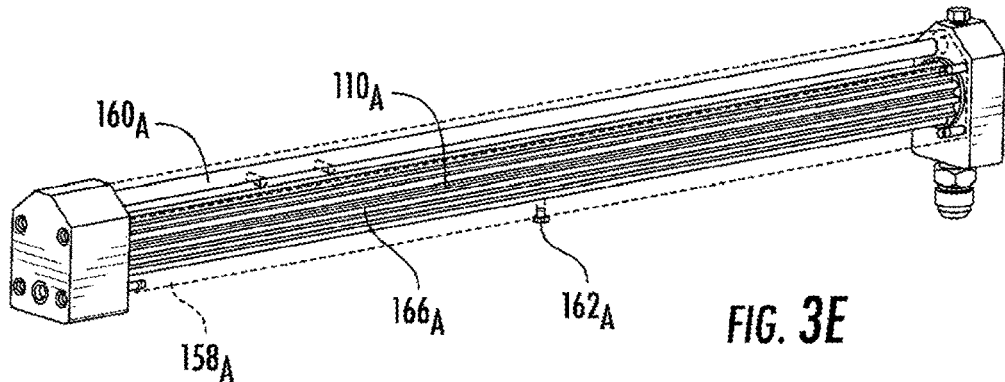
Figure 3F:
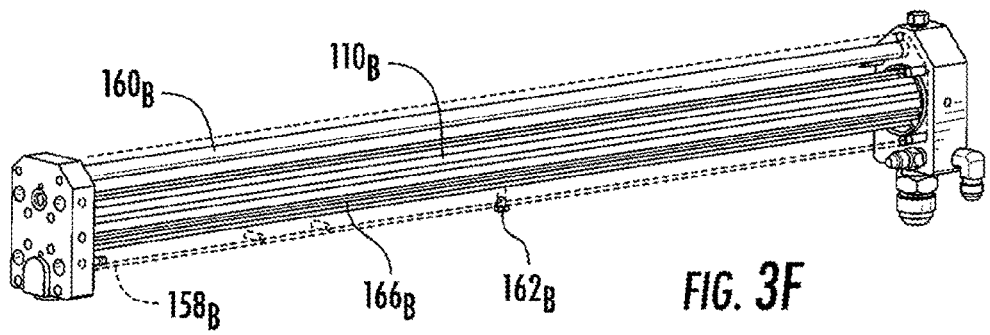

In some embodiments described herein, the temperature of chemical precursors in a foam-in-bag system is controlled. Depicted in FIG. 3A is a perspective view of an embodiment of the dispenser manifolds 146 and the dispenser 174, collectively, of the foam-in-bag system 100. Depicted in FIGS. 3B to 3F are perspective views of embodiments of the dispenser 174 and portions of the dispenser manifolds 146, individually. In particular, FIG. 3B depicts a perspective view of an embodiment of the dispenser 174; FIG. 3C depicts a perspective view of an embodiment of the output block $168_B$ of the second dispenser manifold $146_B$; FIG. 3D depicts a perspective view of an embodiment of the output block $168_A$ of the first dispenser manifold $146_A$; FIG. 3E depicts a perspective view of an embodiment of the input block $158_A$ of the first dispenser manifold $146_A$; and FIG. 3F depicts a perspective view of an embodiment of the input block $158_B$ of the second dispenser manifold $146_B$.

In the embodiment depicted in FIG. 3A, the input blocks 158 are arranged substantially in parallel with each other. One end of each of the input blocks 158 (the ends to the right in FIG. 3A) includes couplings configured to couple to hoses (e.g., hoses 148) for supplying chemical precursors to the input blocks 158. The other ends of the input blocks 158 are coupled to the output blocks 168. In the depicted embodiment, the output blocks 168 are arranged substantially parallel to each other and substantially perpendicular to the input blocks 158. Together, the input blocks 158 and the output blocks 168 form the dispenser manifolds 146. One end of each of the output blocks 168 is coupled to one of the input blocks 158 and the other end of each of the output blocks 168 is coupled to the dispenser 174. The first dispenser manifold $146_A$ is configured to pass the first chemical precursor $104_A$ to the dispenser 174 via the feed line $110_A$ that passes through the input block $158_A$ and the output block $168_A$. The second dispenser manifold $146_B$ is configured to pass the second chemical precursor $104_B$ to the dispenser 174 via the feed line $110_B$ that passes through the input block $158_B$ and the output block $168_B$. The dispenser 174 is configured to dispense a ratio of the first chemical precursor $104_A$ and the second chemical precursor $104_B$ such that the dispensed chemical precursors 104 mix to react and form foam.

In the embodiment depicted in FIG. 3B, the dispenser 174 includes the mixing cartridge manifold 176, which includes the heating element 180 and the temperature sensor 182. The heating element 180 is configured to heat the mixing cartridge manifold 176. In some embodiments, the heating element 180 is a cartridge style heating element rated in a range from 60 watts to 100 watts, such as 80 watts. In one example, the heating element 180 is cylinder-shaped with a length of about 4 inches and a diameter of about 0.25 inches. The temperature sensor 182 is configured to detect the temperature of the mixing cartridge manifold 176. In some embodiments, a controller (e.g., a computing device) is configured to control operation of the heating element 180 based on indications from the temperature sensor 182 of the temperature of the mixing cartridge manifold 176. For example, the controller may alternate between causing the heating element 180 to be powered and causing the heating element 180 to be unpowered based on fluctuations in the indications from the temperature sensor 182 of the temperature of the mixing cartridge manifold 176. In this way, the temperature of the mixing cartridge manifold 176 may be kept in a desired temperature range for the first and second chemical precursors 104 as they pass through the mixing cartridge manifold 176.

In the embodiment depicted in FIG. 3C, the output block $168_B$ includes a portion of the feed line $110_B$ through which the second chemical precursor $104_B$ is capable of flowing. The output block $168_B$ also includes the heating element $170_B$ and the temperature sensor $172_B$. The heating element $170_B$ is configured to heat the output block $168_B$. In some embodiments, the heating element $170_B$ is a cartridge style heating element rated in a range from 100 watts to 200 watts, such as 150 watts. In one example, the heating element $170_B$ is cylinder-shaped with a length of about 12.125 inches and a diameter of about 0.25 inches. The temperature sensor $172_B$ is configured to detect the temperature of the output block $168_B$. In some embodiments, a controller (e.g., a computing device) is configured to control operation of the heating element $170_B$ based on indications from the temperature sensor $172_B$ of the temperature of the output block $168_B$. For example, the controller may alternate between causing the heating element $170_B$ to be powered and causing the heating element $170_B$ to be unpowered based on fluctuations in the indications from the temperature sensor $172_B$ of the temperature of the output block $168_B$. In this way, the temperature of the output block $168_B$ may be kept in a desired temperature range for the second chemical precursor $104_B$ as it passes through the output block $168_B$. The output block $168_B$ also includes a secondary line $171_B$, which can be used to feed other fluid through the output block $168_B$.

In the embodiment depicted in FIG. 3D, the output block $168_A$ includes a portion of the feed line $110_A$ through which the first chemical precursor $104_A$ is capable of flowing. The output block $168_A$ also includes the heating element $170_A$ and the temperature sensor $172_A$. The heating element $170_A$ is configured to heat the output block $168_A$. In some embodiments, the heating element $170_A$ is a cartridge style heating element rated in a range from 100 watts to 200 watts, such as 150 watts. In one example, the heating element $170_A$ is cylinder-shaped with a length of about 13.25 inches and a diameter of about 0.25 inches. The temperature sensor $172_A$ is configured to detect the temperature of the output block $168_A$. In some embodiments, a controller (e.g., a computing device) is configured to control operation of the heating element $170_A$ based on indications from the temperature sensor $172_A$ of the temperature of the output block $168_A$. For example, the controller may alternate between causing the heating element $170_A$ to be powered and causing the heating element $170_A$ to be unpowered based on fluctuations in the indications from the temperature sensor $172_A$ of the temperature of the output block $168_A$. In this way, the temperature of the output block $168_A$ may be kept in a desired temperature range for the second chemical precursor $104_A$ as it passes through the output block $168_A$. The output block $168_A$ also includes a secondary line $171_A$, which can be used to feed other fluid through the output block $168_A$. In the depicted embodiment, a cleaning solution is capable of flowing through the secondary line $171_A$ to the mixing cartridge manifold 176. In some cases, the efficacy of the cleaning solution may improve when heated by the output block $168_A$ as the cleaning solution flows through the secondary line $171_A$ and the heating element $170_A$ is controlled to heat the output block $168_A$.

In the embodiment depicted in FIG. 3E, the input block $158_A$ includes a portion of the feed line $110_A$ through which the first chemical precursor $104_A$ is capable of flowing. The input block $158_A$ also includes the heating element $160_A$ and the temperature sensor $162_A$. The heating element $160_A$ is configured to heat the input block $158_A$. In some embodiments, the heating element $160_A$ is a cartridge style heating element rated in a range from 250 watts to 750 watts, such as 500 watts. In one example, the heating element $160_A$ is cylinder-shaped with a length of about 24.625 inches and a diameter of about 0.375 inches. The temperature sensor $162_A$ is configured to detect the temperature of the input block $158_A$. In some embodiments, a controller (e.g., a computing device) is configured to control operation of the heating element $160_A$ based on indications from the temperature sensor $162_A$ of the temperature of the input block $158_A$. For example, the controller may alternate between causing the heating element $160_A$ to be powered and causing the heating element $160_A$ to be unpowered based on fluctuations in the indications from the temperature sensor $162_A$ of the temperature of the input block $158_A$. In this way, the temperature of the input block $158_A$ may be kept in a desired temperature range for the first chemical precursor $104_A$ as it passes through the input block $158_A$. The input block $158_A$ also includes the filter $166_A$ in the portion of the feed line $110_A$ that passes through the input block $158_A$. In some embodiments, the filter $166_A$ is configured to filter the first chemical precursor $104_A$ with a fine-pore depth filter. In some cases, the fine-pore depth filter is of a size, such as a 100-micron rating, that the filter $166_A$ is expected to last for the life of the input block $158_A$ without being serviced or replaced. In some embodiments, the filter $166_A$ is a porous high density polyethylene (HDPE) filter.

In the embodiment depicted in FIG. 3F, the input block $158_B$ includes a portion of the feed line $110_B$ through which the second chemical precursor $104_B$ is capable of flowing. The input block $158_B$ also includes the heating element $160_B$ and the temperature sensor $162_B$. The heating element $160_B$ is configured to heat the input block $158_B$. In some embodiments, the heating element $160_B$ is a cartridge style heating element rated in a range from 250 watts to 750 watts, such as 500 watts. In one example, the heating element $160_A$ is cylinder-shaped with a length of about 24.625 inches and a diameter of about 0.375 inches. The temperature sensor $162_B$ is configured to detect the temperature of the input block $158_B$. In some embodiments, a controller (e.g., a computing device) is configured to control operation of the heating element $160_B$ based on indications from the temperature sensor $162_A$ of the temperature of the input block $158_A$. For example, the controller may alternate between causing the heating element $160_A$ to be powered and causing the heating element $160_A$ to be unpowered based on fluctuations in the indications from the temperature sensor $162_A$ of the temperature of the input block $158_B$. In this way, the temperature of the input block $158_B$ may be kept in a desired temperature range for the second chemical precursor $104_B$ as it passes through the input block $158_B$. The input block $158_B$ also includes the filter $166_B$ in the portion of the feed line $110_B$ that passes through the input block $158_B$. In some embodiments, the filter $166_B$ is configured to filter the second chemical precursor $104_B$ with a fine-pore depth filter. In some cases, the fine-pore depth filter is of a size that the filter $166_B$ is expected to last for the life of the input block $158_B$ without being serviced or replaced.

When the dispenser manifolds 146 and the dispenser 174 are arranged in the embodiment shown in FIG. 3A, the chemical precursors 104 are configured to be heated independently as they flow toward the dispenser 174 and then are both heated by the mixing cartridge manifold 176. In other words, the dispenser manifolds 146 independently heat the first chemical precursor $104_A$ and the second chemical precursor $104_B$ as the chemical precursors flow toward the dispenser 174 and then the mixing cartridge manifold 176 heats the chemical precursors 104 together as they flow in the dispenser 174. In the particular embodiment depicted in FIG. 3A, there are five discrete, but coupled, heating zones: (1) the input block $158_A$ is a heating zone for the first chemical precursor $104_A$, (2) the output block $168_A$ is a heating zone for the first chemical precursor $104_A$, (3) the input block $158_B$ is a heating zone for the second chemical precursor $104_B$, (4) the output block $168_B$ is a heating zone for the second chemical precursor $104_B$, and (5) the mixing cartridge manifold 176 in the dispenser 174 is a heating zone for both of the first and second chemical precursors $104_A$ and $104_B$.

Having multiple heating zones for the chemical precursors 104 before they are dispensed by the dispenser provides a number of advantages. In one example, the chemical precursors 104 can be maintained with a range of temperatures that improve flowability of the chemical precursors 104, increase efficacy of the chemical precursors 104 when they are mixed together to form foam, and/or reduce the likelihood of crystal formation in the chemical precursors 104. In another example, the multiple heating zones reduce variations in the temperature of the chemical precursors 104, such as reducing the magnitude and frequency of temperature dips and spikes. In another example, the heating zones maintain the chemical precursors 104 in a desired temperature range during periods when the foam-in-bag system is idle, whether for short or long periods of idle. In another example, the thermal mass of the input and output blocks 158 and 168 of the dispenser manifolds 146 and the thermal mass of the mixing cartridge manifold 176 may help to minimize fluctuations in the temperature of the chemical precursors 104.

The ability to heat the chemical precursors 104 before the dispenser 174 can be highly beneficial. For example, in the dispenser manifolds 146 can be controlled independently so that the chemical precursors 104 are maintained at different temperatures. Because the chemical precursors 104 are different, the temperatures at which they are most effective temperatures may also be different. The ability to control the temperature of the dispenser manifolds 146 independently allows the chemical precursors 104 to be held at different temperatures that are at or near their most effective temperatures. Even though both of the chemical precursors subsequently pass into the mixing cartridge manifold 176 where they cannot be heated independently, the mixing cartridge manifold 176 can hold a small volume of the chemical precursors 104 in order to minimize the change in temperature of the chemical precursors 104 in the mixing cartridge manifold 176. In addition, the target temperatures in the dispenser manifolds 146 can be set based at least on any change of temperature that may occur in the mixing cartridge manifold 176 so that the chemical precursors 104 are at or near a desired dispensing temperature after the effect of the mixing cartridge manifold 176 on the chemical precursors 104.

In some embodiments, the each of the multiple heating zones is controlled independently. For example, each heaving zone may a temperature sensor to measure the temperature in that zone and a controller to control the heating element in that zone. In some embodiments, each of the heating zones includes a controller, such as a printed circuit board with circuitry configured to control the heating element in that zone to cause the temperature in the heating zone to be maintained at or near a specific temperature or within a particular range of temperatures. In a specific example, each of the input block 158, the output blocks 168, and the mixing cartridge manifold 176 includes a printed circuit board with circuitry configured to control the respective heating element in that zone (e.g., one of the heating elements 160, one of the heating elements 170, or the heating element 180) based on indications from the temperature sensor in that zone (e.g., one of the temperature sensors 162, one of the temperature sensors 172, or the temperature sensor 182). In some embodiments, the controllers are configured to alternate between causing the heating element to be powered and causing the heating element to be unpowered based on fluctuations in the indications from the temperature sensor. In some examples, the controllers are capable of maintaining the temperature in the temperature zone within 1° F. of a target temperature, within 2° F. of a target temperature, or within 5° F. of a target temperature.

In some embodiments, in addition to the heating of the chemical precursors 104 provided in the dispenser manifolds 146 and the mixing cartridge manifold 176, the chemical precursors 104 can be heated upstream of the dispenser manifolds 146. As noted above with respect to FIG. 1B, the hoses 148 can include heating elements 150 to heat the chemical precursors 104 as they pass through the hoses 148. In some examples, the heating elements 150 are heater wires, such as coiled nichrome, rated to 1,750 watts with a 25-ohm resistance. Heating the chemical precursors 104 in the hoses 148 can reduce the difference in temperature between the chemical precursors 104 as they enter the dispenser manifolds 146 and the controlled temperature of the input blocks 158 in the dispenser manifolds 146. As can be seen in FIG. 1B, the hoses 148 can include a temperature sensor (e.g. temperature sensor $152_A$) and controlled in a feedback manner similar to the heating zones above, or the hoses 148 can be uncontrolled and lack a temperature sensor (e.g., as in the case of the hose $148_B$). In the depicted embodiment, the heating elements 150 are in direct contact with the chemical precursors 104 as they pass through the hoses 148.

Figure 4A:
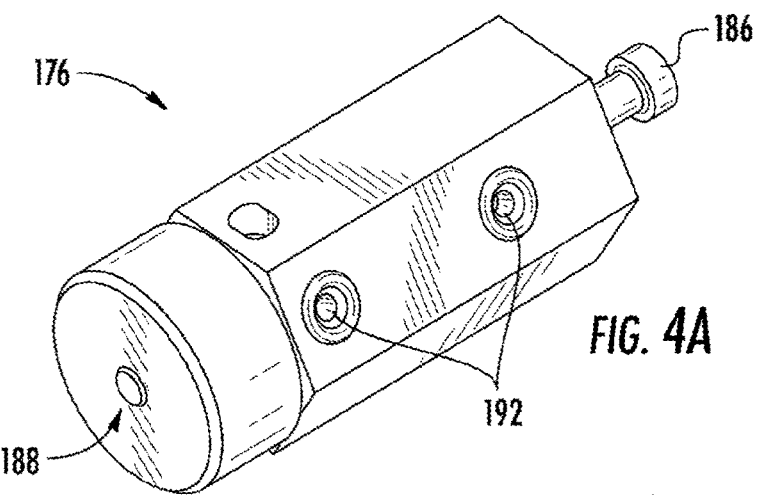
FIGS. 4A, 4B, and 4C depict, respectively, a perspective view of a mixing cartridge in a closed orientation, a cross-sectional perspective view of the mixing cartridge in the closed orientation, and a cross-sectional perspective view of the mixing cartridge in an open orientation, in accordance with the embodiments described herein.
Figure 4B:
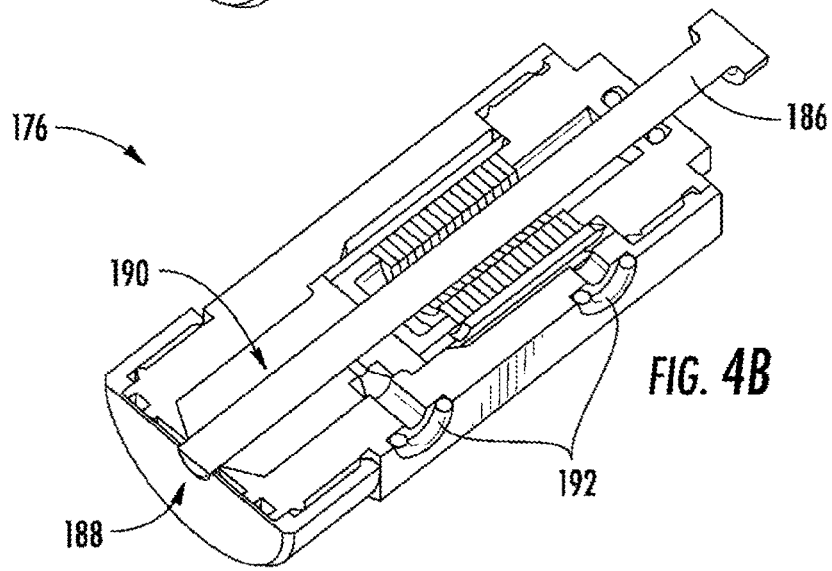
Figure 4C:
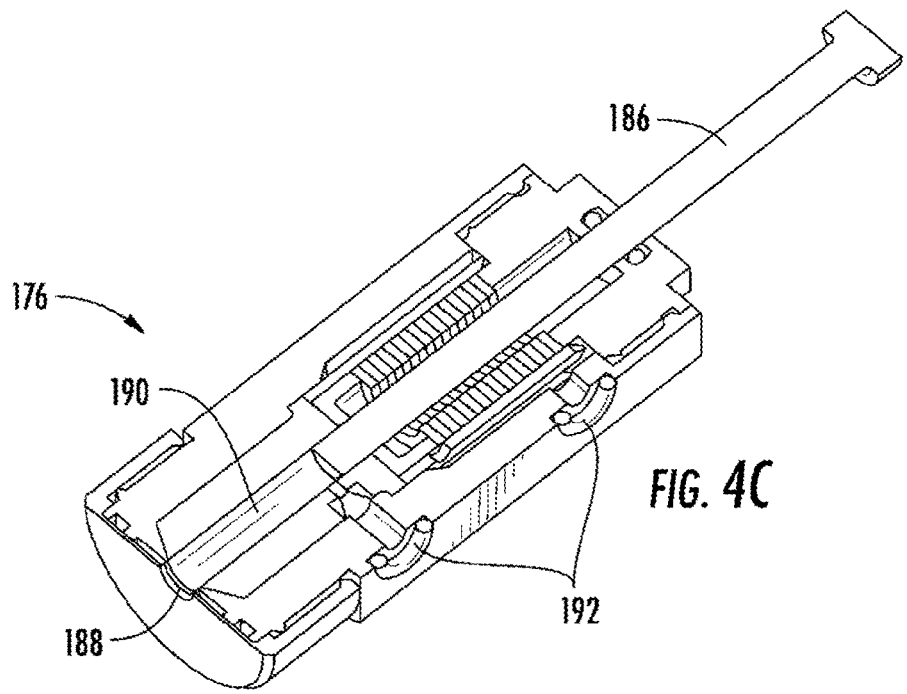

As discussed above, the mixing cartridge 178 is configured to be selectively controlled to dispense specific amounts of the first and second chemical precursors $104_A$ and $104_B$ into formed bags. Depicted in FIGS. 4A to 4C are perspective and cross-sectional perspective views of an embodiment of the mixing cartridge 178. More specifically, FIG. 4A depicts a perspective view of the mixing cartridge 178 in a closed orientation, FIG. 4B depicts a cross-sectional perspective view of the mixing cartridge 178 in the closed orientation, and FIG. 4C depicts a cross-sectional perspective view of the mixing cartridge 178 in an open orientation.

The mixing cartridge 178 includes a valving rod 186 that can slide in an axial direction to open and close the mixing cartridge 178. The mixing cartridge 178 includes an outlet 188 through which dispensed chemical precursors can exit the mixing cartridge 178. The mixing cartridge 178 also includes a mixing chamber 190 where chemical precursors can begin mixing before the chemical precursors are dispensed out of the outlet 188. The mixing cartridge 178 also includes inlets 192 configured to permit chemical precursors and/or cleaning solution to flow into the mixing cartridge 178. In some embodiments, the inlets 192 that receive chemical precursors are configured to direct the chemical precursors into the mixing chamber 190. In some embodiments, the walls of the mixing chamber 190 are made of a material that is nonreactive with many chemicals, such as polytetrafluoroethylene (PFTE), which is distributed under the trade name of TEFLON by The Chemours Company of Wilmington, Delaware.

As can be seen in FIGS. 4A and 4B, when the mixing cartridge 178 is in the closed orientation, the valving rod 186 extends through the mixing cartridge 178 and blocks the outlet 188. When the mixing cartridge 178 is in the closed orientation, the valving rod 186 also blocks the mixing chamber 190 and the path from the inlets 192 into the mixing chamber 190. In this way, when the mixing cartridge 178 is in the closed orientation, the valving rod 186 blocks flow of chemical precursors from the inlet 192 into the mixing chamber 190, flow of chemical precursors through the mixing chamber 190, and flow of chemical precursors from the mixing chamber 190 out of the outlet 188.

As can been seen in FIG. 4C, when the mixing cartridge 178 is in the open orientation, the valving rod 186 is retracted so that the valving rod 186 does not block the outlet 188. When the mixing cartridge 178 is in the open orientation, the valving rod 186 does not block the path from the inlets 192 into the mixing chamber 190 and the valving rod 186 does not block the mixing chamber 190 itself. In this way, when the mixing cartridge 178 is in the open orientation, the position of the valving rod 186 permits chemical precursor to flow through the inlets 192 into the mixing chamber 190, through the mixing chamber 190, and from the mixing chamber 190 out of the outlet 188.

Figure 4D:
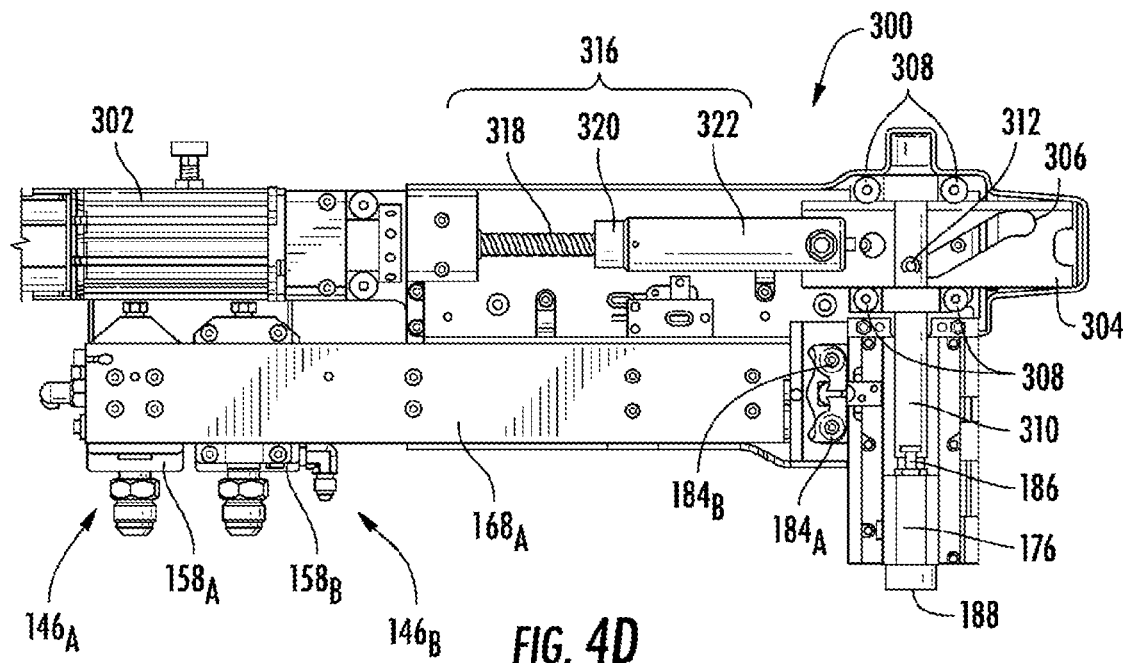
FIG. 4D, 4E, and FIG. 4F depict, respectively, a side cross sectional view of the mixing cartridge and a dispenser drive mechanism with the mixing cartridge in the closed configuration, a side cross sectional view of the mixing cartridge and the dispenser drive mechanism with the mixing cartridge in the open configuration, and a perspective view of the mixing cartridge in the closed configuration, in accordance with the embodiments described herein.
Figure 4E:
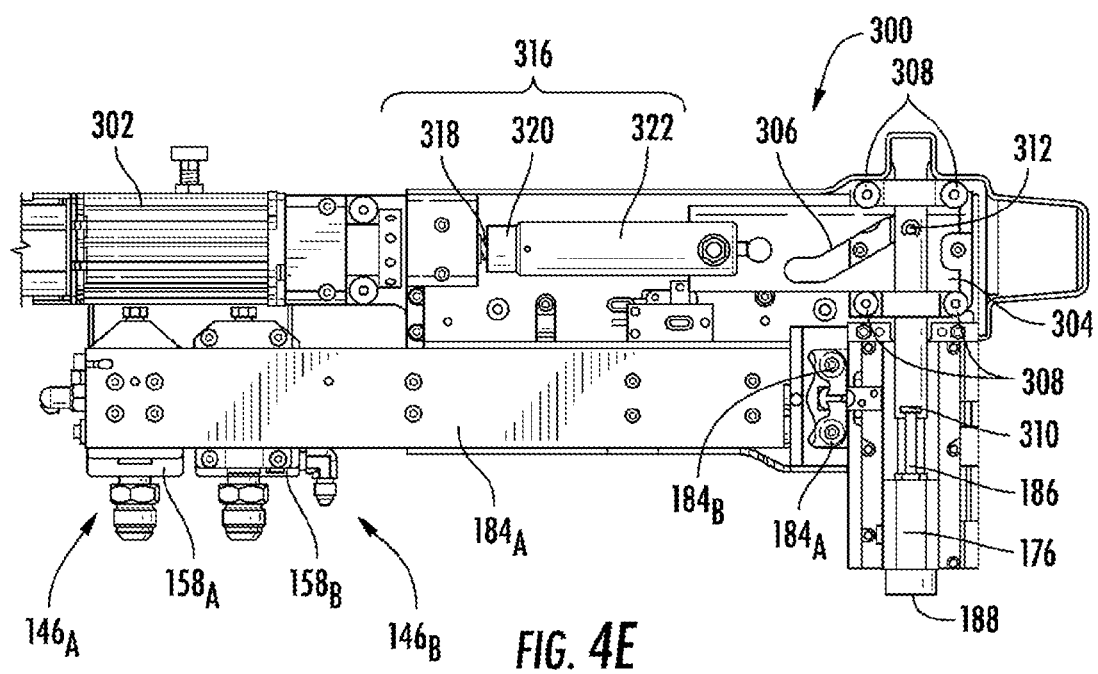
Figure 4F:
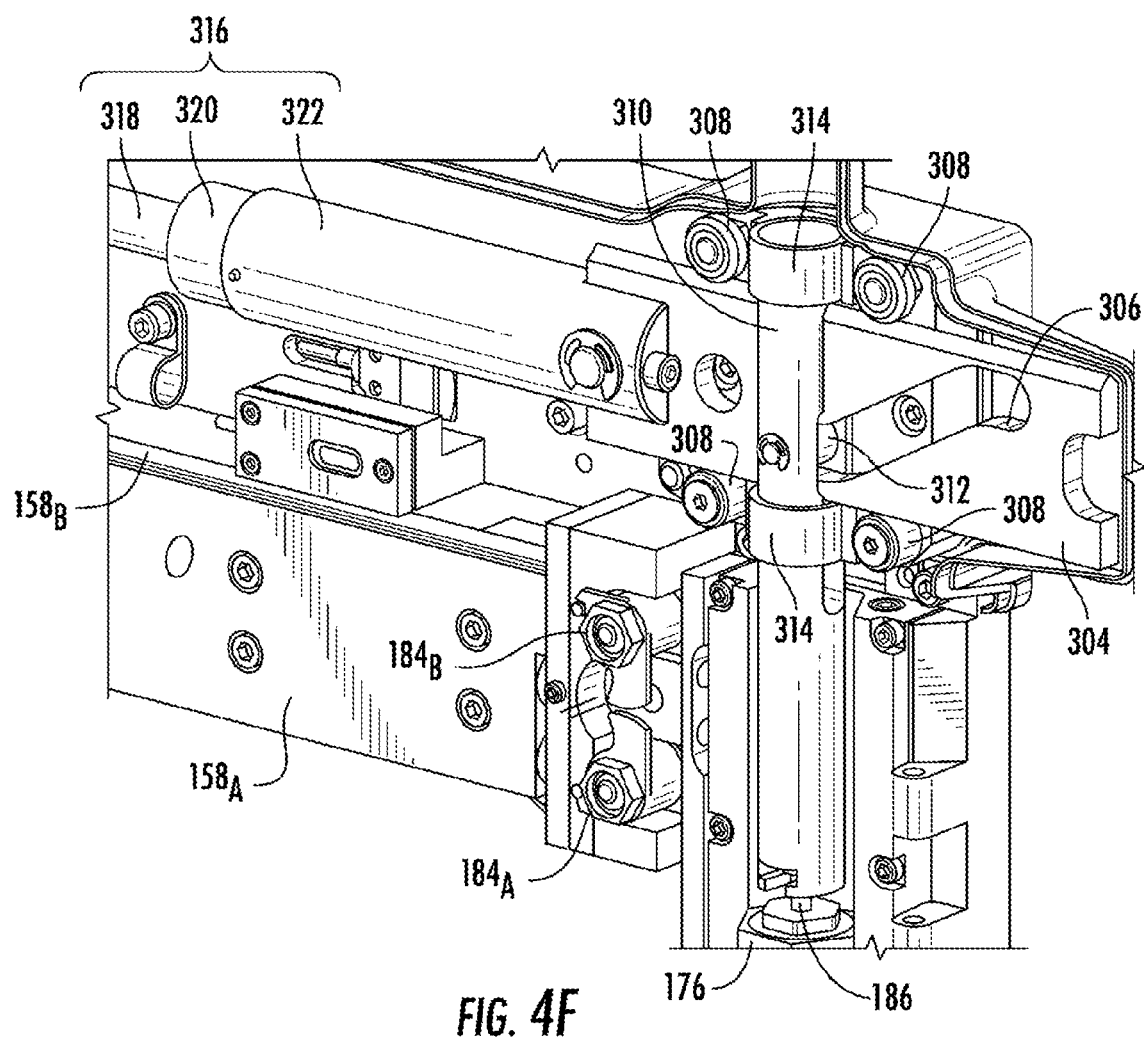

Depicted in FIGS. 4D and 4E is an embodiment of a dispenser drive mechanism 300 configured to selectively open and close the mixing cartridge 178 of the foam-in-bag system 100. More specifically, FIG. 4D depicts a front view of the dispenser drive mechanism 300 with the mixing cartridge 178 in the closed position, FIG. 4E depicts a front view of the dispenser drive mechanism 300 with the mixing cartridge 178 in the open position, and FIG. 4F depicts a perspective view of the dispenser drive mechanism 300 with the mixing cartridge 178 in the closed position.

The dispenser drive mechanism 300 is configured to raise and lower the valving rod 186 to open and close the mixing cartridge 178. To open the mixing cartridge 178, the valving rod 186 is retracted through the mixing chamber 190 (e.g., moved upward from the position of the valving rod 186 shown in the view shown in FIG. 4D to the position of the valving rod 186 shown in the view shown in 4E). In some embodiments, the full distance traversed by the valving rod 186 is less than or equal to about 1 inch, such as a distance of about 0.875 inches. This allows the end of the valving rod 186 to clear the outlet 188 and the opening of the inlets 192, which permits the chemical precursors to flow into the mixing chamber 190. The mixing of the chemical precursors may result in the production of a reactant material, such as urethane foam. To close the mixing cartridge 178, the valving rod 186 is driven downward, back through the mixing chamber 190 by the same distance (e.g., less than or equal to about 1 inch). This motion of the valving rod 186 closes off the inlets 192, shutting the flow of chemical precursors into the mixing chamber 190 and the flow of foam out of the outlet 188.

In some embodiments, the motion of the valving rod 186 is a simple linear motion. However, large forces may be required to move the valving rod 186 against the compressive, sealing force of the mixing chamber 190 (e.g., the PFTE walls of the mixing chamber 190) and against the bonding from urethane foam residue between the inner surface of the mixing chamber 190 and the outer surface of the valving rod 186. In some cases, the urethane foam residue acts as a strong bonding agent which is desired to be cleared out of the mixing chamber 190 each time the valving rod 186 is extended. In addition to overcoming the forces acting against the movement of the valving rod 196, one possible object of the dispenser drive mechanism 300 is to provide a consistent opening time and closing time of the mixing cartridge 178. In some cases, it is desirable for the dispenser drive mechanism 300 is to provide a consistent opening time and closing time of the mixing cartridge 178 even if the mixing cartridge 178 has been used heavily and urethane bonds have formed between the outer surface of the valving rod 186 and the inner surface of the mixing chamber 190. In some embodiments, opening and closing times are less than or equal to about 200 milliseconds (ms). For example, opening and closing times may be in a range between about 150 ms and about 200 ms.

In typical foam-in-bag systems, bags are formed from film and the chemical precursors are dispensed into the film bag. The film bags are typically formed by passing one ply of the film in front of the dispenser (e.g., in front of the mixing cartridge 178) and another ply of the film in back of the dispenser (e.g., in back of the mixing cartridge 178). Because the film passes on either side of the dispenser, there is little space available for the components associated with the dispenser, such as dispenser drive mechanism that opens and closes the dispenser. This limited space presents a challenge to providing a dispenser drive mechanism that is capable of generating the required forces and power in the space available between the plies of film. In addition, the limited amount of space may not allow for the dispenser drive mechanism to be aligned axially with the valving rod of the dispenser (e.g., the valving rod 186 of the mixing cartridge 178).

Depicted in FIGS. 4D to 4F are views of an embodiment of the dispenser drive mechanism 300 that is capable of driving the valving rod 186 to open and close the mixing cartridge 178. More specifically, FIG. 4D depicts a front view of the dispenser drive mechanism 300 with the mixing cartridge 178 in the closed orientation, FIG. 4E depicts a front view of the dispenser drive mechanism 300 with the mixing cartridge 178 in the open orientation, and FIG. 4F depicts a perspective view of the dispenser drive mechanism 300 with the mixing cartridge 178 in the closed orientation.

The dispenser drive mechanism 300 includes a drive motor 302. The drive motor 302 is configured to impart a driving force. In some embodiments, the drive motor 302 is a motor with full servo capability. In one embodiment, the drive motor 302 is a CPM-SDSK-2341P-ELN motor distributed by Teknic, Inc. of Victor, NY In some embodiments, the drive motor 302 is a brushless DC motor with neodymium magnets, a built-in encoder, and a built-in controller. In some embodiments, the drive motor 302 runs on 75 VDC with a peak torque of over 400 ounce-inches (over 2.82 newton-meters) and a top speed of 4,000 rpm.

The dispenser drive mechanism 300 also includes a cam plate 304 coupled to the drive motor 302. The cam plate 304 includes a cam slot 306. In the depicted embodiment, the cam plate 304 is configured to be translated by the driving force provided drive motor 302. The dispenser drive mechanism 300 includes rollers 308 configured to support the cam plate 304 as it is translated by the drive motor 302. While the depicted embodiment includes rollers 308 to support the cam plate 304, the dispenser drive mechanism 300 could also include any other cam plate support, such as bearings, slotted brackets, or any other mechanism configured to support and guide the cam plate 304 as it translates.

The dispenser drive mechanism 300 also includes a valving rod connector 310. One end of the valving rod connector 310 is configured to be coupled to the valving rod 186. The valving rod connector 310 also includes a pin 312 that passes through and engages the cam slot 306. In some embodiments, the pin 312 is a roller pin. The pin 312 is coupled to the valving rod connector 310 such that a force imparted on the pin 312 by the cam slot 306 results in a linear movement of the valving rod connector 310. When the valving rod connector 310 is coupled to the valving rod 186, the linear movement of the valving rod connector 310 causes a corresponding linear movement of the valving rod 186. As can be seen in FIG. 4F, the dispenser drive mechanism 300 can include linear bearings 314 configured to support and guide the valving rod connector 310 as it translates.

In the depicted embodiment, the dispenser drive mechanism 300 includes a drive coupling assembly 316. The drive coupling assembly 316 is coupled to the drive motor 302 and to the cam plate 304. The drive coupling assembly 316 is configured to convert rotational motion of the drive motor 302 into linear motion of the cam plate 304. In the depicted embodiment, the drive coupling assembly 316 includes a drive screw 318 that is coupled to a shaft of the drive motor 302. The drive motor 302 is capable of turning the drive screw 318 in two rotational directions (e.g., clockwise and counterclockwise). In some embodiments, the drive screw 318 has a diameter of about 0.5 inches with external threads having a 0.5-inch pitch. The drive coupling assembly 316 also includes a nut 320 configured to engage with the drive screw 318. In the depicted embodiment, the nut 320 has internal threads that mate with the external threads of the drive screw 318. If the nut 320 is prevented from rotating, the rotation of the drive screw 318 will result in a linear motion of the nut 320 either toward or away from the cam plate 304, depending on the direction of rotation of the drive screw 318. The drive coupling assembly 316 also includes a nut extender 322. The nut extender 322 is coupled to the nut 320 and coupled to the cam plate 304. In the depicted embodiment, the nut extender 322 is coupled to the cam plate 304 via a pin. The linear motion of the nut 320 causes a corresponding linear motion of the nut extender 322, which in turn causes a corresponding linear motion of the cam plate 304. While the embodiment of the drive coupling assembly 316 depicted in FIGS. 4D to 4F is a rotational-to-linear drive coupling assembly, it will be apparent that any other coupling mechanism may be used to convert the motion of the drive motor 302 into a corresponding motion of the cam plate 304.

The dispenser drive mechanism 300 is configured to open the mixing cartridge 178 by retracting the valving rod 186. To retract the valving rod 186, the drive motor 302 operates to provide a rotational driving force in one rotational direction. The drive coupling assembly 316 transforms the rotational driving force into a linear translational force, causing the cam plate 304 to translate linearly. In the depicted embodiment, the cam plate 304 translates from the location shown in FIG. 4D to the left toward the location shown in FIG. 4E. As the cam plate 304 translates, the cam slot 306 imparts a force on the pin 312 to cause the valving rod connector 310 to translate linearly. In the depicted embodiment, the linear translation of the cam plate 304 is substantially perpendicular to the linear translation of the valving rod connector 310. As the cam plate 304 translates from the location shown in FIG. 4D to the left toward the location shown in FIG. 4E, the valving rod connector 310 translates from the location shown in FIG. 4D upward toward the location shown in FIG. 4E. The upward movement of the valving rod connector 310 causes the valving rod 186 to also move upward, withdrawing the valving rod 186 from the outlet 188, the mixing chamber 190, and the inlets 192 of the mixing cartridge 178.

As the cam plate 304 translates, the cam plate 304 is supported by the rollers 308. In some embodiments, some of the rollers 308 are flat-faced rollers configured to contact a flat surface of the cam plate 304. In the depicted embodiment, the lower two rollers 308 are flat-faces rollers configured to engage a flat face on the bottom of the cam plate 304. In some embodiments, some of the rollers 308 are grooved rollers configured to contact a V-shaped surface of the cam plate 304. In the depicted embodiment, the upper two rollers 308 are grooved rollers configured to engage a V-shaped upper surface of the cam plate 304. It will be apparent that the upper surface of the cam plate 304 could be grooved and the rollers could be V-shaped to achieve the same arrangement. In some cases, the engagement of the V-shaped rollers 308 or cam plate 304 engage the grooved cam plate 304 or rollers 308 to reduce or eliminate jerk in the motion of the cam plate 304. The shape of the groove may also aid in transferring a greater percentage of the drive force to the valving rod 186 at the start of the opening stroke. In some conditions, the start of the opening stroke is when the bonding from the urethane foam remnants is strongest. This increases the likelihood that the mixing cartridge 178 will open, regardless of the amount of adhered urethane foam remnants in the mixing chamber 190 of the dispenser.

The dispenser drive mechanism 300 is configured to close the mixing cartridge 178 by extending the valving rod 186. To extend the valving rod 186, the drive motor 302 operates to provide a rotational driving force in the other rotational direction. The drive coupling assembly 316 transforms the rotational driving force into a linear translational force, causing the cam plate 304 to translate linearly. In the depicted embodiment, the cam plate 304 translates from the location shown in FIG. 4E to the right toward the location shown in FIG. 4D. As the cam plate 304 translates, the cam slot 306 imparts a force on the pin 312 to cause the valving rod connector 310 to translate linearly. In the depicted embodiment, the linear translation of the cam plate 304 is substantially perpendicular to the linear translation of the valving rod connector 310. As the cam plate 304 translates from the location shown in FIG. 4E to the right toward the location shown in FIG. 4D, the valving rod connector 310 translates from the location shown in FIG. 4E downward toward the location shown in FIG. 4D. The downward movement of the valving rod connector 310 causes the valving rod 186 to also move downward, extending the valving rod 186 through the mixing chamber 190 to close the inlets 192 and the outlet 188.

One benefit to the dispenser drive mechanism 300 depicted in FIGS. 4D to 4F is that the cam plate 304 is driven linearly in a direction substantially perpendicular to the direction of the movement of the valving rod 186. This arrangement allows the drive motor 302 and the cam plate 304 to be arranged perpendicularly to the direction of the dispenser. In the event that the foam-in-bag system feeds the plies of film in the direction of the dispenser 186, the drive motor 302 and the cam plate 304 do not need to be arranged in the same direction of the feeding of the film plies. This allows the path of the film plies to be shorter than if the drive motor 302 and the cam plate 304 were arranged in the same direction of the feeding of the film plies. This arrangement also allows some of the components (e.g., the drive motor 302) to be located outside of the plies of film and away from the chemical precursors, the resultant foam, and any cleaning solution used to clean the mixing cartridge 178. In some embodiments, the dispenser drive mechanism 300 is capable of generating peak loads of more than 1,000 lbs during a stroke that takes less than about 200 ms (e.g., about 150 ms). The cam plate 304 is capable of transferring this amount of force in a substantially perpendicular direction to cause most of the force to be transferred to the valving rod 186.

Many foam-in-bag systems are capable of forming a bag from a film web, dispensing chemical precursors into the formed bag, and then closing the bag before the chemical precursors fully react an expand to their full volume. In some embodiments, the film web is provided on a roll where the film is folded in half longitudinally when it is on the roll. The foam-in-bag system feeds the film such that the fold in the film becomes one of the longitudinal sides. The foam-in-bag system also seals the longitudinal edges of the film opposite the fold to form the other longitudinal side of the bag. The ply of film on one side of the fold forms the front of the bag and the ply of film on the other side of the fold forms the back of the bag. The foam-in-bag system forms transverse seals in the film to form the bottom and the top of the bag and cuts the film outside of the bottom and the top to separate the bag from the film web. Examples of the above-described foam-in-bag systems and a variety of other foam-in-bag systems are provided in U.S. Pat. Nos. 4,854, 109; 4,938,007; 5,139,151; 5,376,219; 5,575,435; 5,679, 208; 5,727,370; 6,131,375; 6,178,725; and 6,472,638; the contents of all of which are hereby incorporated by reference in their entirety.

Film webs for use in foam-in-bag systems are typically provided in are typically supplied on a roll of film. The roll typically includes a cylindrical core (e.g., a core made of a paper-based material) with the film web wound around the cylindrical core. To use the film, the core of the roll is typically mounted on a spindle or other structure where the core is able to rotate as the film web is unrolled by the foam-in-bag system. When the film web is depleted, the core is removed from the foam-in-bag system and discarded, and a new roll of film is loaded onto the foam-in-bag system. Because the core is merely discarded after use, it is advantageous for the core to be as inexpensive as possible to reduce the overall costs associated with the film.

One difficulty with the usability of foam-in-bag systems is the time and effort needed to load a roll of film on the foam-in-bag system for the foam-in-bag system to be able to use the film. For example, when a roll of film has a full length of film would around the core, the roll can have a weight that makes it cumbersome or dangerous for one person to handle. This difficulty in handling may result in rolls of film falling or otherwise being damaged in a way that deforms the core. This problem is exacerbated when cores are made from cheaper materials (e.g., an in effort to reduce the cost of the core), which are more easily deformed. As used herein, a deformed core refers to a core that is not perfectly cylindrical, and includes dented cores, crushed cores, twisted cores, or any other form of a core that is not perfectly cylindrical. When the core is deformed, it can be difficult for a user to slide the roll over the spindle or other support structure that holds the roll. In addition, rolls of film may have different widths depending on the size of bags that are intended to be made with the film, and it can be difficult for a user to adjust the spindle or other support structure on the foam-in-bag system to accommodate the different size width while trying to handle a full roll of film. This adjustment of the spindle or other support structure typically requires the use of tools (e.g., screwdrivers, ratchets, etc.) that make the adjustment even more difficult for the user.

Figure 5A:
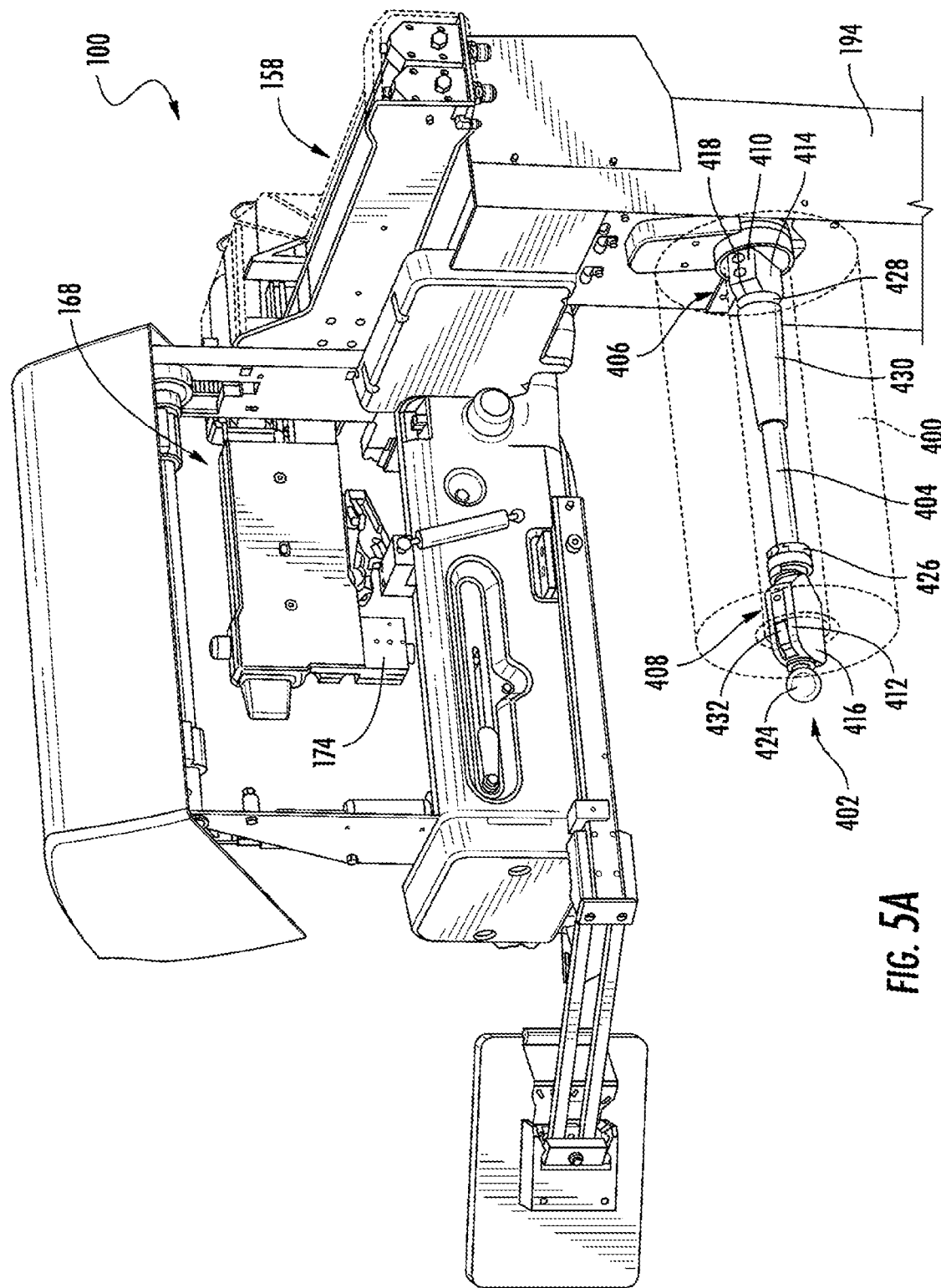

One embodiment of a roll 400 of film web on the foam-in-bag system 100 is depicted in FIG. 5A. In that embodiment, the roll 400 has been placed on a spindle system 402. For convenience, the roll 400 has been shown in FIG. 5A as transparent so that the spindle system 402 is visible; however, in many embodiments, the roll 400 is not transparent. The spindle system 402 includes a rod 404. In the depicted embodiment, the rod 404 is fixedly coupled to a housing 194 of the foam-in-bag system 100 such that the rod 404 does not rotate or translate with respect to the housing 194. The rod 404 is cantilevered out from the housing 194 with a proximal end of the rod 404 located near the housing 194 and a distal end of the rod 404 located away from the housing 194. The rod 404 is cylindrical in shape with an outer diameter that is less than the inner diameter of the core of the roll 400.

The spindle system 402 includes a proximal wing 406 and a distal wing 408 that are configured to contact the inner diameter of the core of the roll 400. Each of the proximal wing 406 and the distal wing 408 is rotatably coupled to the rod 404. For example, each of the proximal wing 406 and the distal wing 408 may have a bore through which the rod 404 passes that permits the each of the proximal wing 406 and the distal wing 408 to rotate around the rod 404. In the depicted embodiment, the proximal wing 406 is operatively coupled to a motor (not shown) inside of the housing 194 and the motor is capable of selectively rotating the proximal wing 406 around the rod 404. In addition, the distal wing 408 is not coupled to the motor so that the distal wing 408 is capable of rotating around the rod 404 independently of the operation of the motor.

The proximal wing 406 and the distal wing 408 are configured to contact the inner diameter of the core of the roll 400 at diametrically-opposed locations on the inner surface of the core. The proximal wing 406 includes contact surfaces 410 and the distal wing 408 includes contact surfaces 412. When the proximal wing 406 and the distal wing 408 are on the rod 404, the contact surfaces 410 and 410 are spaced away from the rod 404 such that the contact surfaces 410 contact diametrically-opposed locations on the inner surface of the core at the proximal side of the roll 400 and the contact surfaces 412 contact diametrically-opposed locations on the inner surface of the core at the distal side of the roll 400. In some embodiments, the contact surfaces 410 and 410 are contoured surfaces based on an expected contour of the inner surface of the core of the roll 400. Having contoured surfaces may increase the percentage of the surface area of the contact surfaces 410 and 410 that is in contact with the core of the roll 400.

The proximal wing 406 also includes non-contact surfaces 414 and the distal wing 408 includes non-contact surfaces 416. The non-contact surfaces 414 span between the contact surfaces 410 and the non-contact surfaces 416 span between the contact surfaces 412. When the core of the roll 400 has a cylindrical shape and the roll 400 is on the proximal wing 406 and the distal wing 408, the non-contact surfaces 414 and 416 do not contact the core of the roll 400. However, as noted above, the cores in rolls of film can be damaged and deformed during shipping or handling. If the core of the roll 400 has a deformity, the roll 400 can be positioned with respect to the proximal wing 406 such that any deformities in the proximal end of the roll 400 at the proximal wing 406 are not contacted by the contact surfaces 410 of the proximal wing 406. In this way, the non-contact surfaces 414 accommodate deformities in the proximal end of the core of the roll 400 while the proximal wing 406 still contacts the core at the contact surfaces 410. Similarly, when the roll 400 can be positioned with respect to the distal wing 408 such that any deformities in the distal end of the roll 400 at the distal wing 408 are not contacted by the contact surfaces 412 of the distal wing 408. In this way, the non-contact surfaces 416 accommodate deformities in the distal end of the core of the roll 400 while the distal wing 408 still contacts the core at the contact surfaces 412.

As noted above, in some embodiments, the proximal wing 406 is operatively coupled to a motor that controls the rotational position of the proximal wing 406 with respect to the rod 404 and the distal wing 408 is capable of rotating freely on the rod 404. In one embodiment of a process of loading the roll 400 on the spindle system 402, the roll 400 is slid over the rod 404 from the distal end of the rod 404 to the proximal end of the rod 404. As the roll 400 is slid over the rod 404, the roll 400 is rotated so that any deformities on the proximal side of the roll 400 are not aligned with the contact surfaces 410 of the proximal wing 406. The distal wing 408 is also rotated so that any deformities on the distal side of the roll 400 are not aligned with the contact surfaces 412 of the distal wing 408. In this way, the proximal wing 406 and the distal wing 408 are able to hold the roll 400 despite any deformities in the core of the roll 400. It will be understood that the proximal wing 406 and the distal wing 408 are able to hold the roll 400 regardless of whether the proximal wing 406 and the distal wing 408 are aligned with each other. In other words, the non-contact surfaces 414 of the proximal wing 406 either be parallel or non-parallel to the non-contact surfaces 416 of the distal wing 408 for the spindle system 402 to support the roll 400. An example of the spindle system 402 with the proximal wing 406 and the distal wing 408 not aligned with each other is depicted in FIG. 5B.

In some embodiments, the foam-in-bag system 100 is configured to actively unwind the film from the roll 400. As used herein, "active" unwinding refers to forced and/or controlled rotation of a roll of film to cause the film to be unwound from the roll, whereas "passive" unwinding refers to a roll rotating in response to the film being pulled and/or withdrawn from the roll. When the roll 400 is on the proximal wing 406 and the distal wing 408, core of the roll 400 is arranged with respect to the contact surfaces 410 and 412 so that rotation of the roll 400 causes rotation of the proximal wing 406 and the distal wing 408 about the rod 404 and rotation of the proximal wing 406 and the distal wing 408 about the rod 404 causes rotation of the roll 400. In the embodiments where the proximal wing 406 is operatively coupled to a motor in the housing, operation of the motor drives rotation of the proximal wing 406 about the rod 404, which causes rotation of the roll 400. The rotation of the roll 400 then causes rotation of the distal wing 408 about the rod 404. In this way, the foam-in-bag system 100 is able to actively unwind film from the roll 400 by driving and/or controlling the motor to rotate the proximal wing 406.

In some embodiments, it may be desirable for one or both of the proximal wing 406 and the distal wing 408 to be engaged to the core of the roll 400 by more than the friction between the contact surfaces 410 and 412 and the inner diameter of the core. In some embodiments, contact surfaces of wings may include an engagement device to increase the friction between the wing and the core of a roll beyond the fiction from the contact between the contact surfaces and the core. In the embodiment depicted in FIG. 5A and in greater detail in FIGS. 5C and 5D, the contact surfaces 410 include engagement devices 418. The engagement devices 418 are configured to engage the core of the roll 400 and to decrease the possibility of the core of the roll 400 moving with respect to the contact surfaces 410.

Figure 5C:
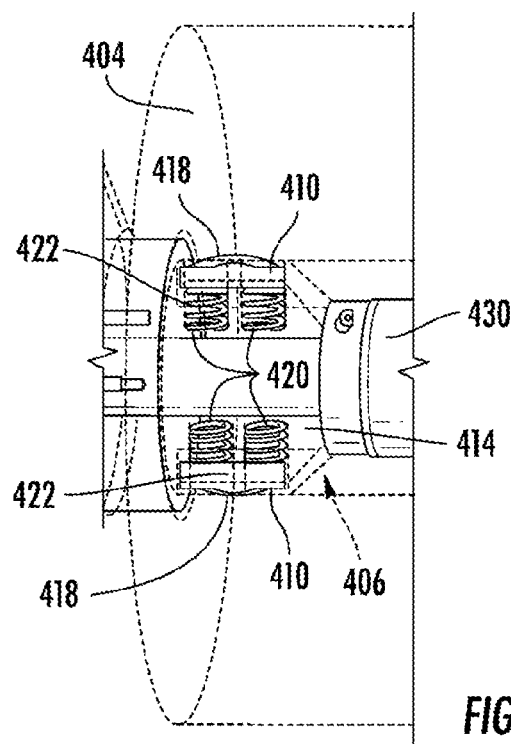
FIGS. 5C and 5D depict views of a portion of the spindle system shown in FIG. 5A, in accordance with the embodiments described herein.
Figure 5D:
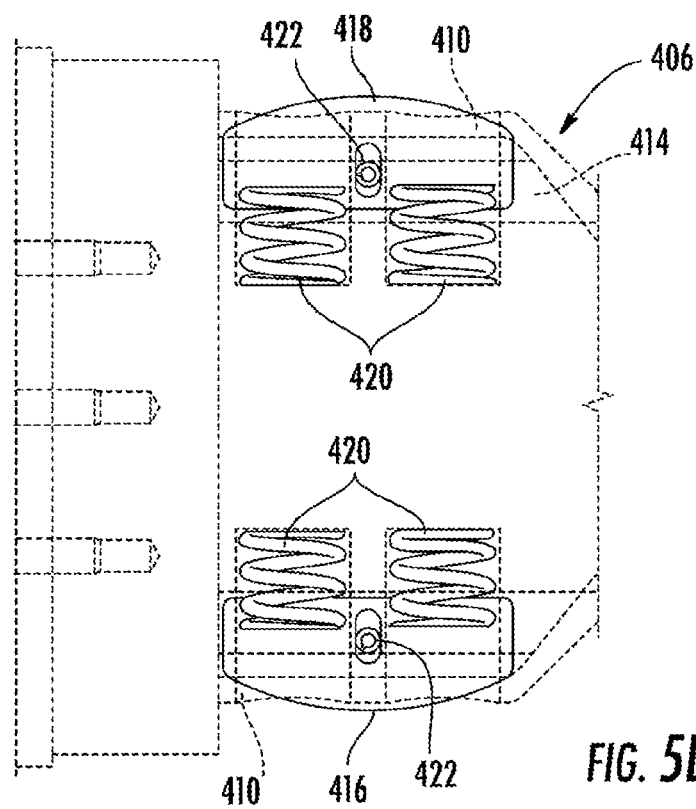

In the particular embodiment depicted in FIGS. 5A, 5C, and 5D, the engagement devices 418 are biased away from the axis of rotation of the proximal wing 406 into the inner diameter of the core of the roll 400. The engagement devices 418 are biased by biasing mechanisms 420 outward away from the axis of rotation of the proximal wing 406. In the depicted embodiment, the biasing mechanisms 420 are compression springs. In other embodiments, the biasing mechanisms 420 may be any other type of spring or any other mechanisms capable of biasing the engagement devices 418. The movement of the engagement devices 418 is restricted by pins 422 in the proximal wing 406, that limit how far outwardly the biasing mechanisms 420 can move the engagement devices 418 away from the axis of rotation and how far inwardly the engagement devices 418 can be forced inwardly toward the axis of rotation. When the roll 400 is not located on the proximal wing 406 (as is shown in FIG. 5D), the biasing mechanisms 420 are able to force the biasing mechanisms 420 outwardly as far as the pins 422 permit. When the roll is located on the proximal wing 406 (as is shown in FIG. 5C), the core of the roll 400 pushes back on the engagement devices 418 so that the engagement devices 418 are in contact with the core and the engagement devices 418 are biased into core by the biasing mechanisms 420.

As is discussed in greater detail below, the foam-in-bag system 100 is capable of using film rolls of different widths. The embodiment of the spindle system 402 depicted in FIG. 5A also includes a number of features for convenience in adjusting the spindle system 402 to accommodate different widths of rolls. These features may also reduce the amount of time and/or labor to remove components of the spindle system 402 for servicing of the foam-in-bag system 100 and/or the spindle system 402.

The spindle system 402 includes an end cap 424 located on the distal end of the rod 404. The end cap 424 is spherical in the depicted embodiment, but could be in the form of a disc, a cube, a rectangular prism, or any other shape. The end cap 424 is configured to prevent the distal wing 408 from unintentionally sliding off the distal end of the rod 404. In some embodiments, the end cap 424 is releasably coupled to the rod 404. In one example, the rod 404 includes a threaded stud extending axially from the distal end of the rod 404 and the end cap 424 includes a threaded bore that is configured to engage the threaded stud on the distal end of the rod 404. The end cap 424 can be removed during servicing of the foam-in-bag system 100 to permit the distal wing 408 and the proximal wing 406 to be removed from the rod 404.

The spindle system 402 also includes a distal ring clamp 426. The distal ring clamp 426 is releasably clampable to the rod 404. The distal ring clamp 426 is configured to prevent the distal wing 408 from sliding toward the proximal end of the rod 404. In some embodiments, the distal ring clamp 426 can be clamped and unclamped without the use of tools. In the instance shown in FIG. 5A, the distal ring clamp 426 is clamped to the rod 404 such that the distal wing 408 is between the end cap 424 and the distal ring clamp 426. In this position, the distal wing 408 is substantially as far from the proximal wing 406 as the end cap 424 will permit. In other instances, the roll 400 may be not as wide as shown in FIG. 5A. In those instances, the distal wing 408 may need to be closer to the proximal wing 406 for the roll 400 to fit on the distal wing 408 and the proximal wing 406. To accommodate this positioning, a user may unclamp the distal ring clamp 426, move the distal ring clamp 426 closer to the proximal wing 406, and then clamp the distal ring clamp 426 on the rod 404. This repositioning of the distal ring clamp 426 permits the distal wing 408 to move closer to the proximal wing 406 to accommodate a narrower roll of film. The distal ring clamp 426 can be unclamped and removed during servicing of the foam-in-bag system 100 to permit the distal wing 408 and the proximal wing 406 to be removed from the rod 404.

The spindle system 402 also includes a proximal ring clamp 428. The proximal ring clamp 428 is releasably clampable to the rod 404. The proximal ring clamp 428 is configured to prevent the proximal wing 406 from sliding toward the distal end of the rod 404 and to keep the proximal wing 406 operatively coupled to the motor inside the housing 194. In some embodiments, the proximal ring clamp 428 can be clamped and unclamped without the use of tools. The proximal ring clamp 428 can be unclamped and removed during servicing of the foam-in-bag system 100 to permit the proximal wing 406 to be removed from the rod 404. Coupled to the proximal ring clamp 428 is a roll guide 430. The roll guide 430 is located around the rod 404. In the depicted embodiment, the roll guide 430 is conical with the distal end of the roll guide 430 having a diameter that is less than a diameter of the proximal end of the roll guide 430. As the roll 400 is loaded onto the spindle system 402, the proximal end of the roll 400 contacts the roll guide 430 near the distal end of the roll guide 430 and the roll guide 430 guides the roll towards axial alignment with the proximal wing 406 as the roll 400 continues to be moved toward the proximal wing 406.

As noted above, the depicted embodiment of the proximal wing 406 includes engagement devices 418 on the contact surfaces 410. The engagement devices 418 are configured to engage the inner surface of the core of the roll 400 and to deter rotation of the roll 400 with respect to the proximal wing 406. While the engagement devices 418 may deter relative rotation of the roll 400 and the proximal wing 406, the contact surfaces 410 and 412 and the engagement devices 418 may not sufficiently deter axial translation of the roll 400 toward the distal end of the rod 404. In the depicted embodiment, one of the contact surfaces 412 of the distal wing 408 includes a releasable clip 432. When the roll 400 is loaded on the spindle system 402, the releasable clip 432 is configured to contact the distal end of the roll 400 to deter axial movement of the roll 400 towards the distal end of the rod 404. In some embodiments, the releasable clip 432 is contoured to automatically retract as the roll 400 is loaded on the spindle system 402 and to extend into the position shown in FIG. 5A after the roll 400 is loaded on the spindle system 402.

Figures 6A, 6B:
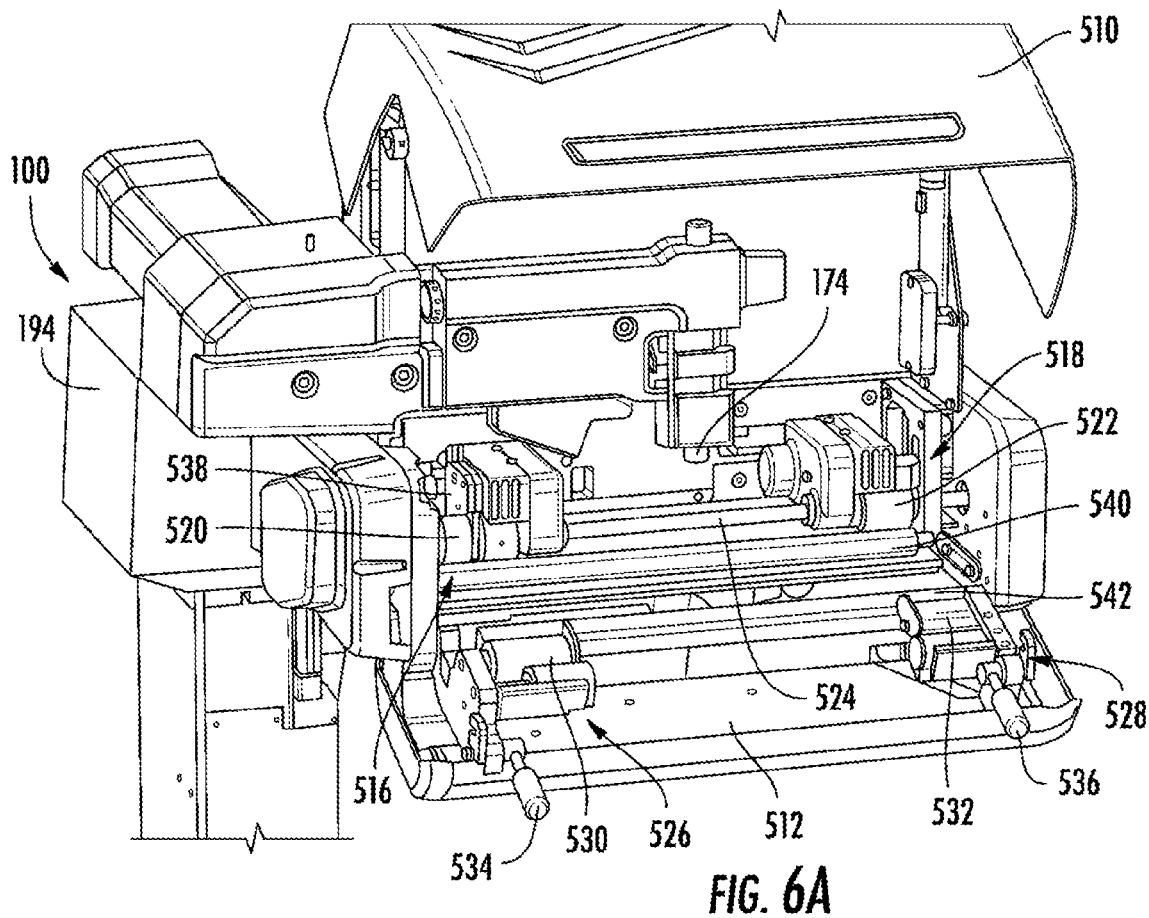
FIGS. 6A and 6B depict front and rear perspective views, respectively, of a foam-in-bag system arranged to accommodate a wide roll, in accordance with the embodiments described herein.
Figure 6C:
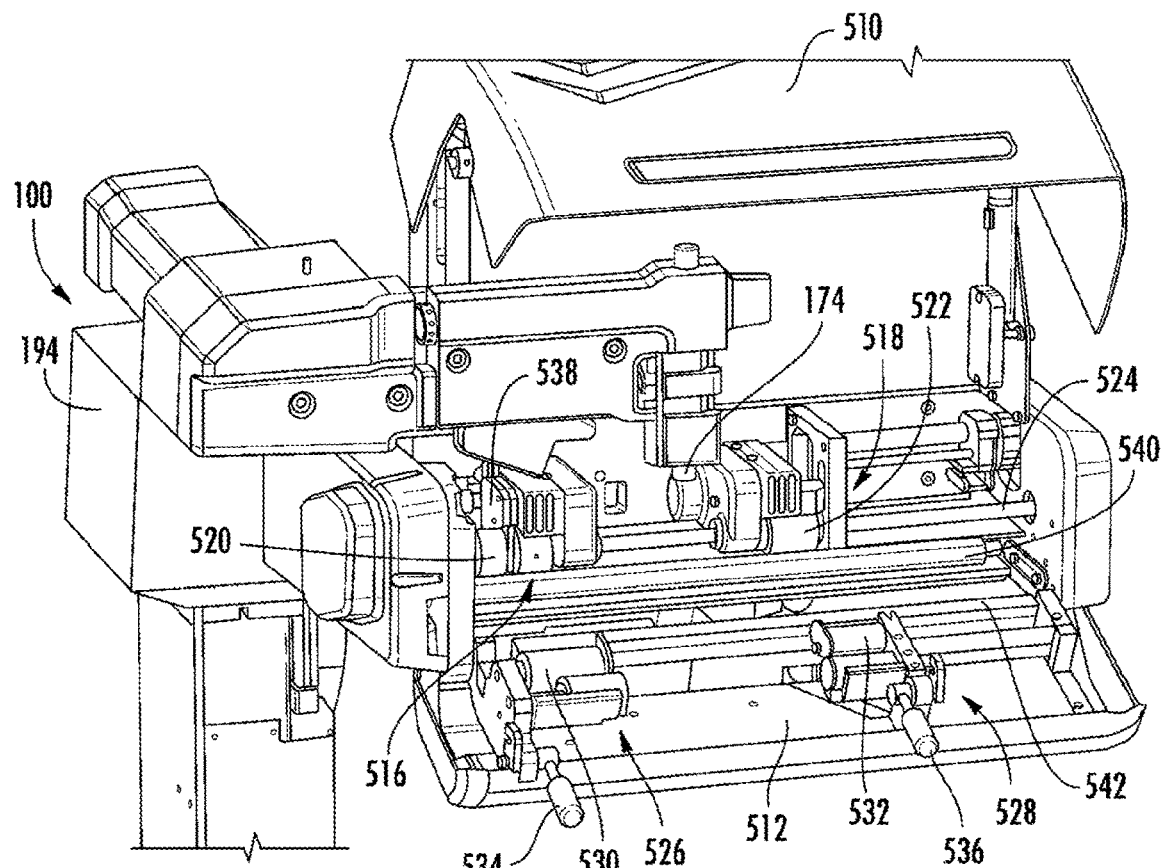
FIGS. 6C and 6D depict front and rear perspective views, respectively, of the foam-in-bag system shown in FIGS. 6A and 6B arranged to accommodate a narrow roll, in accordance with the embodiments described herein.
Figure 6D:
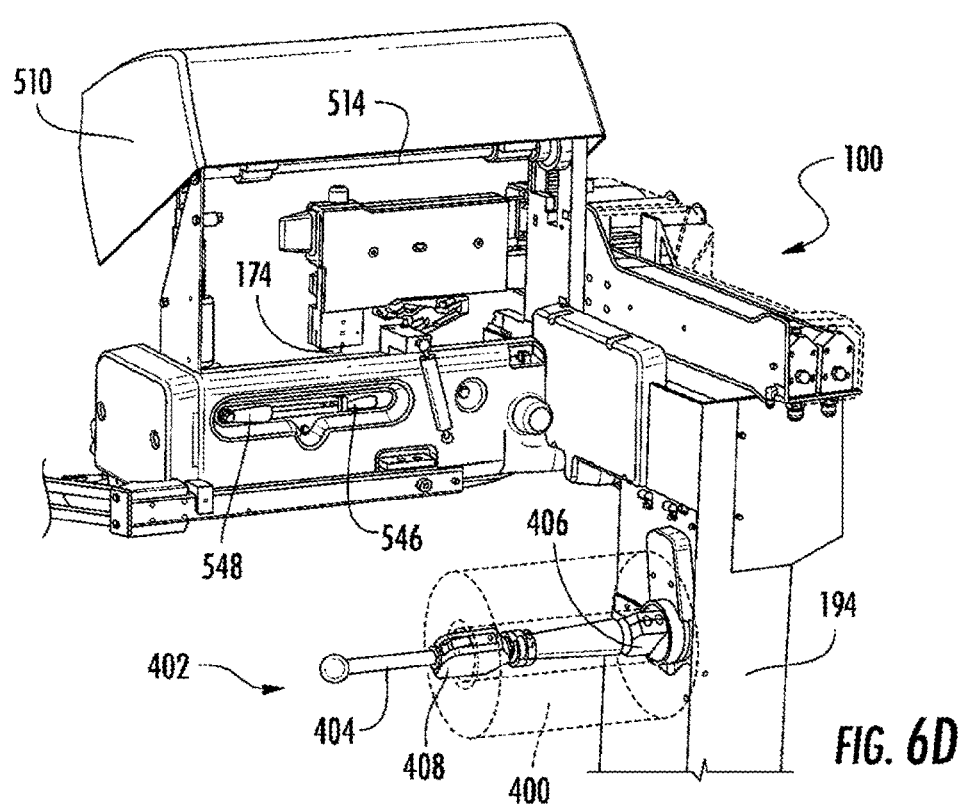

As noted above, the foam-in-bag system 100 can accommodate different widths of the roll 400. Examples of different widths of the roll 400 on the foam-in-bag system 100 are shown in FIGS. 6A to 6D. More specifically, FIGS. 6A and 6B depict front and rear perspective views, respectively, of the foam-in-bag system 100 arranged to accommodate a wide roll and FIGS. 6C and 6D depict front and rear perspective views, respectively, of the foam-in-bag system 100 arranged to accommodate a narrow roll. The foam-in-bag system 100 includes a front upper cover 510 and a front lower cover 512 that are shown in a servicing orientation in FIGS. 6A and 6C. During ordinary operation, the front upper and lower covers 510 and 512 are typically closed to prevent interference with the operation of the foam-in-bag system 100 and to improve user safety. However, in the servicing orientation shown in FIGS. 6A and 6C, a user can view and change components of the foam-in-bag system 100 (e.g., change positions of the components, replace components, etc.).

The foam-in-bag system 100 is configured to form bags from film withdrawn from the roll 400. In some embodiments, the film includes a ply of film that has been longitudinally folded so that the longitudinal fold is located at the distal side of the roll 400 and the two longitudinal edges are located at the proximal side of the roll 400. In the depicted embodiment, the film is fed from the roll 400 over a tensioner (e.g., a dancer bar, a fixed bar, etc.) and then downward past the dispenser 174. The longitudinal edges at the proximal side of the film are separated before the film passes the dispenser 174 so that one side of the film passes in front of the dispenser 174 and the other side of the film passes behind the dispenser 174. As will be described in greater detail below, the foam-in-bag system 100 creates a longitudinal seam in the open sides of the film after the film has passed the dispenser 174, the foam-in-bag system 100 creates a transverse seal in the film to form a bottom of the bag, and the dispenser 174 dispenses chemical precursors into the film which foam up to form foam in a bag created from the film. The foam-in-bag system 100 creates another transverse seam in the film to form the top of the bag. The film and its path are not depicted in FIGS. 6A to 6D so that components of the foam-in-bag system 100 are visible.

The foam-in-bag system 100 includes a proximal drive roller assembly 516 and a distal drive roller assembly 518. The proximal drive roller assembly 516 includes a driven roller 520 and the distal drive roller assembly 518 includes a driven roller 522. The driven rollers 520 and 522 are configured to be driven by a motor (not shown) to feed the film. In the depicted embodiment, the driven rollers 520 and 522 are coupled to a drive shaft 524 and the drive shaft 524 is operatively coupled to a motor located inside the housing 194. In some cases, the drive shaft 514 is keyed (e.g., D-shaped) and the driven rollers 520 and 522 are correspondingly keyed to deter rotation of the driven rollers 520 and 522 with respect to the drive shaft 514. Other components of the proximal and distal drive roller assemblies 516 and 518 that are located around the drive shaft 524 may not be keyed so that those other components of the proximal and distal drive roller assemblies 516 and 518 are not driven by the drive shaft 524.

The foam-in-bag system 100 also includes a proximal nip roller assembly 526 and a distal nip roller assembly 528. The proximal nip roller assembly 526 includes a nip roller 530 and the distal nip roller assembly 528 includes a nip roller 532. When the front lower cover 512 is closed, the nip roller 530 is arranged to back the proximal driven roller 520 and the nip roller 532 is arranged to back the distal driven roller 522. The film can be fed between the driven rollers 520 and 522 and the nip rollers 530 and 532. In some embodiments, the film is arranged such that the proximal side of the film (e.g., the side of the film with the two longitudinal edges) passes between the proximal driven roller 520 and the nip roller 530 and the distal side of the film (e.g., the side of the film with the longitudinal fold) passes between the distal roller 522 and the nip roller 532. When the drive shaft 524 is driven by the motor, the drive shaft 524 drives the driven rollers 520 and 522 to rotate in the same direction. The interaction of the driven rollers 520 and 522 and the nip rollers 530 and 532 causes the nip rollers 530 and 532 to rotate in the opposite direction. The counter-rotating driven rollers 520 and 522 and nip rollers 530 and 532 advance the film along a feed path.

In the depicted embodiment, the proximal nip roller assembly 526 includes a clamping mechanism 534 and the distal nip roller assembly 528 includes a clamping mechanism 536. The clamping mechanisms 534 and 536 are configured to be clamped after the front lower cover 512 is closed to hold the nip rollers 530 and 532 in position against the driven rollers 520 and 522 and to prevent the front lower cover 512 from opening inadvertently. In some embodiments, the clamping mechanism 534 is configured to be selectively clamped to the housing 194, to a component fixedly coupled to the housing 194, or to the proximal drive roller assembly 516. In some embodiments, the clamping mechanism 536 is configured to be selectively clamped to the distal drive roller assembly 518. In the depicted embodiment, the clamping mechanisms 534 and 536 are levers that are coupled to brackets and the brackets are arranged to engage a portion of one of the housing 194, a component fixedly coupled to the housing 194, the proximal drive roller assembly 516, or the distal drive roller assembly 518. In other embodiments, the clamping mechanisms 534 and 536 can be any other mechanism that is capable of being selectively clamped.

In the depicted embodiment, a longitudinal sealer 538 is located with the proximal driven roller 520. The longitudinal sealer 538 is configured to create a longitudinal seal in the film as the film passes between the proximal driven roller 520 and the nip roller 530. In some embodiments, the longitudinal sealer 538 includes a heating element configured to be heating to a temperature that causes a heat seal to be formed between the two plies of film. In this way, the longitudinal sealer 538 is configured to form a longitudinal seal near the two longitudinal edges of the film to form the side of the bags. Specific new embodiments of longitudinal heat sealers are discussed below. Other embodiments of heat sealers are already known in the art and are readily available to those skilled in the art.

The foam-in-bag system 100 is also configured to form transverse seals in the film to form the tops and bottoms of bags and to make transverse cuts in the film to separate bags. In the depicted embodiment, the foam-in-bag system 100 includes a seal and cut jaw 540 located below the drive shaft 524. The foam-in-bag system 100 also includes a backing jaw 542 on the front lower cover 512. When the front lower cover 512 is closed, the backing jaw 542 is aligned with the seal and cut jaw 540 so that the transverse width of the film passes between the seal and cut jaw 540 and the backing jaw 542. In some embodiments, the seal and cut jaw 540 is configured to move with respect to the backing jaw 542 so that the seal and cut jaw 540 can be moved toward the backing jaw 542 to form transverse seals and/or transverse cuts in the film and the seal and cut jaw 540 can be moved away from the backing jaw 542 to allow a bag to pass between the seal and cut jaw 540 and the backing jaw 542. In some cases, the seal and cut jaw 540 can be pulled back from the backing jaw 542 a sufficient distance to permit a bag having chemical precursor and/or resulting foam inside to pass between the seal and cut jaw 540 and the backing jaw 542. While it has been described here as the seal and cut jaw 540 only moving, it will be appreciated that any respective movement of the seal and cut jaw 540 and the backing jaw 542 is possible to accomplish the same outcome, such as movement of both the seal and cut jaw 540 and the backing jaw 542 toward and away from each other or movement of the backing jaw only toward and away from the seal and cut jaw 540. In some embodiments, the seal and cut jaw 540 includes three heating elements that are substantially parallel to each other: two sealing heating elements arranged transversely and a cutting element arranged transversely between the two sealing heating elements. When the film is clamped between the seal and cut jaw 540 and the backing jaw 542, the two sealing heating elements form a top transverse seal in one bag and a bottom transverse seal in a subsequent bag and the cutting heating element cuts the film transversely between the top and bottom transverse seals.

As can be seen when comparing the instance of the foam-in-bag system 100 shown in FIGS. 6A and 6B to the instance of the foam-in-bag system 100 shown in FIGS. 6C and 6D, the foam-in-bag system 100 is able to accommodate rolls 400 of film having different widths. One advantage to the embodiment of the foam-in-bag system 100 described herein is the reduced amount of time and effort required to adjust the foam-in-bag system 100 to accommodate a different width of the roll 400 as compared to existing foam-in-bag machines. Existing foam-in-bag systems are center-justified with the chemical dispenser arranged in a central, fixed position. The remaining components, such as edge seals, rollers, venting mechanisms, and the like, must be reconfigured or replaced around the central position of the chemical dispenser. Such reconfigurations can be time consuming and require significant effort. In addition, the reconfigurations may require additional parts, such as replacement assemblies that are used for different widths of film. The cost of the additional parts and the energy and space to inventory such additional parts increases the difficulty in this type of a reconfiguration. Moreover, existing foam-in-bag systems include computing devices that control their operations; however, the computing devices in existing foam-in-bag systems do not automatically account for mechanical reconfigurations. For example, a foam-in-bag system may be set up to feed film with a 19-inch transverse width and to control dispensing so that bags are filled with foam to 80% of capacity. The foam-in-bag system may then be adjusted by a user to feed film with a 12-inch transverse width. If the control system is not likewise adjusted, the foam-in-bag system will dispense the same about of chemical precursor into the 12-inch wide bag as it dispensed to fill 19-inch wide bags to 80% of capacity, resulting in an overfill of the 12-inch wide bags.

In the embodiment of the foam-in-bag system 100, one advantage of the foam-in-bag system 100 is that reconfiguration of the foam-in-bag system 100 for different widths of the roll 400 is less time-consuming and requires less effort than other existing foam-in-bag systems. In particular, the foam-in-bag system is not center-justified, but side-justified to the proximal side of the film regardless of the width of the film. More specially, as can be seen when comparing FIGS. 6A and 6B to FIGS. 6C and 6D, the proximal wing 406 of the spindle system 402, the proximal drive roller assembly 516, and the proximal nip roller assembly 526 are configured to be in the same position regardless of the width of the roll 400 and the film. In contrast, as can be seen when comparing FIGS. 6A and 6B to FIGS. 6C and 6D, the distal wing 408, the distal drive roller assembly 518, and the distal nip roller assembly 528 are configured to be moved to different positions based on the width of the roll 400 and the film. It will be apparent to those skilled in the art that the foam-in-bag system could also be side-justified to the distal side of the film if desired.

In some embodiments, the distal wing 408, the distal drive roller assembly 518, and the distal nip roller assembly 528 are positionable by a user without the use of tools. As discussed above with respect to FIG. 5A, the distal wing 408 is transversely positionable along the rod 404 by releasing the distal ring clamp 426, repositioning the distal wing 408, and then clamping the distal ring clamp 426 again. The distal drive roller assembly 518 is transversely positionable along the drive shaft 524. In the depicted embodiment, the distal drive roller assembly 528 is selectively held in place by a cam handle 546 located in a slot 548 of the housing 194. The distal drive roller assembly 518 is transversely positionable along the drive shaft 524 by releasing the cam handle 546, repositioning the distal drive roller assembly 518, and then clamping the cam handle 546 again. The distal nip roller assembly 528 is positionable transversely along the front lower cover 512. In the depicted embodiment, when the front lower cover 512 is closed, the clamping mechanism 536 is configured to be clamped to a portion of the distal drive roller assembly 518. In this way, the clamping of the clamping mechanism 536 to the distal drive roller assembly 528 holds the distal nip roller assembly 528 in a transverse corresponding to the transverse position of the distal drive roller assembly 518.

The transverse position of the chemical dispenser 174 can be fixed or adjustable. In some embodiments, the dispenser 174 is fixed in a position that is within the range of the narrowest possible width of film. In some embodiments, the dispenser 174 can be moved manually during the reconfiguration of the distal wing 408, the distal drive roller assembly 518, and the distal nip roller assembly 528. In some embodiments, the foam-in-bag system 100 includes a sensor to detect the transverse position of one or more of the distal wing 408, the distal drive roller assembly 518, and the distal nip roller assembly 528, and to automatically move the dispenser to a particular transverse location (e.g., approximately at the midpoint between the proximal and distal drive roller assemblies 516 and 518).

In the depicted embodiment, the foam-in-bag system 100 is configured automatically adjust one or more dispensing functions based on the position of an adjustable component of the foam-in-bag system 100. In one example, the foam-in-bag system 100 includes a sensor configured to detect a location of the distal drive roller assembly 518 and to control an amount of the chemical precursors dispensed from the dispenser 174 into each bag. For example, if the sensor detects that the distal drive roller assembly 518 has been moved from a location where it accommodated a 16-inch-wide film to a location where it accommodates a 12-inch-wide film, the foam-in-bag system may automatically reduce the amount of chemical precursor dispensed into each bag by 25%. It will be apparent to those skilled in the art that the percent change in the amount of chemical precursor dispensed may or may not be the same as the percent change in the width of the film indicated by the movement of the distal drive roller assembly 518. It will also be apparent that the sensor may detect movement of any component, such as the distal wing 408, the distal drive roller assembly 518, or the distal nip roller assembly 528.

Figure 7A:
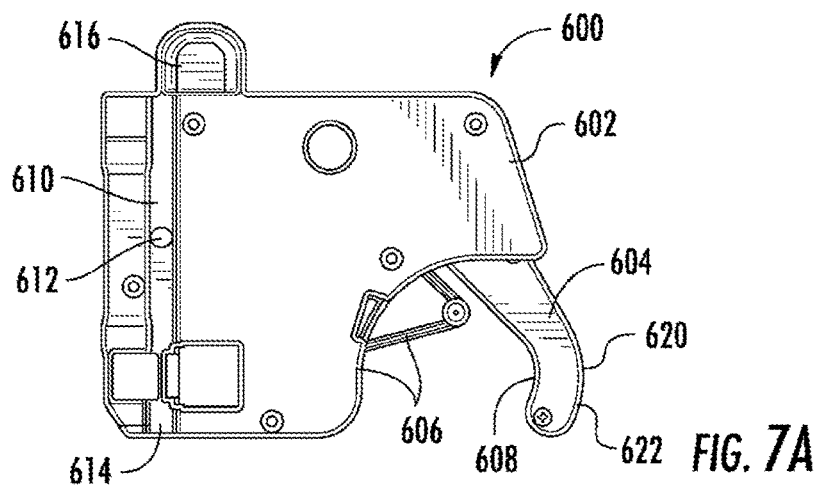
FIGS. 7A, 7B, and 7C depict side, perspective, and cross-sectional perspective views, respectively, of an embodiment of the longitudinal sealer that can be used in a foam-in-bag system to form longitudinal seals in film, in accordance with the embodiments described herein.
Figure 7B:
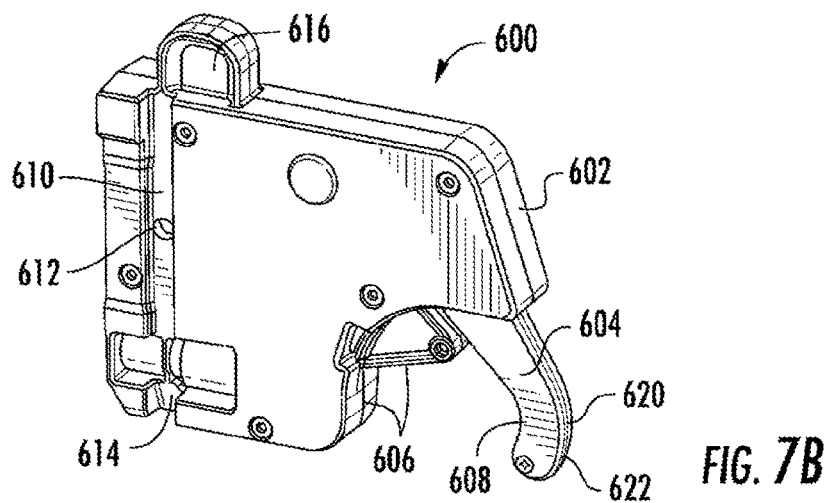
Figure 7C:
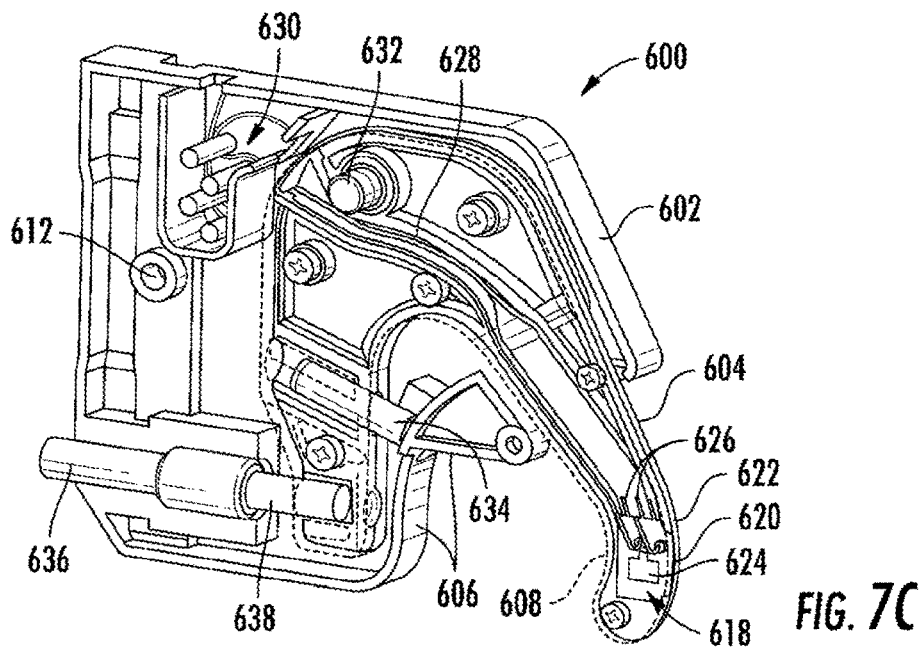

Depicted in FIGS. 7A, 7B, and 7C are side, perspective, and cross-sectional perspective views of an embodiment of the longitudinal sealer 600 that can be used to form longitudinal seals in film. For example, the longitudinal sealer 600 can be used as the longitudinal sealer 538 in the embodiment shown in FIGS. 6A to 6D. The longitudinal sealer 600 includes a housing 602 and an arm 604. In some embodiments, the exteriors of the housing 602 and the arm 604 are made from a plastic material or another resilient material. The arm 604 extends from the housing 602. In some embodiments, the arm 604 is capable of moving with respect to the housing 602.

In some embodiments, the longitudinal sealer 600 is placed at least partly around a shaft (e.g., drive shaft 524). In the depicted embodiment, the housing 602 is shaped with surfaces 606 and the arm 604 is shape with an interior surface 608. The surfaces 606 and the interior surface 608 are configured to accommodate at least a portion of the shaft between a portion of the housing 602 and a portion of the arm 604. The sizes and orientations of the surfaces 606 and the interior surface 608 may be selected based on a size of the shaft.

In some embodiments, the longitudinal sealer 600 is configured to be installed in and removed from a foam-in-bag system by a user manually without the use of tools. In the depicted embodiment, the housing 602 includes slots 610—one of which is visible in FIGS. 7A and 7B and the other of which is on the opposite side of the housing 602 and not visible in FIGS. 7A and 7B—that can be used to slide the longitudinal sealer 600 into place in the foam-in-bag system. For example, the foam-in-bag system may have a C-shaped bracket configured such that the portion of the housing 602 between the slots 610 is capable of being slid in the gap of the C-shaped bracket with the ends of the C-shaped bracket located in the slots 610. One of the slots 610 includes a bore 612 that is capable of engaging a pin, such as a spring-loaded pin on the C-shaped bracket. That one of the slots 610 also includes a pin engagement surface 614 near the bottom of the housing 602. The pin engagement surface 614 is configured such that, as the housing 602 is slid into the C-shaped bracket, the pin engagement surface 614 engages the pin in its fully extended position and pushes the pin back so that the pin accommodates the slot 610 and then is automatically engaged into the bore 612. In this way, a user can install the longitudinal sealer 600 manually without tools by sliding the longitudinal sealer 600 into the C-shaped bracket until the pin locks into the bore 612. To remove the longitudinal sealer 600 from the C-shaped bracket, a user pulls the pin back out of the bore 612 and then lifts the longitudinal sealer 600 from the C-shaped bracket so the slot 610 is withdrawn from the C-shaped bracket. To aid a user in installing and/or removing the longitudinal sealer 600, the housing 602 includes a tab 616 that is convenient for a user to grasp when installing and/or removing the longitudinal sealer 600.

The arm 604 of the longitudinal sealer 600 includes a heating element 618. The heating element 618 is configured to be heated to a temperature at which a heat seal is formed in film when the film comes into contact with the heating element 618. In some embodiments, the heating element 618 includes a resistive heater that generates heat in response to electrical current being passed through the resistive heater and the temperature of the resistive heater can be controlled by controlling the amount of electrical current that is passed through the resistive heater. In some embodiments, the heating element 618 is made from a ceramic material, such as one or more of a crystalline oxide, nitride or carbide material, an aluminum oxide, a silicon carbide, or a tungsten carbide. The heating element 618 has a leading edge 620 that is exposed through an exterior surface 622 of the arm 604. When the heating element 618 is heated, the exposed leading edge 620 is capable of forming a heat seal in film that passes along the exterior surface 622 of the arm 604. In some embodiments, the area of the leading edge 620 that is exposed through the exterior surface 622 of the arm 604 is selected based on a characteristic of the heat seal to be formed, such as a desired size of the heat seal to be formed, a thickness of film in which the heat seal is to be formed, a material of the film in which the heat seal is to be formed, or any other characteristic.

As noted above, the heating element 618 can be heated by passing electrical current through the heating element 618 and the temperature of the heating element 618 can be controlled by controlling the amount of electrical current passing through the heating element 618. The heating element 618 includes a temperature sensor 624. In some embodiments, the temperature sensor 624 includes one or more resistance temperature detectors (RTDs), thermocouples, thermistors, or any other type of temperature sensor. In one embodiment, the temperature sensor 624 includes a first RTD embedded within the heating element 618 and a second RTD located on an exterior surface of the heating element 618. The temperature sensor 624 is configured to generate one or more signals indicative of one or more temperatures of the heating element 618. It should be noted that the temperature sensor 624 may generate multiple signals indicated of different temperatures in the heating element 618, such as a temperature inside the heating element 618 generated by an RTD embedded in the heating element 618 and a temperature on the surface of the heating element 618 generated by an RTD located on an exterior surface of the heating element 618. In such cases, a controller can take into account the signals when determining how to control the amount of electrical current to supply to the heating element 618.

The heating element 618 includes electrical leads 626. The electrical leads 626 are electrically coupled to the heating element 618 and to the temperature sensor 624. The electrical leads 626 are configured to be coupled to wires that electrically coupled the heating element 618 and to the temperature sensor 624 to a controller (e.g., a computing device) in the foam-in-bag machine. In the depicted embodiment, the arm 604 includes a conduit 628 through which the wires can pass. The housing 602 includes a stress relief 630 through which the wires can be wound to deter the possibility of the wires becoming disconnected from the electrical leads 626. In some embodiments, the wires can pass out of the housing 602 to an electrical connector so that, when the longitudinal sealer 600 is installed in a foam-in-bag system, the electrical connector can be coupled to a mating connector of a controller in the foam-in-bag system. In other embodiments, the housing 602 can include a communication mechanism that is capable of communicating with the controller in the foam-in-bag system when the longitudinal sealer 600 is installed on the foam-in-bag system. The communication mechanism in the housing 602 can include one or more of electrical contacts on the exterior of the housing 602 that mate with electrical contacts on the foam-in-back system (e.g., on a C-shaped bracket) when the longitudinal sealer 600 is installed in the foam-in-bag system or a wireless communication mechanism (e.g., a WiFi transceiver, a Bluetooth transceiver, a NFC transceiver, an induction communication mechanism, etc.) configured to communicate with a corresponding wireless communication mechanism in the foam-in-bag system.

In the depicted embodiment of the longitudinal sealer 600, the arm 604 is capable of moving with respect to the housing 602. This movement of the arm 604 allows the leading edge 620 of the heating element 618 to be brought into contact with film and withdrawn back from contact with the film. In the depicted embodiment, the housing includes a post 632 that passes through the arm 604. The arm 604 is configured to rotate about the post 632. In some embodiments, the housing 602 permits the arm 604 to rotate within a range of less than or equal to about 2 degrees of rotation. With such a small range of rotation, the movements of the arm 604 may appear to be small linear movements with the portion of the arm 604 extending from the housing 602 appearing to move linearly toward and away from the film.

In the depicted embodiment, the longitudinal sealer 600 includes a biasing element 634 configured to bias the arm 604 to one end of the range of rotation of the arm 604. In the embodiment shown in FIG. 7C, the biasing element 634 biases the arm 604 to rotate in the clockwise direction so that the leading edge 620 of the heating element 618 is withdrawn toward the housing 602 as far as possible. In some embodiments, the biasing element 634 includes a compression spring that is under compression between the arm 604 and the housing 602.

In the depicted embodiment, the longitudinal sealer 600 also includes a plunger 636 that is capable of being moved to initiate movement of the arm 604. The plunger 636 passes through the housing 602 so that one end of the plunger 636 is outside of the housing 602. The plunger 636 includes a spring-loaded end 638 on the inside of the housing. The end of the plunger 636 outside of the housing 602 can be pushed toward the housing 602, resulting in the spring-loaded end 638 pushing the arm 604 to rotate in the counterclockwise direction and extend the leading edge 620 of the heating element 618 away from the housing 602. The arm 604 will rotate in the counterclockwise direction when the torque exerted on the arm 604 exceeds the torque applied to the arm 604 by the biasing element 634. The spring-loaded end 638 deters the plunger 636 from exerting too great a force on the arm 604, even when the plunger 636 such a force is applied to the end of the plunger 636 outside of the housing 602.

Figure 7D:
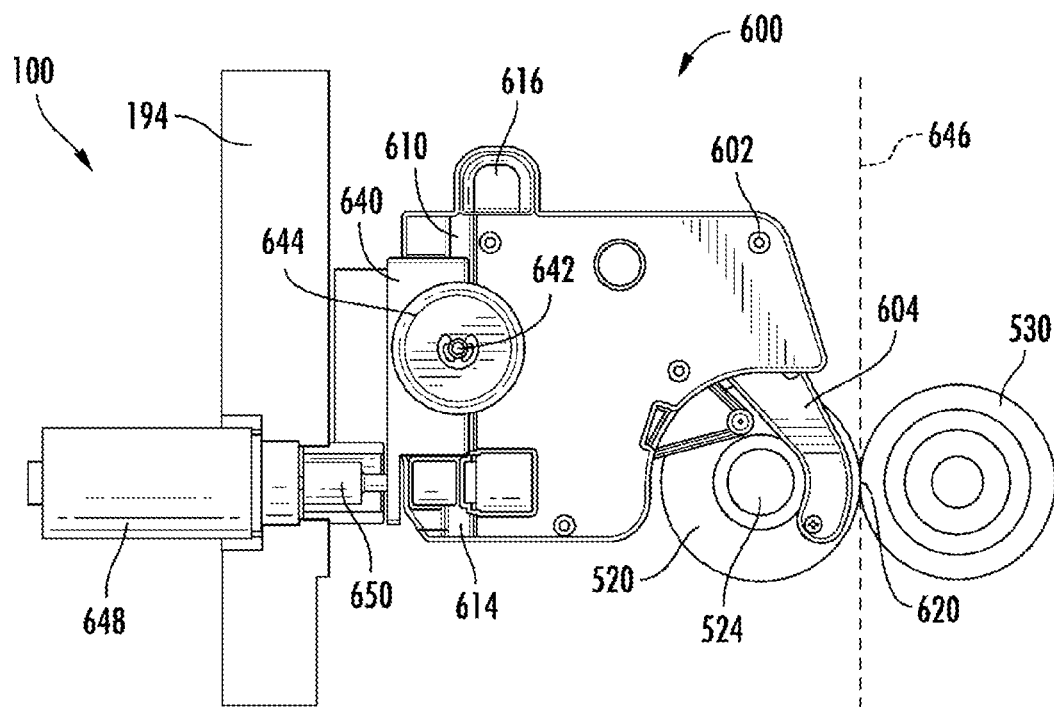
FIGS. 7D and 7E depict side and cross-sectional side views, respectively, of the longitudinal sealer with the arm retracted toward the housing and the longitudinal sealer installed in the foam-in-bag system, in accordance with the embodiments described herein.
Figure 7E:
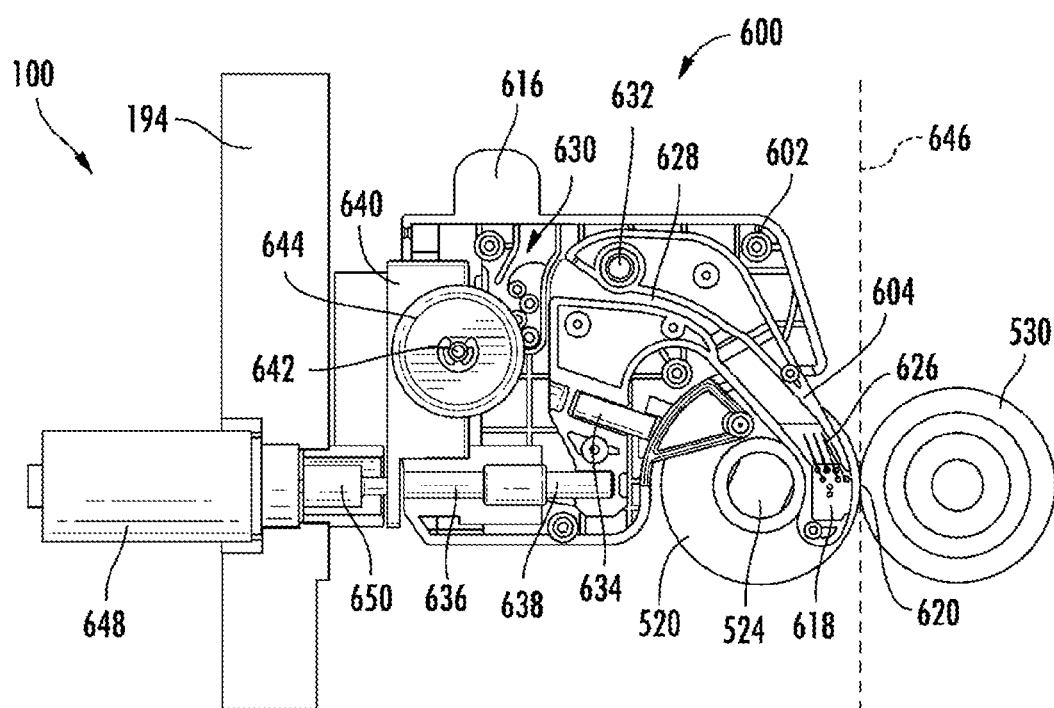
Figure 7F:
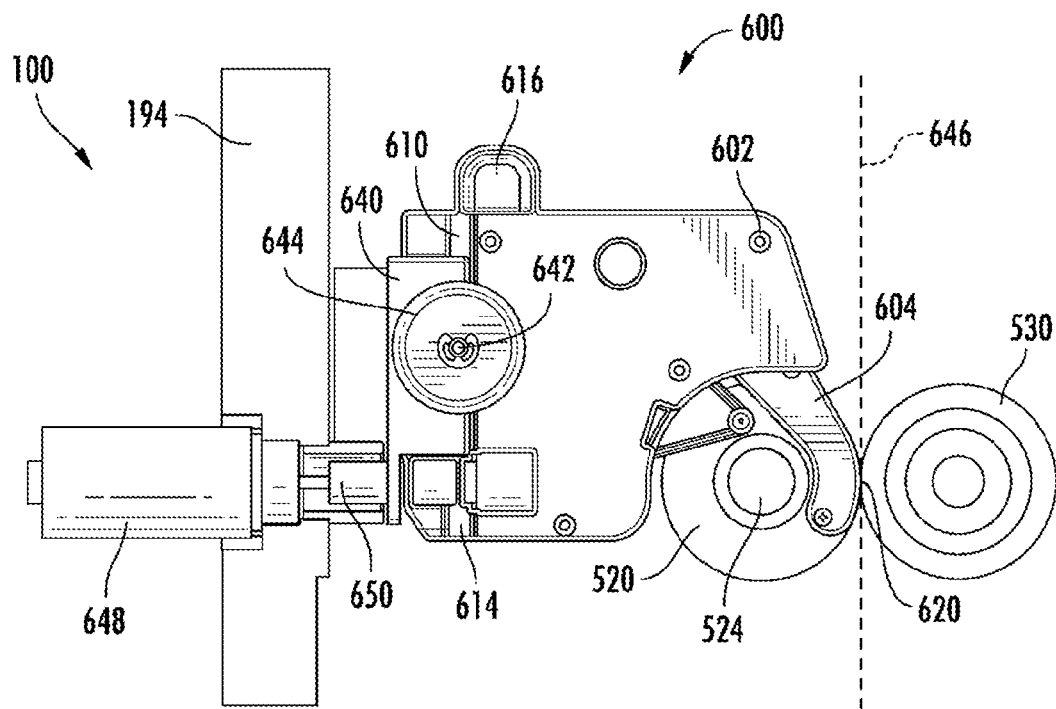
FIGS. 7F and 7G depict side and cross-sectional side views, respectively, of the longitudinal sealer with the arm extended out from the housing and the longitudinal sealer installed in the foam-in-bag system, in accordance with the embodiments described herein.
Figure 7G:
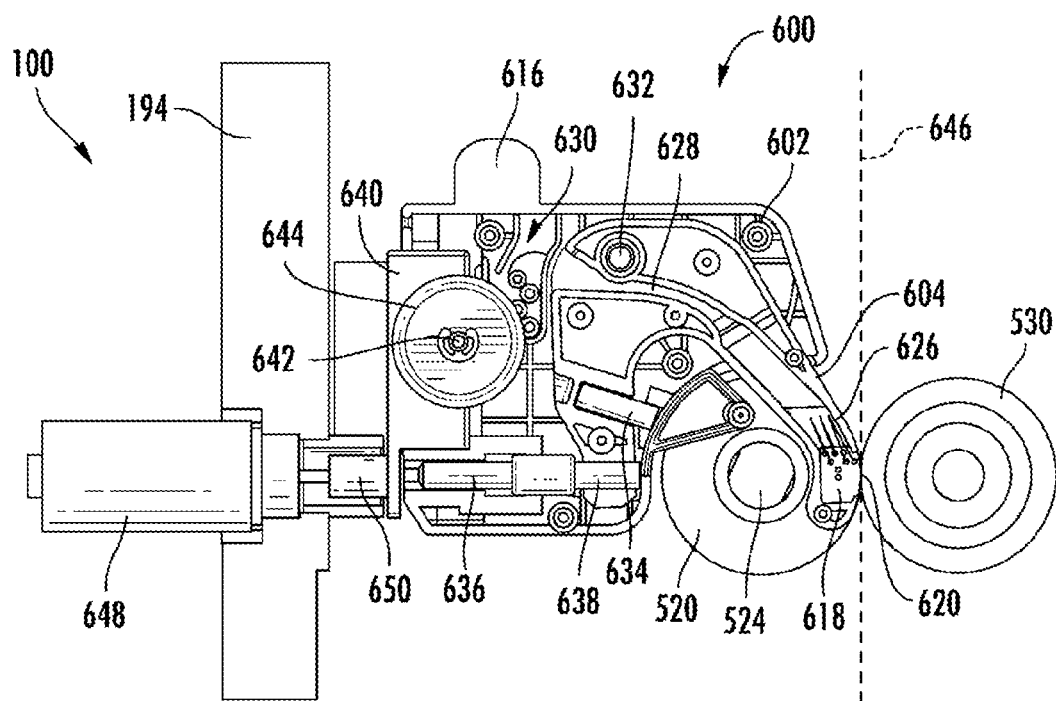

Depicted in FIGS. 7D and 7E are side and cross-sectional side views, respectively, of the longitudinal sealer 600 with the arm 604 retracted toward the housing 602 and the longitudinal sealer 600 installed in the foam-in-bag system 100. Depicted in FIGS. 7F and 7G are side and cross-sectional side views, respectively, of the longitudinal sealer 600 with the arm 604 extended out from the housing 602 and the longitudinal sealer 600 installed in the foam-in-bag system 100. In both instances, the longitudinal sealer 600 is installed in to a C-shaped bracket 640 that is fixedly coupled to the housing 194 of the foam-in-bag system 100. The ends of the C-shaped bracket 640 are arranged to engage the slots 610 of the housing 602 with the portion of the housing 602 between the slots located in the gap between the ends of the C-shaped bracket 640. The C-shaped bracket 640 includes a spring-loaded pin 642, one end of which is configured to engage the bore 612 in one of the slots 610. The other end of the spring-loaded pin 642 includes a handle 644 configured to permit a user to grasp and pull the end of the spring-loaded pin 642 out of the bore 612.

FIGS. 7D to 7G depict a film path 646 that passes between the proximal driven roller 520 and the nip roller 530. The longitudinal sealer 600 is held in place by the C-shaped bracket 640 so that a portion of the arm 604 is located in the middle of or adjacent to the proximal driven roller 520. The arm 604 is capable of being moved between a position where the leading edge 620 of the heating element 618 is not in contact with film in the film path 646 (as shown in FIGS. 7D and 7E) and a position where the where the leading edge 620 of the heating element 618 is in contact with film in the film path 646 (as shown in FIGS. 7F and 7G). In this way, the heating element 618 can be controlled to selectively contact the film in the film path 646.

In the depicted embodiment, the arm 604 is moved by an actuator 648 of the foam-in-bag system 100. The actuator 648 is fixedly coupled to the housing 194. In some embodiments, the actuator 648 may be any form of linear actuator, such as an electric motor (e.g., a solenoid) and a lead screw, a rack and pinion device, a driven cam, another electromechanical actuator, or any other type of actuator. The actuator 648 includes an actuator arm 650 that is driven linearly by the actuator 648 and is configured to engage the plunger 636 of the longitudinal sealer 600 and to exert a force on the plunger 636. In the instance shown in FIGS. 7D and 7E, either the actuator arm 650 does not contact the plunger 636 or the force exerted by the actuator arm 650 on the plunger does not result in enough torque on the arm 604 to overcome the torque exerted by the biasing element 634. In this instance, the biasing element 634 causes the arm 604 to rotate as far as permitted by the housing 602 in a direction (i.e., clockwise in the views shown in FIGS. 7D to 7G) so that the leading edge 620 of the heating element 618 is not in contact with film in the film path 646. In the instance shown in FIGS. 7F and 7G, the force exerted by the actuator arm 650 on the plunger 636 provides enough torque on the arm 604 to overcome the torque exerted by the biasing element 634. In this instance, the plunger 636 causes the arm 604 to rotate as far as permitted by the housing 602 in the opposite direction (i.e., counterclockwise in the views shown in FIGS. 7D to 7G) so that the leading edge 620 of the heating element 618 is in contact with film in the film path 646. In some embodiments, the actuator 648 is controlled by a controller (not shown), such as a controller in the foam-in-bag system 100. For example, the controller that controls the amount of electrical current provided to the heating element 618 may also control the actuator 648 so that the position of the arm 604 is controlled.

The embodiment of the longitudinal sealer 600 shown in FIGS. 7A to 7G provides a number of benefits over existing longitudinal sealers in existing foam-in-bag systems. One example of a benefit is that the longitudinal sealer 600 is capable of being controlled in a number of ways. The longitudinal sealer 600 can be controlled in one or more of the following ways: the heating element 618 is maintained within a range of a target temperature (e.g., within any one of 1° C., 2° C., or 5° C. of a target temperature), the position of the arm 604 with respect to the film path 646 can be controlled to control contact of the heating element 618 with the film, or the force exerted by the actuator 648 on the plunger 636 can be controlled to control a level of force of the heating element 618 on the film. This controllability allows the longitudinal sealer 600 to be used to form seals in the film with better quality and with better consistency than other longitudinal sealers that cannot be controlled in this way. The controllability also allows reduces the potential for the longitudinal sealer 600 to create a defect in film. For example, existing longitudinal sealers cannot be withdrawn from the film when the foam-in-bag stops forming bags and the heating element in the existing longitudinal sealers does not cool immediately, sometimes resulting in the heating element heating the stopped film until a hole forms in the film. In contrast, the arm 604 of the longitudinal sealer 600 can be moved into or out of contact with the film rapidly (e.g., within 10 milliseconds from the time at which the controller signals the actuator 648). The reduces the possibility of the heating element 618 forming a hole or other defect in the film when the film stops.

Another example of a benefit of the longitudinal sealer 600 is the durability of the longitudinal sealer 600. Existing longitudinal sealers tend to wear out from abrasion due to contact with the film. Films used in foam-in-bag situations are typically abrasive due to additives used as colorants and/or to ensure printing on the film does not easily wear off. However, the abrasiveness of the film can create wear on heating elements of longitudinal sealers when the heating elements are constantly in contact with the film and/or housings of longitudinal sealers when the housings of longitudinal sealers are not made from a robust material. In some embodiments, the heating element 618 is made from a durable ceramic material that will not wear due to prolonged contact with the film. In addition, the ability of the arm 604 to withdraw from the film when the heating element 618 is not sealing film reduces the amount of time that the heating element 618 is in contact with the film. In some embodiments, wear on the heating element 618 is reduced by the heating element 618 not being in contact with the film when the arm 604 is withdrawn from the film. Heating elements in existing foam-in-bag systems tend to wear out from overheating. The ability to control the temperature of the heating element 618 in the longitudinal sealer 600 reduces the possibility of overheating the heating element 618.

Figure 8A:
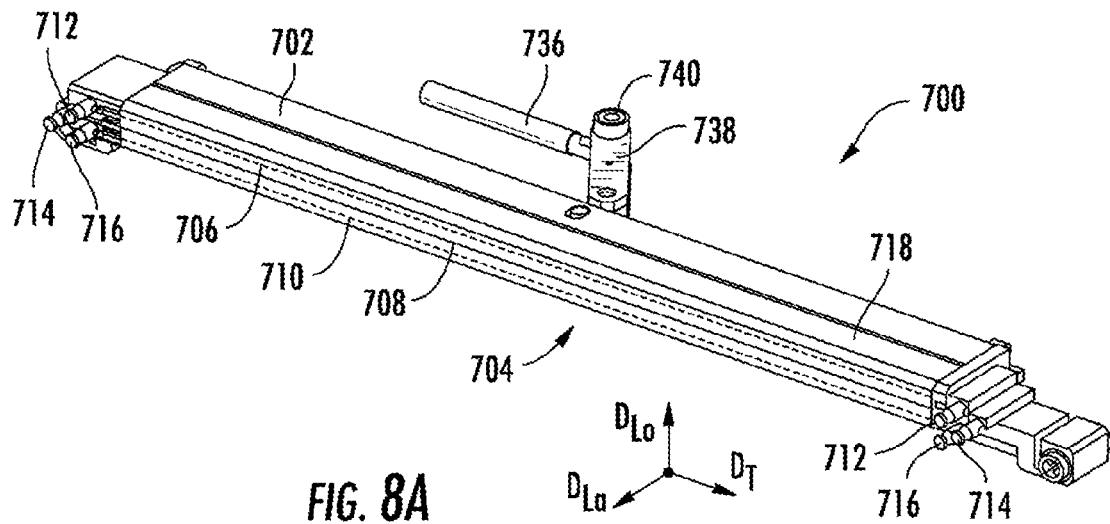
FIG. 8A depicts an embodiment of a jaw assembly that can be used to form transverse seals and cuts in film, in accordance with the embodiments described herein.

Depicted in FIG. 8A is an embodiment of a jaw assembly 700 that can be used to form transverse seals and cuts in film. For example, the jaw assembly 700 can be used as the seal and cut jaw 540 in the embodiment shown in FIGS. 6A to 6D. The jaw assembly 700 includes a bar 702. In some embodiments, the bar 702 is made from a rigid material, such as a metal (e.g., aluminum), a metal alloy, a ceramic material, a thermoset plastic material, or any other rigid material. In some embodiments, the width of the bar 702 (i.e., the dimension of the bar 702 in the transverse direction $D_T$) is selected such that the bar 702 is wider than an expected maximum transverse width of film that is to be used in a foam-in-bag system.

The bar 702 includes a lateral side 704. The jaw assembly 700 includes a first heating element 706, a second heating element 708, and a third heating element 710. In the depicted embodiment, the first, second, and third heating elements 706, 708, and 710 are arranged substantially parallel to each other in the transverse direction $D_T$ and they are spaced apart in the longitudinal direction $D_{Lo}$. The first heating element 706 is held across the lateral side 704 of the bar 702 by posts 712, the second heating element 708 is held across the lateral side 704 of the bar 702 by posts 714, and the third heating element 710 is held across the lateral side 704 of the bar 702 by posts 716. In some embodiments, the posts 712, 714, and 716 are quick-release elements that are configured to be disengaged from the bar 702 by a user by hand without the use of tools. In the case that the posts 712, 714, and 716 are quick-release elements, a user will be able to remove the posts 712, 714, and 716 to replace the heating elements 706, 708, and 710 faster than a user is able to remove and replace heating elements in existing foam-in-bag systems. In some embodiments, the posts 712, 714, and 716 fit into holes in the bar 702. In some embodiments, an end of each of the posts 712, 714, and 716 includes an electrical contact that is configured to engages with an electrical contact inside the hole in the bar 702 such that an electrical contact is made between the electrical contacts in the holes in the bar 702 and the first, second, and third heating elements 706, 708, and 710 when the posts 712, 714, and 716 are inserted into the holes in the bar 702.

Figure 8B:
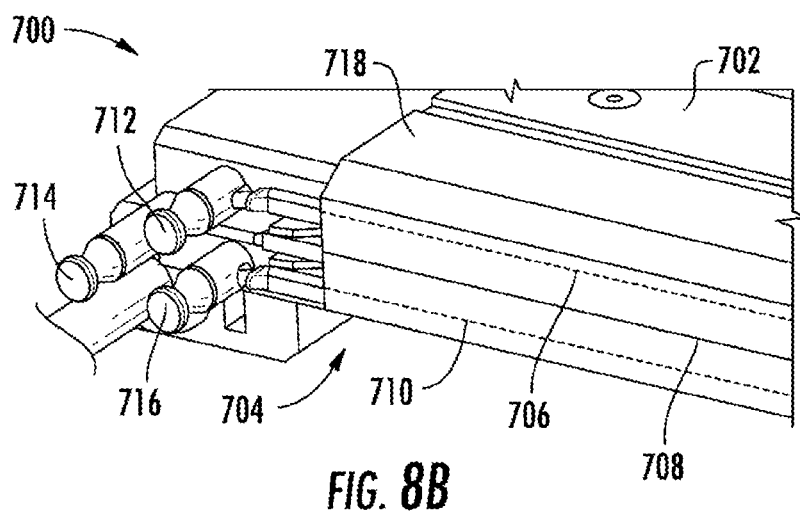
FIG. 8B depicts a partial view of this arrangement of a low-adhesion mechanism with respect to the first, second, and third heating elements in the jaw assembly, in accordance with the embodiments described herein.

The jaw assembly 700 includes a low-adhesion mechanism 718 that covers the lateral side 704 of the bar 702. The low-adhesion mechanism 718 is configured to cover at least one of the first, second, and third heating elements 706, 708, and 710. In the depicted embodiment, the first and third heating elements 706 and 710 are covered by the low-adhesion mechanism 718, while the second heating element 708 is not covered by the low-adhesion mechanism 718. A partial view of this arrangement of the low-adhesion mechanism 718 with respect to the first, second, and third heating elements 706, 708, and 710 is depicted in FIG. 8B. In this arrangement, the first and third heating elements 706 and 710 may be used to form a transverse seal in two plies of film and the second heating element 708 may be used to form a transverse cut in the two plies of film. By closing the jaw assembly 700 against a backing surface (e.g., backing jaw 542) with two plies of film in between, the third heating element 710 forms a top transverse seal between the two film plies in one film bag, the first heating element 706 forms a bottom transverse seal between the two film plies in a subsequent film bag, and the second heating element 708 makes a transverse cut in the film between the two film bags.

Low-adhesion surfaces have been used in conjunction with transverse heating elements in existing foam-in-bag systems. These low-adhesion surfaces lower the probability of film becoming jammed or stuck in the area with the transverse heating elements as cuts and seals are formed in the film. In existing foam-in-bag systems, the low-adhesion surfaces were adhered to jaw bars to avoid the issue of a molten material from a cut or a seal adhering to the jaw bars. In some examples, tape having a low-adhesion surface (e.g., polytetrafluoroethylene-coated tape) has been adhered to cover a jaw bar surface and heating elements that are used to form seals. This tape with the low-adhesion surface provided the benefits of the low-adhesion surface during normal operation. However, the tape proved cumbersome when removing and replacing the covered heating elements. More specifically, when the tape was removed, it would frequently break up into many small pieces that needed to be peeled or scratched off and leave behind adhesive residue on the jaw bar and/or the heating wires. Once the heating wires were replaced, new tape with a low-adhesion surface needed to be applied to the surface and the new heating wires. However, applying new tape was difficult to properly align and adhere, and often had air bubbles or creases that decreased the effectiveness of the low-adhesion surface.

Figure 8C:
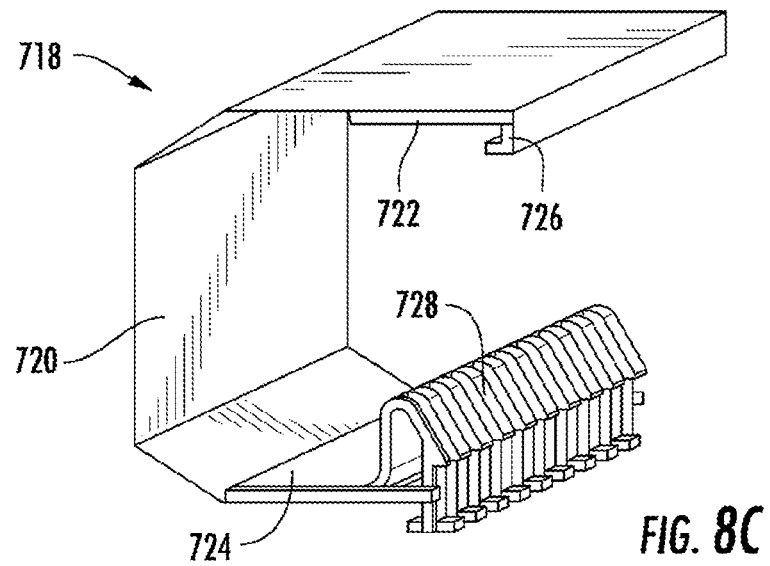
FIG. 8C depicts a view of the low-adhesion mechanism shown in FIG. 8B, in accordance with the embodiments described herein.

In the embodiment shown in FIGS. 8A and 8B, the low-adhesion mechanism 718 is a quick-change low-adhesion mechanism that overcomes the difficulties with previous attempts at low-adhesion surfaces, such as tapes with low-adhesion surfaces. The low-adhesion mechanism 718 is depicted alone in FIG. 8C. As can be seen in FIG. C, the low-adhesion mechanism 718 includes a low-adhesion material 720 that spans between a first connector 722 and a second connector 724. In the depicted embodiment, the low-adhesion material 720 is a flexible material, such as a fabric, a film, or other flexible sheet. The first and second connectors 722 and 724 are rigid or semi-rigid to enable the first and second connectors 722 and 724 to couple the low-adhesion material 720 to the bar 702. In the depicted embodiment, a distal end 726 of the first connector 722 has a U-shaped cross-section and the distal end 728 of the second connector 724 has a snap-in connector. In some embodiments, the first and second connectors 722 and 724 are make from plastic that is either injection-molded and/or extruded.

To place the low-adhesion mechanism 718 on the bar 702, the distal end 726 of the first connector 722 is secured to a protrusion and/or a groove on the top of the bar 702, the low-adhesion material 720 is wrapped around the lateral side 704 of the bar, and then the distal end 728 of the second connector 724 is snapped into a mating snap-in connector on the bottom of the bar 702. To remove the low-adhesion mechanism 718 from the bar 702, the distal end 728 of the second connector 724 is removed from the mating snap-in connector on the bottom of the bar 702, unwrapped from the lateral side 704 of the bar 702, and the distal end 726 of the first connector 722 is removed from the protrusion and/or the groove on the top of the bar 702. This method of placing the low-adhesion mechanism 718 on and removing the low-adhesion mechanism 718 from the bar 702 eliminate the problems that arose from the use of low-adhesion tape and other adhered low-adhesion surfaces, thereby greater reducing the amount of time and complexity of placing and removing the low-adhesion mechanism 718.

Figure 8D:
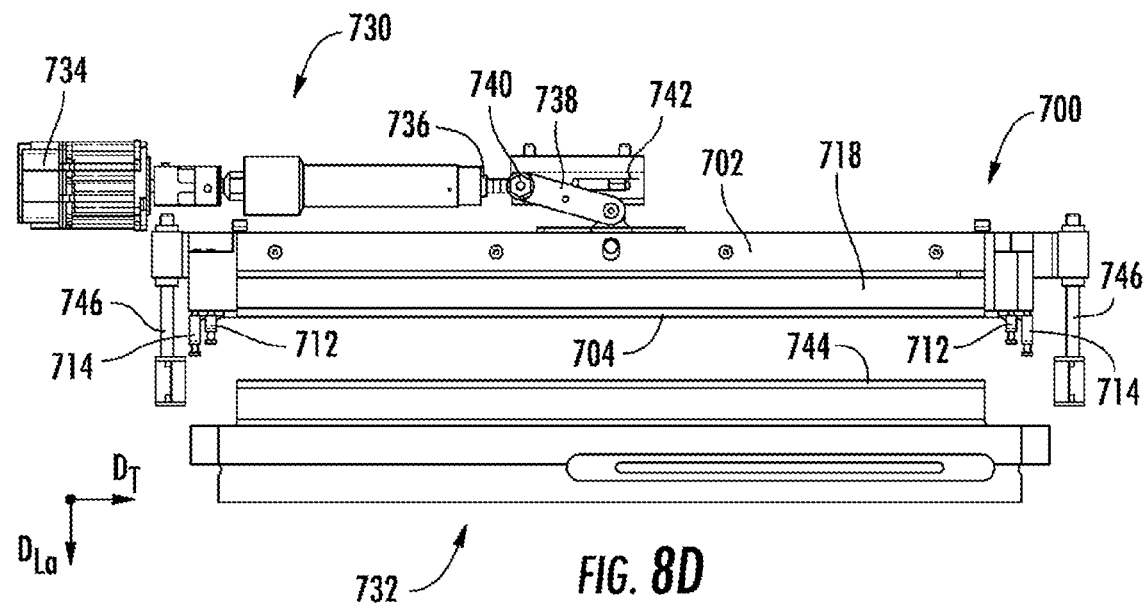
FIGS. 8D and 8E depict, respectively, a top view of the jaw assembly withdrawn from the backing jaw in a lateral direction and a top view of the jaw assembly after the jaw assembly has been moved in the lateral direction up to the backing jaw, in accordance with the embodiments described herein.
Figure 8E:
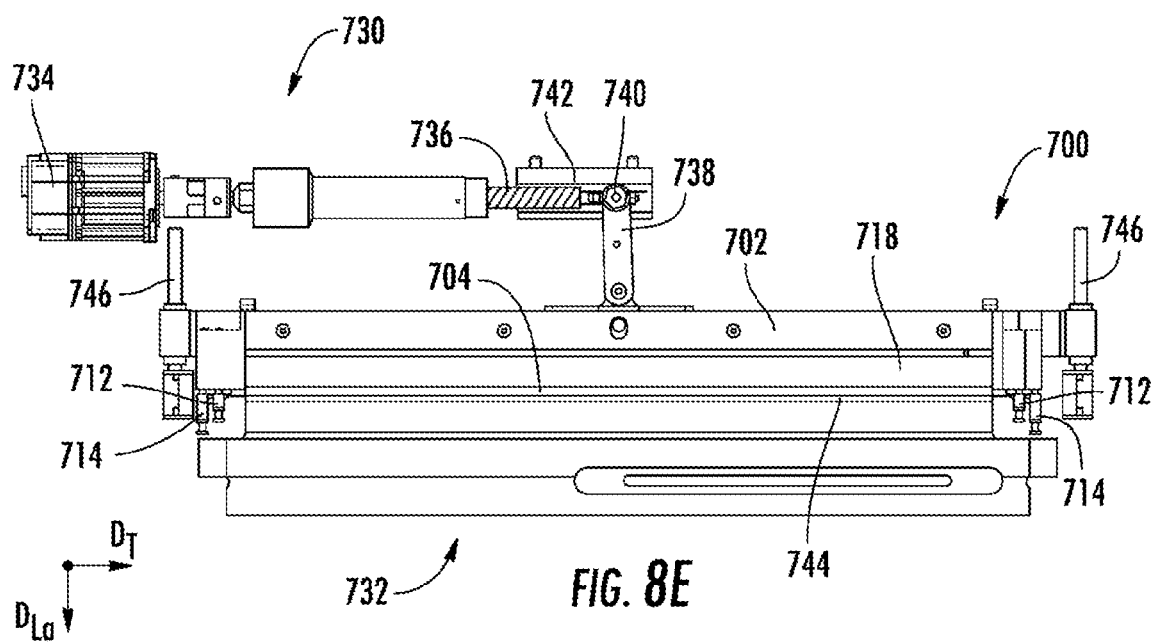

As described above, respective movement of a seal and cut jaw (e.g., the seal and cut jaw 540) and a backing jaw (e.g., the backing jaw 542) can bring the seal and cut jaw and the backing jaw together. If film is in between the seal and cut jaw and the backing jaw, the heating elements on the seal and cut jaw can be used to seal and/or cut the film. Similarly, a film can be fed between the jaw assembly 700 and a backing jaw. Respective movement of the jaw assembly 700 and the backing jaw can bring the jaw assembly 700 and the backing jaw together so that the first, second, and third heating elements 706, 708, and 710 can be used to seal and/or cut the film. An embodiment of a movement system 730 configured to move the jaw assembly 700 toward and away from a backing jaw 732 in a lateral direction $D_{La}$ is depicted in FIGS. 8D and 8E. More specifically, FIG. 8D depicts a top view of the jaw assembly 700 withdrawn from the backing jaw 732 in the lateral direction $D_{La}$ and FIG. 8E depicts a top view of the jaw assembly 700 after the jaw assembly has been moved in the lateral direction $D_{La}$ up to the backing jaw 732.

The movement system 730 includes a driving mechanism 734. In the depicted embodiment, the driving mechanism 734 is a motor configured to selectively generate a rotational force in two rotational directions (e.g., clockwise and counterclockwise). In other embodiments, the driving mechanism 734 may be an engine, a pump, or any other mechanism configured to generate a force. In the depicted embodiment, the driving mechanism 734 is coupled to a threaded rod 736. The threaded rod 736 is coupled to the driving mechanism 734 such that rotational force provided by the driving mechanism 734 will engage the thread of the threaded rod 736, causing linear translation of the threaded rod 736 in the transverse direction $D_T$. In the depicted embodiment, the threaded rod 736 will move in one linear direction (e.g., in the positive transverse direction $D_T$) when the driving mechanism 734 provides rotational force in one rotational direction (e.g., counterclockwise) and the threaded rod 736 will move in the opposite linear direction (e.g., in the negative transverse direction $D_T$) when the driving mechanism 734 provides force in the opposite rotational direction (e.g., clockwise).

The threaded rod 736 is coupled to a toggle 738. In the depicted embodiment, one side of the toggle 738 includes a roller 740 configured to move within a slot 742. The other side of the toggle 738 is rotatably connected to the bar 702 of the jaw assembly 700. Any linear movement of the threaded rod 736 in the transverse direction $D_T$ results in corresponding movement of the roller 740 in the transverse direction $D_T$. The interaction of the roller 740 in the slot 742 causes the toggle 738 to exert a force on the bar 702 to move the jaw assembly 700 toward or away from the slot 742 in the lateral direction $D_{La}$. In other embodiments, the roller 740 may be replaced by any device, such as a slider, capable of moving laterally while remaining rotatably coupled to the toggle 738.

The lateral side 704 of the jaw assembly 700 is aligned with a lateral side 744 of the backing jaw 732 such that the jaw assembly 700 can be moved between a position where the lateral side 704 of the jaw assembly 700 is withdrawn from the lateral side 744 of the backing jaw 732 (as shown in FIG. 8D) and a position where the lateral side 704 of the jaw assembly 700 is abuts the lateral side 744 of the backing jaw 732 (as shown in FIG. 8E). When film is placed between the jaw assembly 700 and the backing jaw 732 in the orientation shown in FIG. 8D, the film is permitted to be fed in the longitudinal direction $D_{Lo}$ (e.g., in a direction into the page as seen by a viewer of FIG. 8D) past the jaw assembly 700 and the backing jaw 732. When film is placed between the jaw assembly 700 and the backing jaw 732 in the orientation shown in FIG. 8E, the film is held between the jaw assembly 700 and the backing jaw 732 so that the film can be sealed and/or cut by the heating elements 706, 708, and 710 on the lateral side 704 of the jaw assembly. In the depicted embodiment, the jaw assembly 700 includes lateral guides 746 on either transverse side of the bar 702 of the jaw assembly 700 to properly guide movement of the bar 702 when the movement system 730 moves the jaw assembly laterally (e.g., to maintain alignment of the lateral side 704 of the jaw assembly 700 with the lateral side 744 of the backing jaw 732).

One advantage of the roller system shown in FIGS. 8D and 8E is a safety feature inherent in the arrangement of the movement mechanism with respect to the jaw assembly 700. When the threaded rod 736 exerts a constant force on the toggle 738 in the transverse direction $D_T$, the toggle 738 will exert a varying force on the jaw assembly 700 in the lateral direction $D_{La}$. When the jaw assembly 700 is closer to the position shown in FIG. 8D, the toggle 738 exerts a relatively low force on the jaw assembly 700 in the lateral direction $D_{La}$. When the jaw assembly 700 is closer to the position shown in FIG. 8E, the toggle 738 exerts a relatively high force on the jaw assembly 700 in the lateral direction $D_{La}$. If a foreign object is inserted between the jaw assembly 700 and the backing jaw 732 when the jaw assembly 700 is in the position shown in FIG. 8D, the closing motion of the jaw assembly 700 will exert a relatively low force on the foreign object because the toggle 738 does not exert a high force on the jaw assembly 700 until the jaw assembly 700 is close to the backing jaw 732. In some embodiments, any contact of the jaw assembly 700 with the foreign object will not result in damage to the foam-in-bag system. In addition, in some embodiments, when the foreign object is a body part of a user (e.g., a user's hand or fingers), any contact of the jaw assembly 700 with the body part will not result in significant injury to the user.

In the embodiment shown in FIGS. 8A to 8E, the second heating element 708 is on the same side of the jaws (i.e., on the lateral side 704 of the jaw assembly 700) as the first and third heating elements 706 and 710. In existing foam-in-bag systems, the transverse heating element that cuts the film (sometimes called a "cut wire") is located on the non-moving side of the jaws and the heating elements that seal the film (sometimes called "seal wires") are located on the moving side of the jaws. This design in existing foam-in-bag systems can be problematic with the cut wire on the non-moving portion of the jaw because the film can become stuck on the cut wire or the film can be jammed on the cut wire. It could also create an unintended seal midway through a bag, which could result in a foam-up situation (e.g., where the foam expands outside of the bag) or other error resulting in shut down of the machine. By placing the second heating element 708 on the moving jaw assembly 700, the foam-in-bag system 100 moves the cut wire out of the way of the film being fed to avoid jamming the film on the second heating element 708. In addition, if a bag becomes stuck on the second heating element 708 during the cutting action, the withdrawing of the jaw assembly 700 back from the natural path of the film will encourage the bag to release from the second heating element 708 without jamming the foam-in-bag system 100.

Depicted in FIGS. 9A to 9D are instances of a foam-in-bag system 810 that forms bags from film 812, fills the bags with foaming chemical precursors, and closes the bags with the foaming chemical precursors inside. In the depicted embodiment, the film 812 includes a transverse fold 814 and two longitudinal edges 816. The portion of the film 812 on one side of the transverse fold 814 passes in front of a dispenser 818 and the portion of the film 812 on the other side of the transverse fold 814 passes in back of the dispenser 818. Thus, one of the longitudinal edges 816 is in front of the dispenser 818 and the other of the longitudinal edges 816 is in back of the dispenser 818.

The foam-in-bag system 810 includes a proximal set of rollers 820 and a distal set of rollers 822 that are configured to feed the film 812. In the depicted embodiment, the proximal and distal sets of rollers 820 and 822 are configured to feed the film 812 in a downward direction. The proximal set of rollers 820 includes a longitudinal sealer (not shown), such as the longitudinal sealer 600, that forms a longitudinal seal 824 in the film 812 near the two longitudinal edges 816 to close the left side of the film 812. In the depicted embodiment, the distal set of rollers 822 does not have a longitudinal sealer because the right side of the film 812 is already closed by the transverse fold 814. In the instance shown in FIG. 9A, the closed left and rights sides of the film 812 form left and right sides of a bag 826.

The foam-in-bag system 810 also includes a front jaw assembly 828 and a rear jaw assembly 830. The film 812 is arranged to pass between the front and rear jaw assemblies 828 and 830. At least one of the front and rear jaw assemblies 828 and 830 is capable of movement toward and away from the other of the front and rear jaw assemblies 828 and 830. When the front and rear jaw assemblies 828 and 830 are brought together with the film 812 in between, the front and rear jaw assemblies 828 and 830 are capable of forming transverse seals and/or transverse cuts in the film 812. In the instance shown in FIG. 9A, the front and rear jaw assemblies 828 and 830 have already transversely cut the film 812 to form a bottom 832 of the bag 826 and created a transverse seal 834 to close the bottom 832 of the bag 826.

Figure 9A:
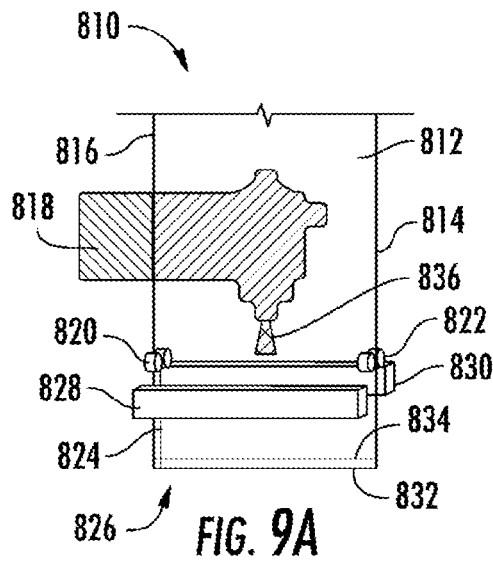
FIGS. 9A to 9D depict instances of a foam-in-bag system that forms bags from film, fills the bags with foaming chemical precursors, and closes the bags with the foaming chemical precursors inside, in accordance with the embodiments described herein.
Figure 9B:
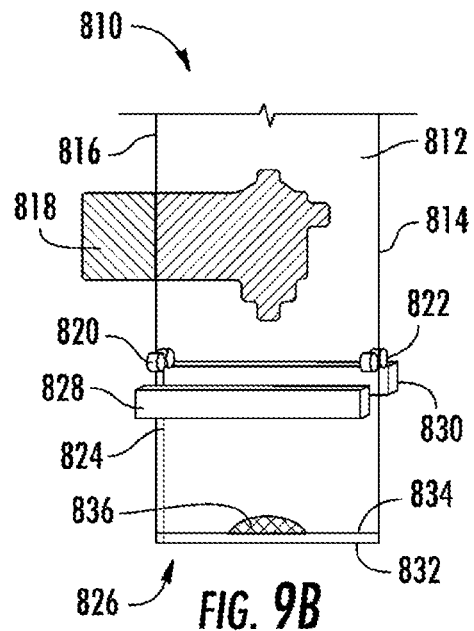

Each of FIGS. 9A to 9D depicts an instance in a series of operations by the foam-in-bag system 810. In FIG. 9A, the bottom and the left and right sides of the bag 826 have been closed. The front and rear jaw assemblies 828 and 830 are withdrawn from each other to allow the film 812 to pass. The dispenser 818 is in the process of dispensing foaming chemical precursors 836 into the bag 826. In FIG. 9A, the foaming chemical precursors 836 may have begun to mix together and form foam, but typically still in a mostly liquid state. In FIG. 9B, the foaming chemical precursors 836 have fallen to the transverse seal 834 near the bottom 832 of the bag 826. From there, the foaming chemical precursors 836 continue to form foam and grow in volume.

Figure 9C:
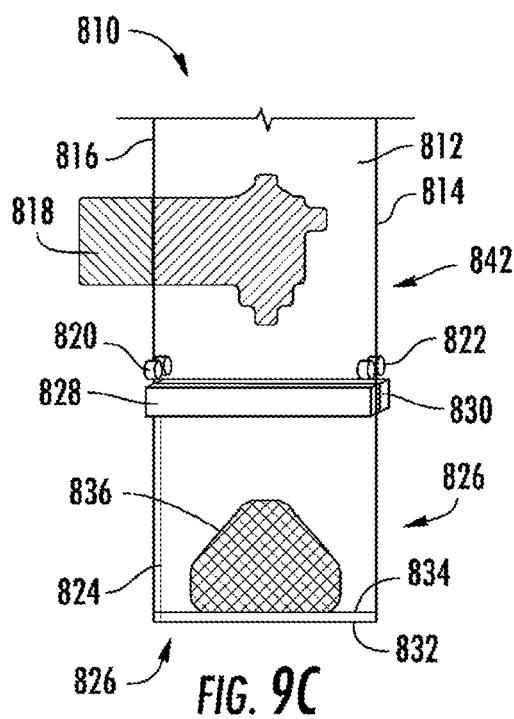

In FIG. 9C, the front and rear jaw assemblies 828 and 830 are brought together with the film 812 in between. The front and rear jaw assemblies 828 and 830 transversely cuts the film to separate the bag 826 from the rest of the film 812 and to form a top 838 of the bag 826. The front and rear jaw assemblies 828 and 830 also forms a transverse seal 840 in the bag 826 near the top 838 of the bag 826. When the front and rear jaw assemblies 828 and 830 are brought together in FIG. 9C, the front and rear jaw assemblies 828 and 830 also begin formation of a subsequent bag 842. In addition to separating the bag 826 from the rest of the film 812, the transverse cut by the front and rear jaw assemblies 828 and 830 also forms a bottom 844 of the subsequent bag 842. The front and rear jaw assemblies 828 and 830 also form a transverse seal 846 near the bottom 844 of the subsequent bag 842 to close the bottom 844 of the subsequent bag 842. In FIG. 9C, as the front and rear jaw assemblies 828 and 830 are forming the transverse cut and the transverse seals 840 and 846 in the film 812, the foaming chemical precursors 836 continue to form foam and grow in volume inside the bag 826. At this point, the foaming chemical precursors 836 may have more of the consistency of foam than liquid such that the foaming chemical precursors 836 would not flow like liquid if the orientation of the bag 826 was changed.

Figure 9D:
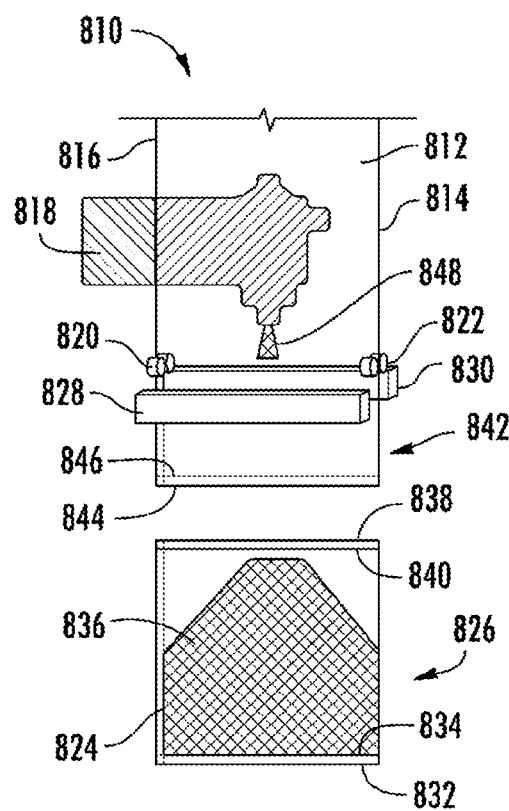

In FIG. 9D, the bag 826 is fully separated from the rest of the film 812 and is capable of falling downward (as shown in FIG. 9D) or otherwise moved away from the rest of the film 812. The front and rear jaw assemblies 828 and 830 have been moved away from each other to permit the film 812 to be fed further downward to continue formation of the subsequent bag 842. The dispenser 818 is also dispensing foaming chemical precursors 848 into the subsequent bag 842 to fill the subsequent bag 842 with foam. The foaming chemical precursors 836 in the bag 826 also continue to form foam and grow in volume inside the bag 826. In some cases, the foaming chemical precursors 836 are capable of forming foam that occupies a space of several hundreds of times greater than the volume of the individual foaming chemical precursors before they were mixed.

One difficulty with the foam-in-bag system 810 depicted in FIGS. 9A to 9D is the location of the growing foam inside the bag 826. The dispenser 818 is substantially centered with respect to the left and right sides of the film 812 so that the foaming chemical precursors 836 are dispensed at and grow from a substantially central location in the transverse direction (i.e., substantially centered from left to right). However, it is apparent when viewing the instances depicted in FIGS. 9A to 9D that the foaming chemical precursors 836 do not grow from a substantially central location in the longitudinal direction (i.e., not substantially centered from top to bottom). In particular, the dispensing of the foaming chemical precursors 836 by the dispenser 818, as shown in FIG. 9A, tends to result in the foaming chemical precursors 836 falling toward the bottom 832 of the bag 826, as shown in FIG. 9B. When viewing the instance shown in FIGS. 9B to 9D, the growth of the foaming chemical precursors 836 occurs from near the bottom 832 of the bag 826 and the center of gravity of the resulting foam from the foaming chemical precursors 836 is located nearer the bottom 832 than the top 838 of the bag. This unbalance of the foam in the bag 826 may make the bag 826 less effective for use as a protection material and may make it more difficult for the bag 826 to be fit into a shipping container (e.g., a box) around an object that is located in the shipping container.

One way that operators have overcome the difficulty with the foam-in-bag system 810 is to attempt to manually rebalance the foam in the bags. For example, operators of the foam-in-bag system 810 are sometimes trained to grab the leading edge of each bag with both hands as it emerges from the foam-in-bag system 810, with one hand on each corner. The operators are then trained to raise the leading end of the bag up so the dispensed foam is prevented from flowing to the bottom of the bag. This helps to center the foam along the length of the bag, if need be. However, this method of vertical foam centering is manual and subject to the vagaries of operator technique and training. In addition, employees in the packaging centers often turn over on short notice, so training and experience are lost easily with frequent turnover.

Depicted in FIGS. 9E to 9I are instances of a foam-in-bag system 850 that creates bags with foam inside that are more balanced than the bags created by the foam-in-bag system 810. The foam-in-bag system 850 includes a number of the same components as are included in the foam-in-bag system 810, including the film 812, the dispenser 818, the proximal and distal sets of rollers 820 and 822, and the front and rear jaw assemblies 828 and 830.

The foam-in-bag system 850 also includes a front pinch jaw 852 and a rear pinch jaw 854. In the depicted embodiment, the front pinch jaw 852 has a circular cross-section and the rear pinch jaw 854 has an L-shaped cross section. In other embodiments, the front and rear pinch jaws 852 and 854 may have any shape or cross-section. The front and rear pinch jaws 852 and 854 are arranged to permit the film 812 to pass between. At least one of the front and rear pinch jaws 852 and 854 is capable of movement toward and away from the other of the front and rear pinch jaws 852 and 854. When the front and rear pinch jaws 852 and 854 are brought together with the film 812 in between, the front and rear pinch jaws 852 and 854 pinch the two plies of the film 812 together. When the front and rear pinch jaws 852 and 854 are withdrawn from each other, the two plies of the film 812 is permitted to separate from each other. The front and rear pinch jaws 852 and 854 are configured to pinch the film 812 without cutting or sealing the film 812. As explained below, the front and rear pinch jaws 852 and 854 enable the foam-in-bag system 850 to dispense foaming chemical precursors so that the resulting foam is more balanced within bags.

Figure 9E:
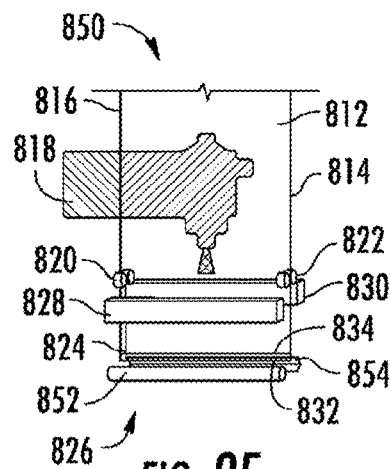
FIGS. 9E to 9I depict instances of a foam-in-bag system that creates bags with foam inside that are more balanced than the bags created by the foam-in-bag system shown in FIGS. 9A to 9D, in accordance with the embodiments described herein.

Each of FIGS. 9E to 9I depicts an instance in a series of operations by the foam-in-bag system 850. In FIG. 9E, the bottom and the left and right sides of the bag 826 have been closed. The front and rear jaw assemblies 828 and 830 are withdrawn from each other to allow the film 812 to pass. The front and rear pinch jaws 852 and 854 are also withdrawn from each other to allow the film 812 to pass. In the instance shown in FIG. 9E, the transverse seal 834 near to the bottom 832 of the bag 826 is approximately at the same level as the front and rear pinch jaws 852 and 854.

Figure 9F:
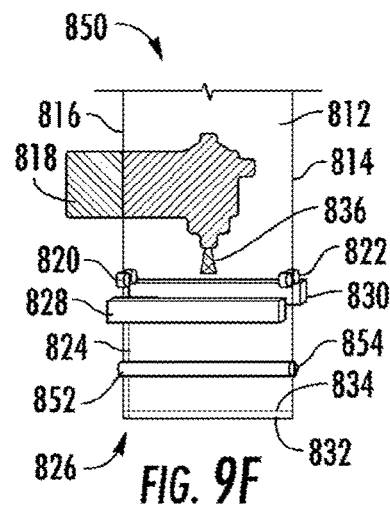
Figure 9G:
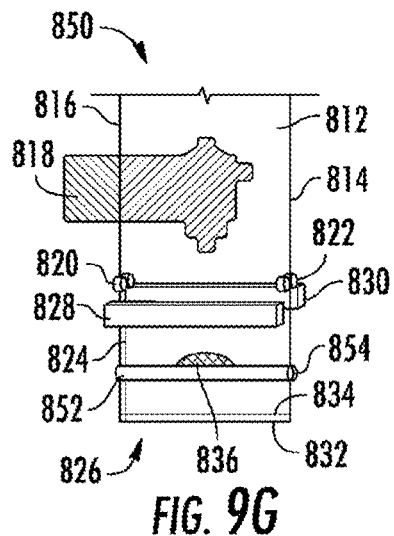

From the position shown in FIG. 9E, the film 812 is advanced to the position shown in FIG. 9F where the front and rear pinch jaws 852 and 854 are brought together with the film 812 in between. In FIG. 9F, the dispenser 818 is in the process of dispensing foaming chemical precursors 836 into the bag 826. The foaming chemical precursors 836 may have begun to mix together and form foam, but they are typically still in a mostly liquid state. After the foaming chemical precursors 836 are dispensed, the foaming chemical precursors 836 fall to the point shown in FIG. 9G, where the foaming chemical precursors 836 are deterred from falling any further by front and rear pinch jaws 852 and 854 that are pinching the film 812. From that location, the foaming chemical precursors 836 continue to form foam and to grow in volume.

Figure 9H:
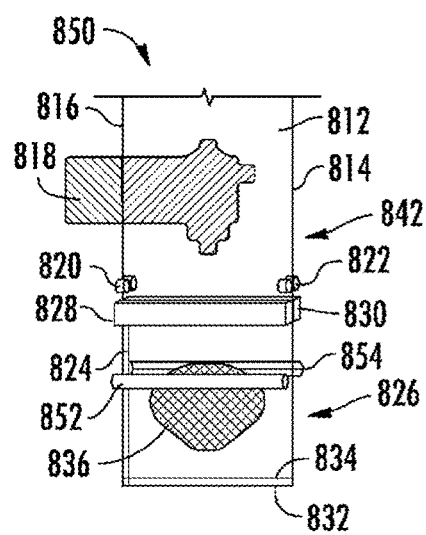

The front and rear pinch jaws 852 and 854 are then withdrawn from each other to permit the film 812 to be advanced to the position shown in FIG. 9H. At that point, the front and rear jaw assemblies 828 and 830 are brought together with the film 812 in between to form the transverse cut and the transverse seals 840 and 846 in the film, 812. In FIG. 9H, as the front and rear jaw assemblies 828 and 830 are forming the transverse cut and the transverse seals 840 and 846 in the film 812, the foaming chemical precursors 836 continue to form foam and grow in volume from the position inside the bag 826 at which the foaming chemical precursors 836 were held in FIG. 9G. In some embodiments, by the time that the front and rear jaw assemblies 828 and 830 are withdrawn from each other, the foaming chemical precursors 836 may have more of the consistency of foam than liquid such that the foaming chemical precursors 836 would not flow like liquid when the front and rear jaw assemblies 828 and 830 are withdrawn from each other.

Figure 9I:
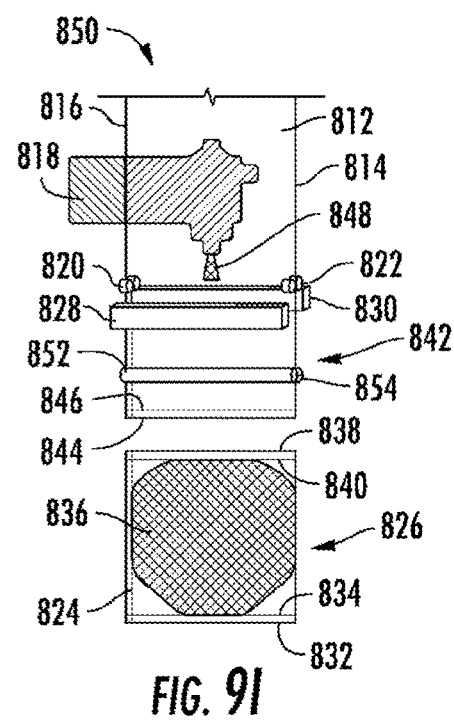

In FIG. 9I, the bag 826 is fully separated from the rest of the film 812 and is capable of falling downward (as shown in FIG. 9I) or otherwise moved away from the rest of the film 812. The front and rear jaw assemblies 828 and 830 have been moved away from each other. The front and rear pinch jaws 852 and 854 have been brought together to pinch the film 812 in the subsequent bag 842. The dispenser 818 is also dispensing foaming chemical precursors 848 into the subsequent bag 842 to fill the subsequent bag 842 with foam. Although not shown in FIG. 9I, the front and rear pinch jaws 852 and 854 will deter the foaming chemical precursors 848 from falling below the front and rear pinch jaws 852 and 854 in the subsequent bag 842. The foaming chemical precursors 836 in the bag 826 also continue to form foam and grow in volume inside the bag 826. In some cases, the foaming chemical precursors 836 are capable of forming foam that occupies a space of several hundreds of times greater than the volume of the individual foaming chemical precursors before they were mixed.

As can be seen particularly in FIG. 9I, the foam in the bag 826 created by the foam-in-bag system 850 is more balanced than the foam in the bag 826 created by the foam-in-bag system 810. While the foam in the bag 826 created by the foam-in-bag system 850 may not have a center of gravity at the exact center of the bag 826 (e.g., the top corners of the bag 826 are fuller than the lower corners of the bag 826 in FIG. 9I), the foam is substantially balanced within the bag 826. This balance of the foam in the bag 826 may make the bag 826 more effective for use as a protection material and may make it easier for the bag 826 to be fit into a shipping container (e.g., a box) around an object that is located in the shipping container.

One benefit of the foam-in-bag system 850 is that the front and rear pinch jaws 852 and 854 can be controlled so that the front and rear pinch jaws 852 and 854 pinch the bags at specific locations. For example, the location at which the front and rear pinch jaws 852 and 854 pinch a bag may be based on the expected height of the bag. In one embodiment, the front and rear pinch jaws 852 and 854 may be controlled to pinch the bag at a distance from the bottom of the bag that is approximately half of the expected height of the bag. In another embodiment, the front and rear pinch jaws 852 and 854 may be controlled to pinch the bag at a distance from the bottom of the bag that is approximately half of the expected height of the bag less some offset. In this last embodiment, the offset may be used to take into account an amount of expected foam formed from the foaming chemical precursors while the front and rear pinch jaws 852 and 854 are pinching the film. In other embodiments, the location at which the front and rear pinch jaws 852 and 854 pinch a bag may be based on any other parameter or desired location of the start of the form formation by the foaming chemical precursors. In addition, the length of time that the front and rear pinch jaws 852 and 854 pinch a bag may be controlled based on a desired dwell time of the foaming chemical precursors before the front and rear pinch jaws 852 and 854 are withdrawn from each other.

Figure 9J:
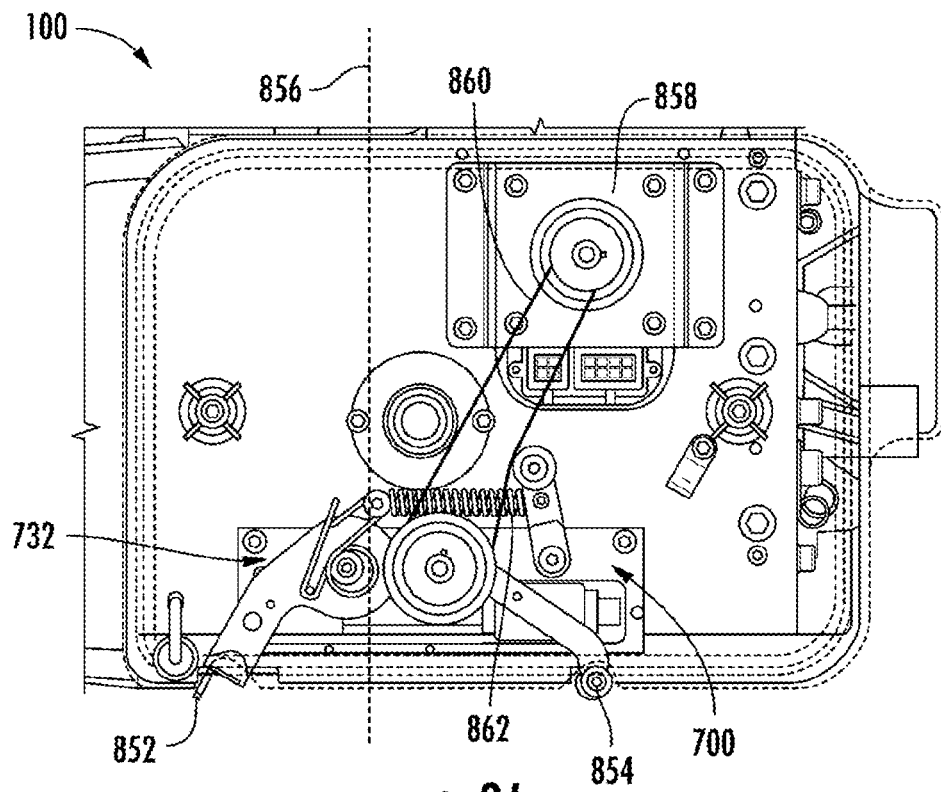
FIGS. 9J and 9K depict side views of a foam-in-bag system having front and rear pinch jaws that enable formation of the more balanced bag created by the foam-in-bag system shown in FIGS. 9E to 9I, in accordance with the embodiments described herein.
Figure 9K:
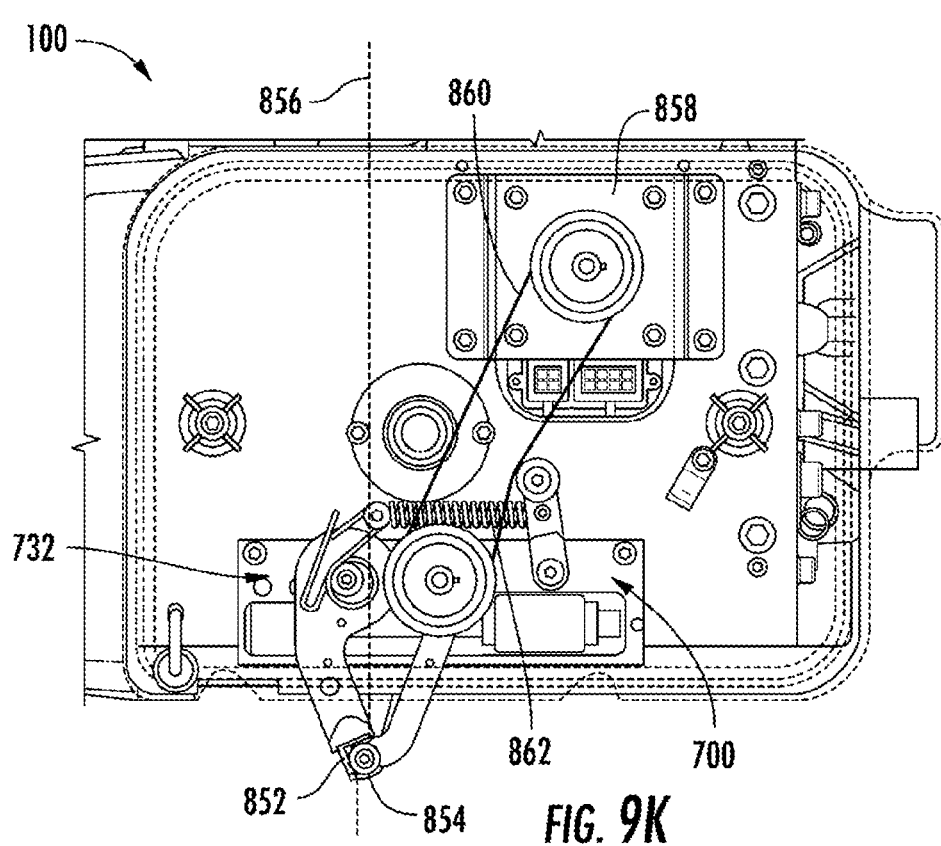

Depicted in FIGS. 9J and 9K are side views of the foam-in-bag system 100 having front and rear pinch jaws. More specifically, FIGS. 9J and 9K depict sides views of the front and rear pinch jaws in withdrawn and pinched orientations, respectively. In these views, the front pinch jaw 852 has an L-shaped cross-section and the rear pinch jaw 854 has a circular cross-section. In other embodiments, the front and rear pinch jaws 852 and 854 may have other cross-sectional shapes. In FIG. 9J, a film path 856 is depicted showing the expected path of film through the depicted portion of the foam-in-bag system 100. With the front and rear jaw assemblies 700 and 732 withdrawn from each other and the front and rear pinch jaws 852 and 854 withdrawn from each other in FIG. 9J, the film path 856 extends substantially vertically. With the front and rear pinch jaws 852 and 854 moved toward each other to pinch the film in FIG. 9K, the film path 856 is a tortuous path through the front and rear pinch jaws 852 and 854. This tortuous path deters liquid from passing below the pinched ends of the front and rear pinch jaws 852 and 854.

As shown in FIGS. 9J and 9K, the positions of the front and rear pinch jaws 852 and 854 are controlled by a motor 858. In some embodiments, the motor 858 is a solenoid, an electric motor, or any other actuator. The motor 858 is coupled to one of the rear pinch jaw 854 by a belt 860. Rotation of the motor 858 causes movement of the belt 860, which results in a rotation of the rear pinch jaw 854. In the depicted embodiment, the rear pinch jaw 854 is rotationally coupled to the front pinch jaw 852 (e.g., via gear teeth) so that rotation of the rear pinch jaw 854 will cause counter-rotation of the front pinch jaw 852. In this way, movements of the motor 858 are configured to result in movements of the front and rear pinch jaws 852 and 854 toward and away from each other. FIGS. 9J and 9K also depict a biasing element 862 that biases the front and rear pinch jaws 852 and 854 away from each other. In the depicted embodiment, the biasing element 862 is coupled to the front pinch jaw 852 to cause it to rotate counterclockwise unless the force of the motor 858 overcomes the force of the biasing element 862 to cause the front and rear pinch jaws 852 and 854 to move toward each other.

Figure 10B:
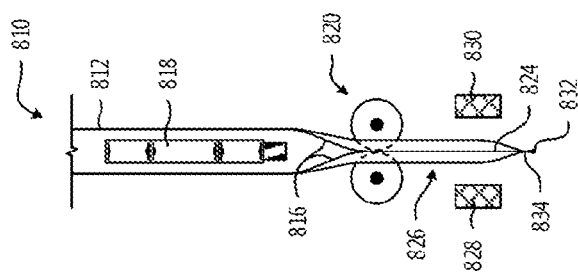
FIGS. 10A and 10B depict perspective and cross-sectional side views, respectively, of the foam-in-bag system shown in FIGS. 9A to 9D, in accordance with the embodiments described herein.
Figure 10A:
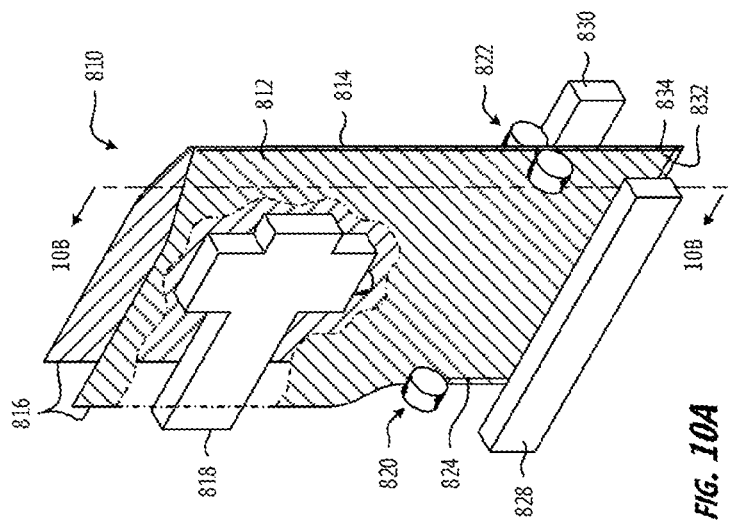

Depicted in FIGS. 10A and 10B are perspective and cross-sectional side views, respectively, of the foam-in-bag system 810. After the film 812 passes the dispenser 818, the two longitudinal edges 816 are brought together by the proximal set of rollers 820 and the proximal set of rollers 820 forms the longitudinal seal 824 in the film 812. As can be seen in FIG. 10B, portions of the two plies of the film 812 can remain separated in the region between the dispenser 818 and the transverse seal 834. In particular, the two plies of the film 812 can be separated both between the proximal and distal sets of rollers 820 and 822 and between the front and rear jaw assemblies 828 and 830.

Figure 10C:
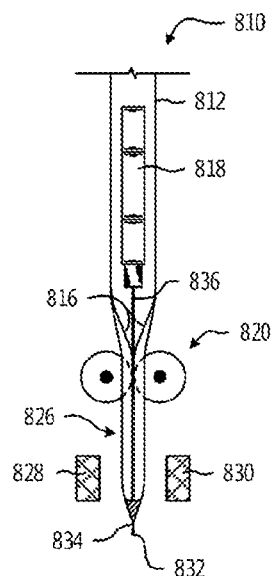
FIGS. 10C and 10D depict an embodiment of proper dispensing and foaming of the foaming chemical precursors by the foam-in-bag system shown in FIGS. 10A and 10B, in accordance with the embodiments described herein.
Figure 10D:
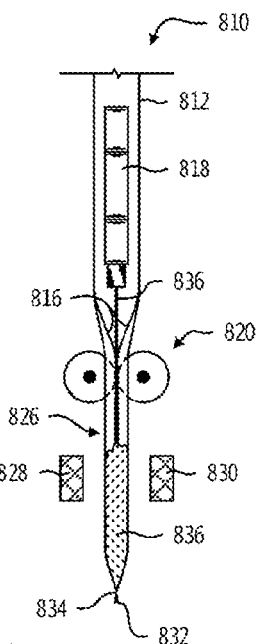

The separation of the two plies of the film 812 below the dispenser 818 allows for proper dispensing of foaming chemical precursors 836 into the bag 826. Depicted in FIGS. 10C and 10D are the proper dispensing and foaming of the foaming chemical precursors 836. In the instance shown in FIG. 10C, the foaming chemical precursors 836 are dispensed by the dispenser 818 and they pass through the two plies of the film 812 until the foaming chemical precursors 836 pool at the transverse seal 834. It should be noted that a similar proper dispensing may occur in the foam-in-bag system 850, except that, after the foaming chemical precursors 836 are dispensed by the dispenser 818, the foaming chemical precursors 836 pass through the two plies of the film 812 until the foaming chemical precursors 836 pool at the point where the front and rear pinch jaws 852 and 854 pinch the film 812. In the instance shown in FIG. 10D, the film 812 has been advanced downward and the foaming chemical precursors 836 have grown in volume to fill a portion of the bag 826. In FIGS. 10C and 10D, the timing of the dispensing of the foaming chemical precursors 836, the amount of the foaming chemical precursors 836 dispensed, and the advancement of the film 812 are controlled so that the foaming chemical precursors 836 remain in the bag 826 as the foaming chemical precursors 836 grow in volume.

Under some conditions, the two plies of the film 812 do not remain separated between the dispenser 818 and the point at which the foaming chemical precursors 836 are intended to pool (e.g., the transverse seal 834, the point at which the front and rear pinch jaws 852 and 854 pinch the film, etc.). In this case, the dispensing and growth of the foaming chemical precursors 836 may result in a "foam-up" failure.

Figure 10E:
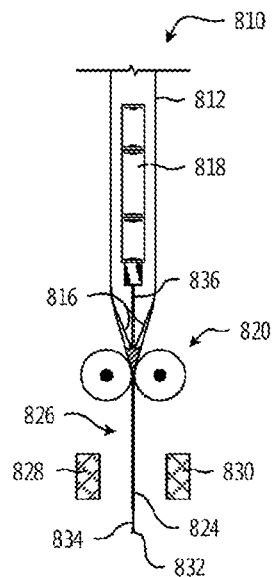
FIGS. 10E and 10F depict an embodiment of a foam-up failure in the foam-in-bag system shown in FIGS. 10A and 10B, in accordance with the embodiments described herein.
Figure 10F:
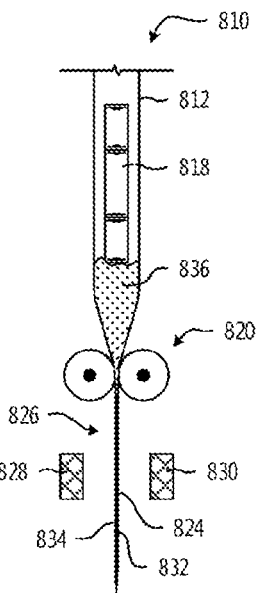

An example of a foam-up failure is depicted in the instances shown in FIGS. 10E and 10F. In FIG. 10E, the two plies of film 812 were not separated in the region between the proximal and distal sets of rollers 820 and 822. This lack of separation may be caused by improper feeding of the film 812, improper driving of the proximal and distal sets of rollers 820 and 822, impingement on the outside of the film 812 by a foreign object, pulling of the film 812 by a user, or for any other reason. As can be seen in FIG. 10E, the lack of separation of the two plies of the film 812 results in the dispensed foaming chemical precursors 836 pooling at or above the proximal and distal sets of rollers 820 and 822. Because the foaming chemical precursors 836 begin growing from a higher than expected location, the growth in volume of the foaming chemical precursors 836 causes the resultant foam to reach too high. FIG. 10F shows the growth in volume of the foaming chemical precursors 836. As shown in FIG. 10F, the foaming chemical precursors 836 reached a height where they contacted the dispenser 818. The foam on the dispenser 818 hardens and adheres to the dispenser 818 so that extensive cleaning will be needed to properly use the dispenser 818 again. In addition, the foaming chemical precursors 836 reached a height where the two longitudinal edges 816 were not sealed and the foam is able to flow out of the film 812. In this case, the foam can fall on other components of the foam-in-bag system 810, the floor, or anywhere else. This foam may also need to be cleaned before continuing to use the foam-in-bag system 810. While the depiction in FIGS. 10E and 10F shows the two plies of the film 812 failed to separate at the proximal and distal sets of rollers 820 and 822, the two plies of the film 812 can fail to separate at other locations. For example, the film 812 can be held together unintentionally by the front and rear jaw assemblies 828 and 830, by front and rear pinching jaws, by a user holding the film, or by any other means.

Figure 10I:
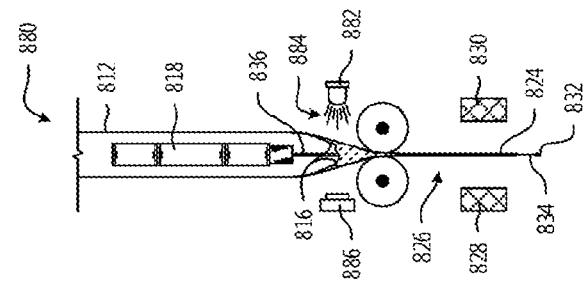
FIG. 10I depicts an instance of a beginning of a foam-up failure and detection of the foam-up failure by the foam-in-bag system shown in FIG. 10H, in accordance with the embodiments described herein.
Figure 10H:
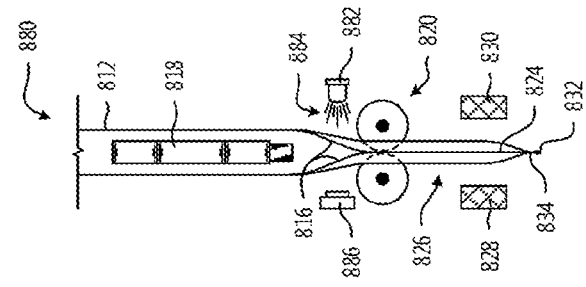
FIG. 10H depicts a cross-sectional side view of one embodiment of a foam-in-bag system capable of detecting foam-up conditions from outside of the film, in accordance with the embodiments described herein.
Figure 10G:
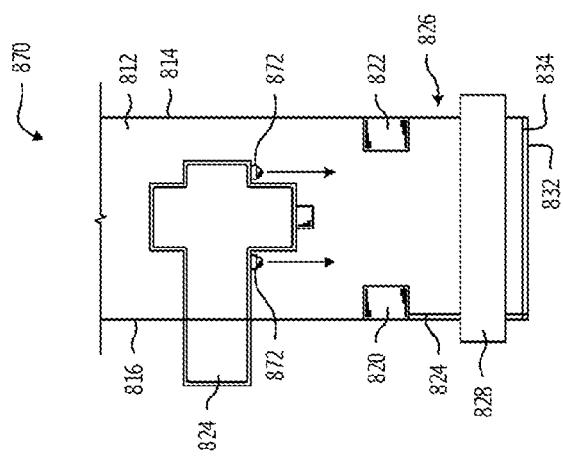
FIG. 10G depicts a front view of a foam-in-bag system that may be used to reduce the possibility of a foam-up failure, in accordance with the embodiments described herein.

Depicted in FIG. 10G is a front view of a foam-in-bag system 870 that may be used to reduce the possibility of a foam-up failure. The foam-in-bag system 870 is similar to the foam-in-bag system 810, except that the foam-in-bag system 870 includes proximity sensors 872. The proximity sensors 872 are oriented downward (as shown by arrows) to detect a distance to an object below the dispenser 818. For example, the proximity sensors 872 may detect a location of foaming chemical dispensers in the bag 826, a location where the film 812 is closed, or a location of any other object below the dispenser 818. In the event that the proximity sensors 872 detect foaming chemical dispensers growing higher than expected, a controller (not shown) in the foam-in-bag system 870 could cause one or more of stopping the dispensing of the foaming chemical precursors by the dispenser 818, further feeding the film 812 to increase the size of the bag 826, or any other action to deter the possibility of a foam-up failure.

The proximity sensors 872 in the foam-in-bag system 870 may be able to reduce the probability of a foam-up failure. However, the use of the proximity sensors 872 may not be able to detect every potential foam-up condition. For example, the shape of the top of the contour of the top of the growing foam is different every time that a bag is filled. In some cases, the contour of the growing foam may allow for a proper reading of the distance to the foam by the proximity sensors 872, thus allows for detection of a foam-up failure. However, in other cases, the contour of the growing foam may not allow for a proper reading of the distance to the foam by the proximity sensors 872, thus preventing detection of a foam-up failure. In another example, the consistency of the foam may affect the ability of the proximity sensors 872 to detect the distance to the foam. Foam is inherently porous and, in cases where the foam is more porous than normal, the proximity sensors 872 may not detect the location of the foam. In these cases, the proximity sensors 872 may not be able to detect a foam-up failure. In another example, the film 812 may interfere with the ability of the proximity sensors 872 to detect the position of the foam. In some cases, one of the plies of film 812 may be moved (e.g., blown) into the path between the proximity sensors 872 and the film, which interferes with the ability of the proximity sensors 872 to detect the location of the foam.

Depicted in FIG. 10H is a cross-sectional side view of one embodiment of a foam-in-bag system 880 capable of detecting foam-up conditions from outside of the film 812. The foam-in-bag system 880 includes a source 882 of electromagnetic energy 884 located outside of the film 812 and arranged to emit the electromagnetic energy 884 toward the film 812. In some embodiments, the electromagnetic energy 884 includes electromagnetic energy having a wavelength in at least one of a range of visible light (i.e., having a frequency between about 400 nm and about 700 nm), a range of ultraviolet energy (i.e., having a frequency between about 10 nm and about 400 nm), a range below ultraviolet energy (i.e., having a frequency less than or equal to about 10 nm), a range of infrared energy (i.e., having a frequency between about 700 nm and about 1 mm), or a range above infrared energy (i.e., having a frequency greater than or equal to about 1 mm). In some embodiments, the source 882 of the electromagnetic energy 884 includes one or more of an incandescent energy source (e.g., an incandescent light bulb, a halogen lamp, etc.), a luminescent energy source (e.g., a light-emitting diode (LED), a laser, etc.), or any other source of electromagnetic energy.

The foam-in-bag system 880 also includes a detector 886 capable of detecting electromagnetic energy. The detector 886 is located outside of the film 812, on an opposite side of the film 812 from the source 882 of the electromagnetic energy 884, and the detector 886 is arranged to detect electromagnetic energy propagating away from the film 812. In some embodiments, the detector 886 is capable of detecting electromagnetic energy having a wavelength in at least one of a range of visible light, a range of ultraviolet energy, a range below ultraviolet energy, a range of infrared energy, or a range above infrared energy. In some embodiments, the detector 886 includes a semiconductor-based photodetector, such as one or more of a charge-coupled device (CCD), a photoresistor, a photodiode, a complementary metal-oxide-semiconductor (CMOS) image sensor, or any other semiconductor-based photodetector. In some embodiments, the detector 886 is configured to detect electromagnetic energy in a range that includes the electromagnetic energy 884 emitted by the source 882. In some embodiments, the detector 886 is configured to detect electromagnetic energy in a range that does not include the electromagnetic energy 884 emitted by the source 882.

In the embodiment depicted in FIG. 10H, the source 882 of the electromagnetic energy 884 and the detector 886 are located vertically between the dispenser 818 and the proximal and distal sets of rollers 820 and 822. In other embodiments, the source 882 of the electromagnetic energy 884 and the detector 886 can be located vertically at different locations, such as vertically between the proximal and distal sets of rollers 820 and 822 and the front and rear jaw assemblies 828 and 830, below the front and rear jaw assemblies 828 and 830, or in any other location. From the view shown in FIG. 10H, the source 882 of the electromagnetic energy 884 shows one LED located on the rear side of the film 812 and the detector 886 shows one photodetector located on the front side of the film 812. In some embodiments, the source 882 of the electromagnetic energy 884 may include a single source, such as one LED, and the detector 886 may include a single detector, such as one photodetector. In other embodiments, the source 882 of the electromagnetic energy 884 may include a number of distinct sources, such as a number of LEDs that are arranged across a transverse width of the film 812, and the detector 886 may include a number of distinct detectors, such as a number of photodetectors that are arranged across a transverse width of the film 812. In other embodiments, the source 882 of the electromagnetic energy 884 may include a single source and the detector 886 may include a number of distinct detectors. In other embodiments, the source 882 of the electromagnetic energy 884 may include a number of sources and the detector 886 may include a single detector.

In some embodiments, film 812 is transmissive of at least a portion of the electromagnetic energy 884 emitted by the source 882. For example, the electromagnetic energy 884 may include infrared energy and the film 812 may be transmissive of electromagnetic energy in the range of infrared energy. In addition, the foam, which is formed by the foaming chemical precursors that are dispensed into the bag 826, may be opaque to portion of the electromagnetic energy 884 emitted by the source 882. For example, the electromagnetic energy 884 may include infrared energy and the foam may be opaque to electromagnetic energy in the range of infrared energy.

As used herein, the term "opaque" and "transmissive" may be defined in terms of one or more of total luminous transmittance, opacity, or contrast ratio opacity. Total luminous transmittance may be defined as the percentage of luminous flux that passes through an object when electromagnetic energy (e.g., visible light) is transmitted at the object. In some embodiments, an object is opaque if the object has a total transmittance that is at or below any one of the following values: 10%, 20%, 30%, 40%, 50%, 60%, 65%, 70%, 75%, 80%, 85%, and 90%, measured in accordance with ASTM D1003. In some embodiments, an object is transmissive if the object has a total luminous transmittance that is at or above any one of the following values: 10%, 20%, 30%, 40%, 50%, 60%, 65%, 70%, 75%, 80%, 85%, and 90%, measured in accordance with ASTM D1003. Opacity may be defined as the percentage of luminous flux that does not pass through a film when electromagnetic energy is transmitted at the film. Opacity may be defined according to the formula 100%−total transmittance=opacity. In some embodiments, an object is opaque if the object has an opacity that is at or above any one of the following values: 10%, 20%, 30%, 40%, 50%, 60%, 65%, 70%, 75%, 80%, 85%, and 90%. In some embodiments, an object is transmissive if the object has an opacity that is at or below any one of the following values: 10%, 20%, 30%, 40%, 50%, 60%, 65%, 70%, 75%, 80%, 85%, and 90%. Contrast ratio opacity measurement characterizes how opaque an object is using two readings: a Y (luminance or brightness) value measured with the object backed by a black background and a Y value measured with the object backed by a white background. The resulting fraction is expressed as Y %, calculated as follows:

$$\text{Opacity}(Y) = \frac{Y_{black\ backing}}{Y_{white\ backing}} \times 100$$

In some embodiments, an object is opaque or transmissive if the contrast ratio opacity for the film is at least, and/or at most, any one of the following values: 10%, 20%, 30%, 40%, 50%, 60%, 65%, 70%, 75%, 80%, 85%, and 90%, calculated per above with base values measured in accordance with ASTM D1746.

As noted above, in some embodiments, the electromagnetic energy 884 emitted by the source 882 may include ultraviolet electromagnetic energy and the film 812 may be transmissive to the ultraviolet electromagnetic energy in the electromagnetic energy 884. In the arrangement shown in FIG. 10H, the detector may detect an amount of ultraviolet electromagnetic energy. It should be noted that the intensity of the ultraviolet electromagnetic energy detected by the detector 886 may be less than the intensity of the ultraviolet electromagnetic energy emitted by the source 882, in part because the film 812 may be transmissive while having a total transmittance of ultraviolet electromagnetic energy that is less than 100%. In the instance shown in FIG. 10I, a foam-up failure has begun with the foaming chemical precursors 836 pooling at the proximal and distal sets of rollers 820 and 822 and the foam growing from that point. The foam may be opaque such that the intensity of ultraviolet electromagnetic energy detected by the detector 886 is less than it detected in FIG. 10H. In should be noted that the level of intensity of the ultraviolet electromagnetic energy detected by the detector 886 may not go to zero, in part because the foam may be opaque while having a total transmittance of ultraviolet electromagnetic energy that is greater than 0%.

The foam-in-bag system 880 may include a controller (not shown) that is operatively coupled to the detector 886 and configured to receive signals from the detector 886 indicative of an intensity of electromagnetic energy. The controller may detect the reduction in the intensity of the electromagnetic energy detected by the detector 886 and, in response, cause actions to avoid a foam-up condition or to reduce the effects of a foam-up condition. For example, the controller may cause one or more of stopping the dispensing of the foaming chemical precursors by the dispenser 818 and/or further feeding the film 812 to increase the size of the bag 826. In some cases, the controller may be able to detect a potential foam-up condition based on a geometry of the stream of foaming chemical precursors 836 being dispensed by the dispenser 818. In this example, the source 882 of the electromagnetic energy 884 and the detector 886 may be aligned with the stream of the foaming chemical precursors 836 being dispensed by the dispenser 818 so that the signals generated by the detector 886 are indicative of the geometry of the stream of the foaming chemical precursors 836 being dispensed by the dispenser 818.

Figure 11A:
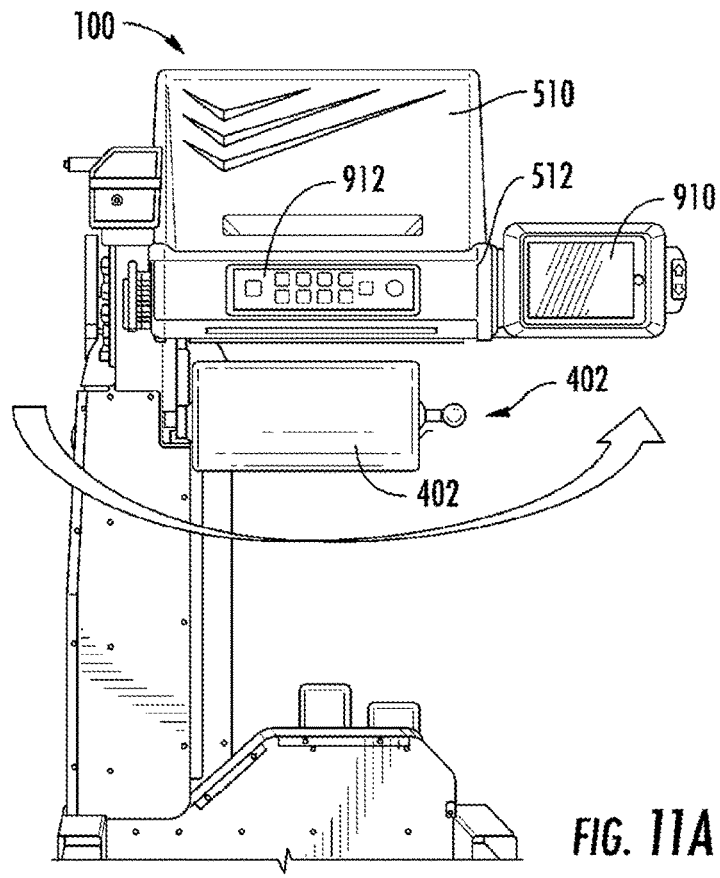
FIGS. 11A and 11B depict views of an embodiment of a foam-in-bag system that includes user interface devices, in accordance with the embodiments described herein.
Figure 11B:
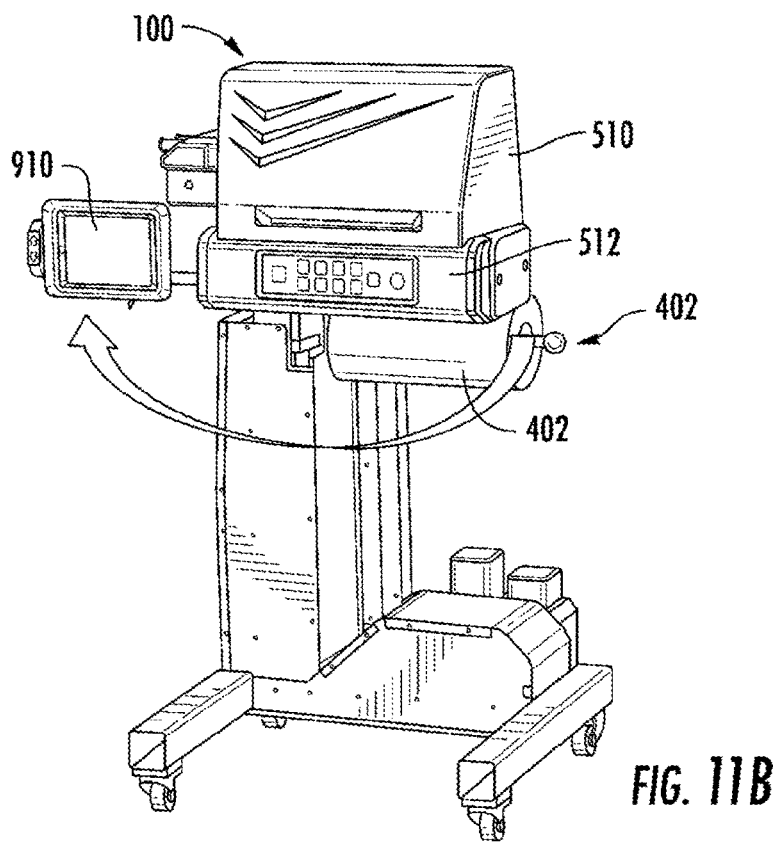

In some embodiments, foam-in-bag systems include one or more user interface devices to enable a user to interact with the foam-in-bag system. A user interface device can include a user input device that receives user inputs, a user output device that outputs information to a user, or a user input/output device that can both receive user input and output information (e.g., a touchscreen device). Depicted in FIGS. 11A and 11B are views of an embodiment of the foam-in-bag system 100 that includes user interface devices 910 and 912. The user interface devices 910 and 912 can receive inputs from a user, such as indications of how bags are to be created (e.g., bag widths, bag lengths, seal strengths, etc.), how bags are to be filled (e.g., an amount of foaming chemical precursors to be dispensed, where in the bags the foaming chemical precursors to be dispensed, etc.), how many bags are to be created, and the like. The user interface devices 910 and 912 can output information to a user, such as indications about statuses of the foam-in-bag system 100 (e.g., in idle mode, in proper operating mode, in error mode, etc.), and the like.

In the depicted embodiment, the user interface device 910 is a discrete user interface device in the form of a tablet computing device. The user interface device 910 is discrete in the sense that it is located on the foam-in-bag system 100 in such a way that it is capable of being removed from the foam-in-bag system 100 while the foam-in-bag system 100 remains usable to form and fill bags. In the depicted embodiment, the user interface device 912 is an integrated user interface device in the form of a projective capacitance touchscreen and lights on the face of the front lower cover 512. The user interface device 912 is discrete in the sense that it is located on the foam-in-bag system 100 in such a way that it is intended to remain a part of the foam-in-bag system 100 while the foam-in-bag system 100 remains usable. In some embodiments, the exterior of the user interface device 912 and/or the face of the front lower cover 512 is made from a material that tends not to adhere to other materials and that is highly non-porous. In these embodiments, if resin and/or chemical foaming precursors that fall on the exterior of the user interface device 912 and/or the face of the front lower cover 512, the resin and/or chemical foaming precursors tend not to stick to the exterior of the user interface device 912 and/or the face of the front lower cover 512.

In some embodiments, each of the user interface devices 910 and 912 is communicatively coupled to a computing device inside the foam-in-bag system 100, such as a controller. The controller may be capable of controlling one or more components of the foam-in-bag system 100, such as the dispenser 174, the proximal and distal driven rollers 520 and 522, longitudinal sealer 538, and the like. In this example, inputs into one or both of the user interface devices 910 and 912 can be communicated to the controller and, in response, the controller can control the foam-in-bag system 100. In some embodiments, the controller includes circuitry in one or more printed circuit boards, software operating on the one or more printed circuit boards, or any combination thereof. In some embodiments, when one of the user interface devices 910 and 912 is used to provide a user input to control the foam-in-bag system 100, a corresponding output may be provided on both of the user interface devices 910 and 912. For example, the user interface device 912 may have a button that can be pressed to cause the foam-in-bag system 100 to operate under preset conditions. When a user presses the button on the user interface device 912, a corresponding light may be illuminated to provide an output to the user indicating that the preset conditions have been selected. In other embodiments, other feedback may be provided to a user, such as auditory feedback (e.g., a sound), tactile responses (e.g., a vibration), haptic responses, and the like. The user interface device 910 may also display a button on a touchscreen that can be selected to cause the foam-in-bag system 100 to operate under the preset conditions. When the user presses the button on the user interface device 912, the corresponding button on the user interface device 910 may be highlighted to provide an output to the user indicating that the preset conditions have been selected. Other forms of user input are possible, such as a microphone that detects audible speech from a user that is processed to determine user commands given orally.

In some embodiments, one or both of the user interface devices 910 and 912 can serve as the controller that controls one or more components of the foam-in-bag system 100. In one example, it may be beneficial to have a discrete user interface device (e.g., user interface device 910) serve as the controller because it is relatively easy to remove and replace the user interface device 910 when desired, such as when it is desirable to upgrade the user interface device 910 with a new user interface device but the remainder of the components of the foam-in-bag system 100 do not need to be replaced. In another example, it may be advantageous to allow a user to control the foam-in-bag machine 100 remotely using a remote computing device, such as a mobile phone, a laptop computer at a remote work station, and the like. It may be easier to configure a discrete user interface device (e.g., user interface device 910) to communicate with a remote computing device via one or more wireless or wires networks (e.g., via a WiFi network, a cellular telephone network, a local area network, etc.) than to configure an integrated user interface device to communicate with the remote computing device. In this instance, it may be desirable to configure the discrete user interface device to both communicate with the remote computing device and to control the foam-in-bag system 100 based on the communications from the remote computing device.

Existing foam-in-bag systems include discrete user interface devices. However, these foam-in-bag systems are fixedly attached to the housings of these existing foam-in-bag systems. Having a discrete user interface device fixedly attached to a housing of a foam-in-bag system may be problematic. For example, the discrete user interface device may be located where it does not fit with other equipment placed around the foam-in-bag system (e.g., in a packaging line). In another example, the discrete user interface device is located in an inconvenient location for the user (e.g., on the right side of the foam-in-bag system for a lefthanded user). In the embodiment depicted in FIGS. 11A and 11B, the user interface device 910 is capable of being repositioned in different locations. In the instance shown in FIG. 11A, the user interface device 910 is located on the right side of the foam-in-bag system 100. In the instance shown in FIG. 11B, the user interface device 910 is located on the left side of the foam-in-bag system 100. In some embodiments, the user interface device 910 includes one or more sensors (e.g., a gyroscope, an accelerometer, a hall effect sensor, etc.) that allow the user interface device to determine its orientation and adjust the orientation of feedback to the user (e.g., the orientation of graphics on a screen) accordingly. In some embodiments, a user is able to reposition the user interface device 910 between the positions shown in FIGS. 11A and 11B by hand without the use of tools. In some embodiments, the user interface device 910 is located on an arm that is capable of being rotated 180° to reposition the user interface device 910 between the positions shown in FIGS. 11A and 11B. An example of such an arm 920 is depicted in FIGS. 11C to 11E.

Figure 11C:
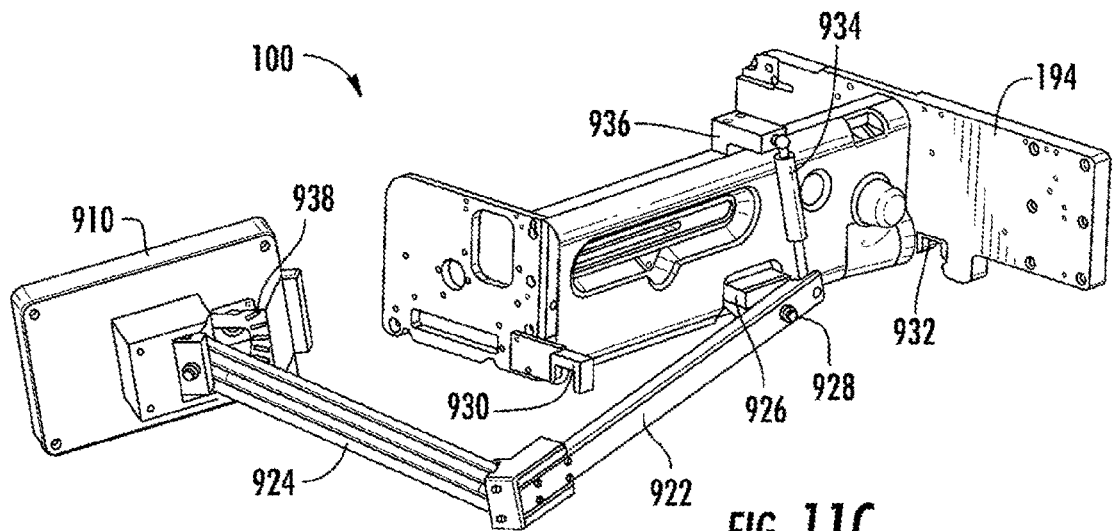
FIGS. 11C to 11E depict views of an arm that is capable of being rotated 180° to reposition one of the user interface devices between the positions shown in FIGS. 11A and 11B, in accordance with the embodiments described herein.
Figure 11D:
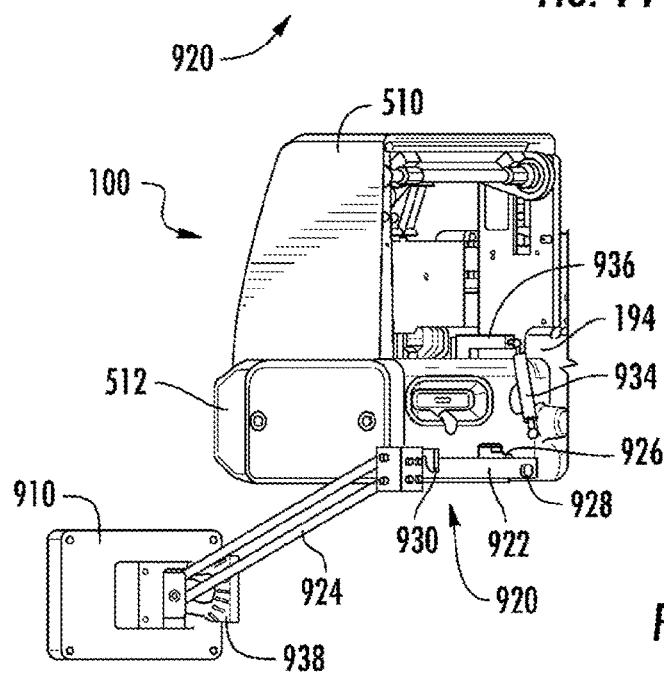
Figure 11E:
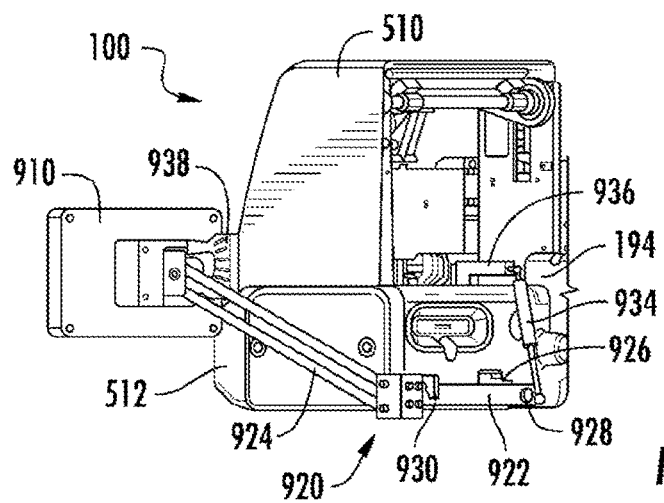

In the embodiment depicted in FIG. 11C, the arm 920 includes a first arm segment 922 and a second arm segment 924. The first arm segment 922 is rotatably coupled to a bracket 926 on the back of the housing 194. In the depicted example, the first arm segment 922 is rotatably coupled to the bracket 926 by a pin 928 so that the first arm segment 922 rotates about an axis that is substantially parallel to the ground and substantially perpendicular to the front of the foam-in-bag system 100. This permits the first arm segment 922 to rotate between a horizontal position where the first arm segment 922 is engaged by a first position bracket 930 and another horizontal position where the first arm segment 922 is engaged by a second position bracket 932.

In some embodiments, the arm 920 is arranged so that the first arm segment 922 is configured to remain engaged in each of the first and second position brackets 930 and 932. In some embodiments, the first arm segment 922 is biased toward one of the first and second position brackets 930 until a force is exerted on the arm 920 by a user. The first arm segment 922 can be biased toward one of the first and second position brackets 930 by a magnetic force, by a mechanical force, by any other force, or by any combination of forces. In the embodiment shown in FIGS. 11C to 11E, first arm segment 922 is biased toward one of the first and second position brackets 930 and 932 by a combination of magnetic force and mechanical force.

In some embodiments, the first arm segment 922 can be configured to remain engaged in each of the first and second position brackets 930 and 932 by a magnetic force. In the depicted embodiment, the first position bracket 930 may include a magnet (e.g., a permanent magnet or an electromagnet) and the first arm segment 922 may include a magnetic material. When the first arm segment 922 engages the first position bracket 930, the magnetic force between the magnet and the first arm segment 922 deters the first arm segment 922 from disengaging from the first position bracket 930 until a user presses down on the arm 920 with sufficient force to overcome the magnetic force. Similarly, the second position bracket 932 may include a magnet (e.g., a permanent magnet or an electromagnet) and the first arm segment 922 may include a magnetic material. When the first arm segment 922 engages the second position bracket 932, the magnetic force between the magnet and the first arm segment 922 deters the first arm segment 922 from disengaging from the second position bracket 932 until a user presses down on the arm 920 with sufficient force to overcome the magnetic force.

In some embodiments, the first arm segment 922 can be configured to remain engaged in each of the first and second position brackets 930 and 932 by a mechanical force. In the depicted embodiment, the arm 920 includes a biasing mechanism 934 configured to bias the first arm segment 922 toward one of the first and second position brackets 930 and 932. The depicted biasing mechanism 934 is rotatably coupled to a bracket 936 that is fixedly coupled to the housing 194. The biasing mechanism 934 is also rotatably coupled to a portion of the first arm segment 922 that is on an opposite side of the pin 928 from the portion of the first arm segment 922 that engages the first and second position brackets 930 and 932. In this arrangement, the biasing mechanism 934 exerts a mechanical force on the first arm segment 922 that biases the first arm segment 922 to rotate about the pin 928. For example, when the first arm segment 922 is in the position shown in FIG. 11C, the biasing mechanism 934 exerts a downward force on the portion of the first arm segment 922 on the right side of the pin 928, which biases the first arm segment 922 to rotate clockwise until the first arm segment 922 hits the first position bracket 930. Similarly, the first arm segment 922 can be rotated counterclockwise from the position shown in FIG. 11C until the first arm segment 922 is on the other side of vertical. At that point, the biasing mechanism 934 would exerts a downward force on the portion of the first arm segment 922 on the left side of the pin 928, which would bias the first arm segment 922 to rotate counterclockwise until the first arm segment 922 hits the second position bracket 932. In the depicted embodiment, the biasing mechanism 934 is a compression gas spring. In other embodiments, the biasing mechanism 934 could be any other type of spring or any other type of biasing mechanism 934.

The ability of the first arm segment 922 to rotate between the first and second position brackets 930 and 932 permits the user interface device 910 to be repositioned between at least two distinct positions. For example, the rotation of the first arm segment 922 can permit the user interface device 910 to be repositioned at positions on the left and right sides of the foam-in-bag system 100, as shown in FIGS. 11A and 11B. In some embodiments, a user is able to reposition the user interface device 910 between the positions by hand without the use of tools. In addition to being able to reposition the user interface device 910 on the left and right sides of the foam-in-bag system 100, the embodiment of the arm 920 also permits vertical adjustment of the user interface device 910 in both positions on the left and right sides of the foam-in-bag system 100. The vertical adjustment of the user interface device 910 when the user interface device 910 is positioned on the right side of the foam-in-bag system 100 is depicted in FIGS. 11D and 11E.

In the depicted embodiment, the arm 920 is configured to permit vertical adjustment of the user interface device 910 by adjustment of the second arm segment 924. In particular, the second arm segment 924 is rotatably coupled to the first arm segment 922. In the depicted embodiment, when the first arm segment 922 is engaged to one of the first and second position brackets 930 and 932, the second arm segment 924 is capable about an axis that is substantially parallel to the ground and substantially parallel to the front of the foam-in-bag system 100. The second arm segment 924 is also rotatably coupled to the user interface device 910. In the depicted embodiment, the second arm segment 924 includes two separate bars, each of which is rotatably coupled to the first arm segment 922 and rotatably coupled to the user interface device 910. The two-bar embodiment of the second arm segment 924 ensures that rotation of the second arm segment 924 about the first arm segment 922 will cause a corresponding rotation of the second arm segment 924 about the user interface device 910 such that the front of the user interface device 910 stays substantially vertical. In the depicted embodiment, the arm 920 includes a latching bracket 938 configured to selectively hold the two bars of the second arm segment 924. The latching bracket 938 may be configured to hold the two bars of the second arm segment 924 with respect to each other unless a user activates a disengagement mechanism (e.g., the user squeezes a disengagement lever). In this way, the user can activate the disengagement mechanism on the latching bracket 938 to permit vertical adjustment of the user interface device 910 and then the user can release the disengagement mechanism to hold the vertical position of the user interface device 910. In the depicted embodiment, the arm 920 is capable of vertically positioning the user interface device 910 between a lower vertical position shown in FIG. 11D and an upper vertical position shown in FIG. 11E.

In some embodiments, the second arm segment 924 is rotatably coupled to the user interface device 910 about two axes. In addition to the rotation of the second arm segment 924 with respect to the user interface device 910 that permits the vertical repositioning of the user interface device 910 shown in FIGS. 11D and 11E, the second arm segment 924 may also permit rotation of the user interface device 910 about a vertical axis. This permits a user to rotate the user interface device 910 so that the front of the user interface device 910 is angled either more toward the center of the foam-in-bag system 100 or away from the center of the foam-in-bag system 100.

Figure 12A:
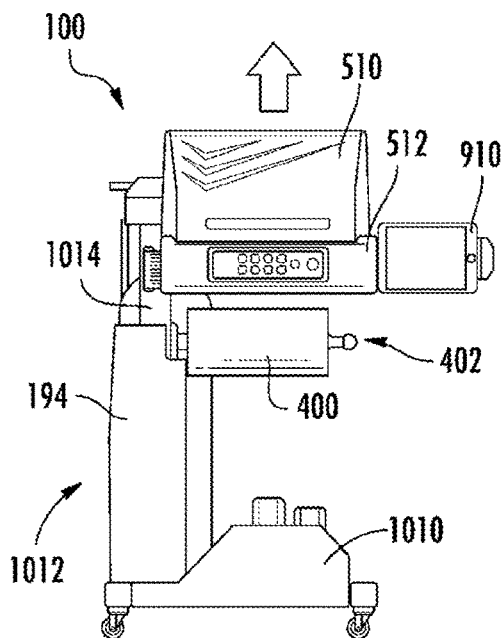
FIGS. 12A and 12B depict views of a foam-in-bag system in lowered and raised positions, respectively, in accordance with the embodiments described herein.
Figure 12B:
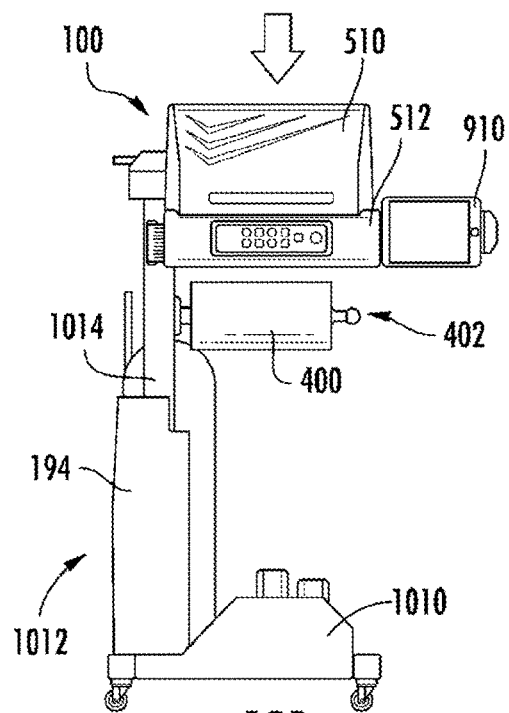

Depicted in FIGS. 12A and 12B are views of the foam-in-bag system 100 in lowered and raised positions, respectively. In the embodiment shown in FIGS. 10A and 10B, the housing 194 of the foam-in-bag system 100 includes a base 1010 and a stem 1012. The base 1010 is configured to be placed on a surface, such as a floor. The stem 1012 is configured to support portions of the foam-in-bag system 100 that are located above the base 1010. In the depicted embodiment, the stem 1012 is located on the left side of the foam-in-bag system 100. This location of the stem 1012 may accommodate a packaging line or other equipment to pass beneath the portions of the foam-in-bag system 100 that are supported by the stem 1012.

The stem 1012 includes a movable support 1014. In the depicted embodiment, the movable support 1014 is configured to be moved vertically up and down. Portions of the foam-in-bag system 100 are coupled to the movable support 1014 so that they move vertically up and down with the movable support 1014. In the depicted embodiment, the spindle system 402 is coupled to the movable support 1014 so that the spindle system 402 moves vertically with the movable support 1014. When the roll 400 is on the spindle system 402, the roll 400 also moves vertically with the movable support 1014. The front upper and lower covers 510 and 512 are also coupled to the movable support 1014 so that the front upper and lower covers 510 and 512 move vertically with the movable support 1014. The components of the foam-in-bag system 100 behind of the front upper and lower covers 510 and 512—including those that feed and film from the roll 400, form bags from the film, and dispense chemical precursors into the bags—also move vertically with the movable support 1014. The user interface device 910 is also coupled to the movable support 1014. In some embodiments, the arm 920 is coupled to a portion of the housing 194 that moved vertically with the movable support 1014 so that the user interface device 910 also moves vertically with the movable support 1014. While the components of the foam-in-bag system 100 mentioned here are coupled to the movable support 1014 in the depicted embodiment, it will be understood that other components of the foam-in-bag system 100 may also be coupled to the movable support 1014 and, in other embodiments, not all of the components mentioned here will be coupled to the movable support 1014.

The movable support 1014 is capable of being moved vertically between the lowered position shown in FIG. 12A and the raised position shown in FIG. 12B. In some embodiments, the vertical position of the movable support 1014 can be controlled so that the movable support can be located at the lowered position, at the raised position, or at any position therebetween. The vertical position of the movable support 1014 can be selected based on operating conditions around the foam-in-bag system 100 (e.g., a desired vertical location of the formed bags to be discharged, an accommodation for equipment around the foam-in-bag system 100), based on servicing needs (e.g., a desired vertical location of the spindle system 402 to replace the roll 400), or based on any other desired vertical location.

Existing foam-in-bag systems are capable of moving portions of the systems vertically. In some examples, these existing foam-in-bag systems include a motor that provides the force to lift all of the vertically-movable components. However, the sum of the weight of the vertically-movable components may be greater than 100 pounds. In these existing systems, the motors needed to provide significant force to move the vertically-movable components. Motors with these capabilities can be difficult to control when it comes to fine adjustments of vertical positions. In addition, the amount of force applied by the motor could cause serious damage or injury to users of the foam-in-bag systems.

Figure 12C:
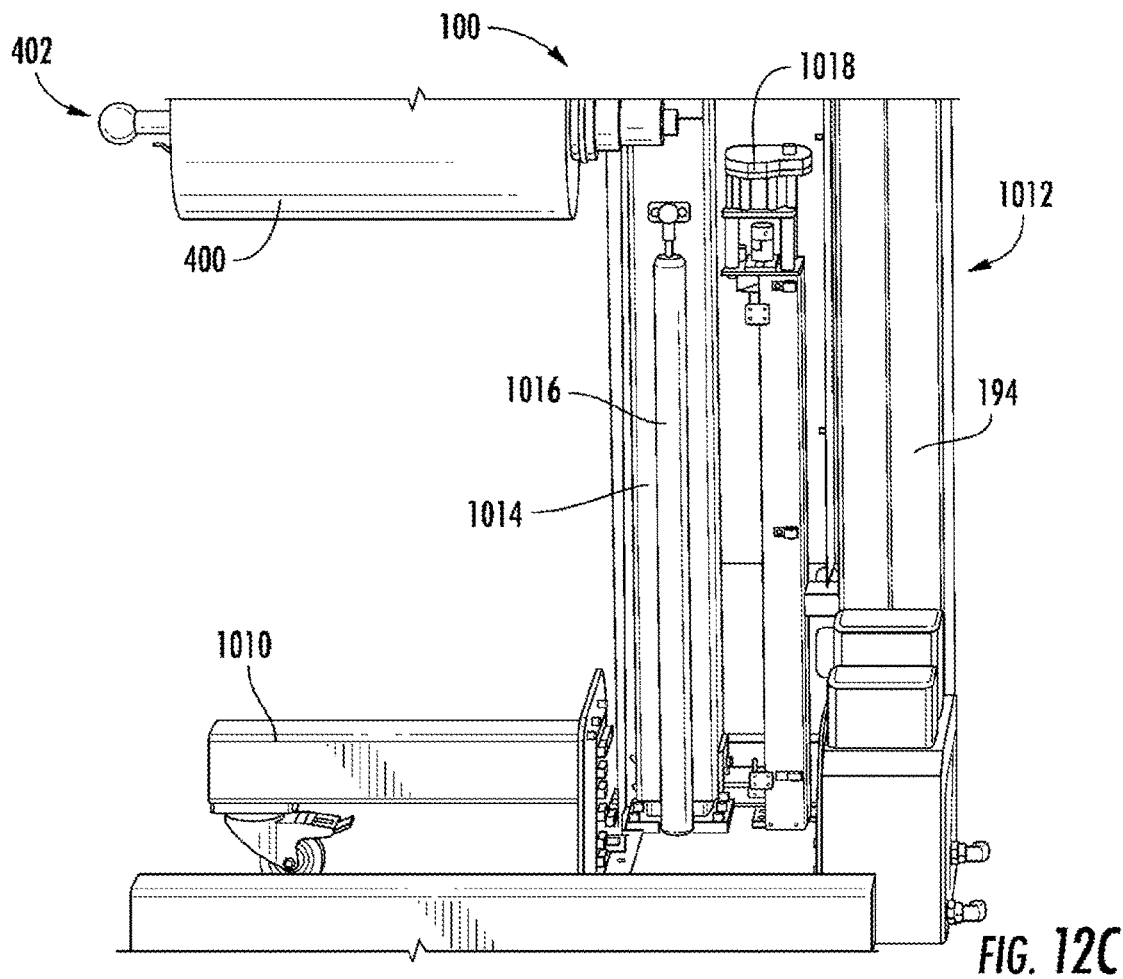
FIG. 12C depicts an embodiment of the foam-in-bag system shown in FIGS. 12A and 12B having a vertical counterbalance in the stem, in accordance with the embodiments described herein.

Depicted in FIG. 12C is an embodiment of the foam-in-bag system 100 that includes a vertical counterbalance 1016 in the stem 1012. The vertical counterbalance 1016 is configured to exert a force between the base 1010 and the movable support 1014. The force exerted by the vertical counterbalance 1016 offsets the weight of the movable support 1014 and the components that are supported by the movable support 1014. In the depicted embodiment, the vertical counterbalance 1016 is a gas spring. In other embodiments, the vertical counterbalance 1016 may be a compression spring or any other device that is capable of applying an upward force to the movable support 1014.

In some embodiments, at least one characteristic of the vertical counterbalance 1016 is selected based on an expected weight of the movable support 1014 and the components that are supported by the movable support 1014. For example, the amount of force applied by the vertical counterbalance 1016 may be selected based on an expected weight of the movable support 1014. It should be noted that the weight of the components that are supported by the movable support 1014 will not be constant during operation. In one example, the weight when the roll 400 is full will be significantly different than the weight of the when the roll 400 is empty, and that weight will vary over time as the roll 400 is emptied. In another example, the weight of the roll 400 when the film is wide will be significantly different than the weight of the roll 400 when the film is narrow. Because the weight of the components supported by the movable support 1014 is variable, the amount of force applied by the vertical counterbalance 1016 may not compensate for the exact weight of the movable support 1014 and the components supported by the movable support 1014. Despite this variability, the amount of force applied by the vertical counterbalance 1016 may still be selected based on an expected weight of the movable support 1014 and the components supported by the movable support 1014. For example, the amount of force applied by the vertical counterbalance 1016 may still be based on one or more of a minimum expected weight of the movable support 1014 and the components supported by the movable support 1014, an average expected weight of the movable support 1014 and the components supported by the movable support 1014, a maximum expected weight of the movable support 1014 and the components supported by the movable support 1014, or any other value based on the expected weight of the movable support 1014 and the components supported by the movable support 1014.

The foam-in-bag system 100 in FIG. 12C also includes a motor 1018 configured to impart a force on the movable support 1014 to move the movable support 1014 vertically up and down. Because of the force imparted by the vertical counterbalance 1016 offsets the force of the weight of the movable support 1014 and the components supported by the movable support 1014, the motor 1018 does not need to provide as much force as would be required without the vertical counterbalance 1016. Because of the lower power requirements of the motor 1018, the motor 1018 may be less expensive and have lower power demands that would be required without the vertical counterbalance 1016. In addition, running the motor 1018 at lower power increases safety for a user using the foam-in-bag system 100. For example, if the user's hand is in the way of the movable support 1014 as the movable support 1014 is being raised by the motor 1018, the motor 1018 running at lower power and supplying lower force will have less of a chance of harming the user's hand than if the motor 1018 was running at higher power and supplying higher force. The use of the vertical counterbalance 1016 may also allow for the movable support 1014 to be moved more quickly while remaining safe for user operation. For example, when a vertical counterbalance is not used, a motor may only be able to raise and lower a movable stand at a rate of 0.5 inches per second or less while supplying a torque that is within an acceptable safety range. In contrast, when the vertical counterbalance 1016 is used, the motor 1018 may be able to raise and lower the movable support 1014 at a rate of up to 5 inches per second while supplying a torque that is within an acceptable safety range.

In some embodiments, the motor 1018 may be able to operate in a low-torque mode and in a high-torque mode. In the low-torque mode, the motor 1018 may be operative to move the movable support 1014 vertically with the assistance of the vertical counterbalance 1016. The amount of torque that the motor 1018 is able to produce in low-torque mode may be within a range that is an acceptable safety range for normal operation. However, the amount of torque produced by the motor 1018 in low-torque mode may not be sufficient to move the movable support 1014 vertically without the assistance of the vertical counterbalance 1016. In the high-torque mode, the motor 1018 may be able to move the movable support 1014 vertically either with or without the assistance of the vertical counterbalance 1016. The amount of torque that the motor 1018 is able to produce in high-torque mode may exceed an acceptable safety range for normal operation, but may be acceptable for specialized operation (e.g., during servicing of the foam-in-bag system). In some embodiments, the motor 1018 can be switched between the low-torque and high-torque modes by a physical switch associated with the motor 1018. The physical switch can be covered in normal operation by housing 194, but also be accessible by removing a portion of the housing 194 (e.g., a panel). In this way, the motor 1018 can be set to low-torque mode for normal operation so that the torque produced by the motor 1018 is within an acceptable safety range during normal operation, but the physical switch can also be accessed when needed to switch to change to high-torque mode by a specialized user (e.g., a service technician). This dual-mode ability of the motor 1018 can be useful in certain situations, such as if the vertical counterbalance 1016 fails and needs to be replaced. In the event of the vertical counterbalance 1016 failing, the motor 1018 can be switched to high-torque mode by a service technician so that movable support 1014 can be moved vertically while the service technician replaces the vertical counterbalance 1016 and then returned to low-torque mode for normal operation after the vertical counterbalance 1016 has been replaced.

One difficulty with existing foam-in-bag systems that are capable of vertical movement is the way in which their vertical movement is activated. Some existing foam-in-bag systems have easily-activated mechanisms, such as switches or buttons on the exterior of their housings. However, easily-activated mechanisms can be problematic because they can be inadvertently activated to move portions of the foam-in-bag systems. At best, inadvertent movements of a foam-in-bag system can be an annoyance or hinderance to those using the systems; at worse, inadvertent movements of a foam-in-bag system can result in damage or injury to an operator, to the foam-in-bag systems themselves, or to other equipment near the foam-in-bag systems. Other existing foam-in-bag systems include software functionality in a user interface device that allows a user to provide inputs to raise or lower the portions of the foam-in-bag systems. Where the controls are included in software functionality, the user interface does not always make the controls readily available to the user, sometimes requiring the user to navigate through multiple screens or menus to be able to control the vertical positioning of the foam-in-bag systems.

Figure 12D:
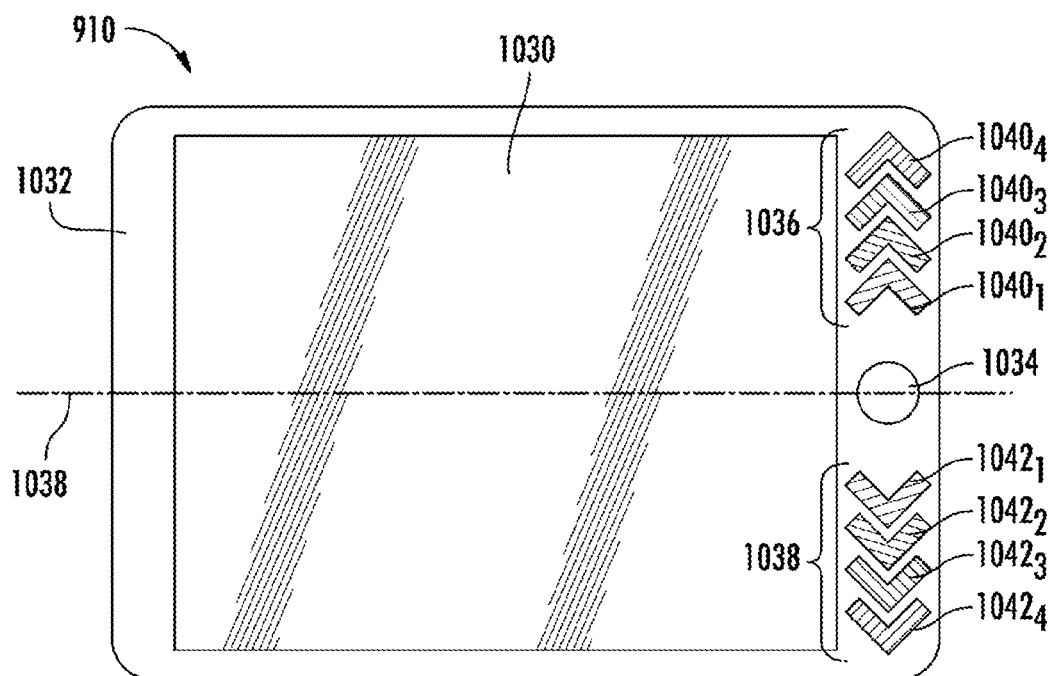
FIGS. 12D and 12E depict front and back views, respectively, of an embodiment of a user interface device with controls to raise and lower a movable support in the stem of the foam-in-bag system shown in FIG. 12C, in accordance with the embodiments described herein.
Figure 12E:
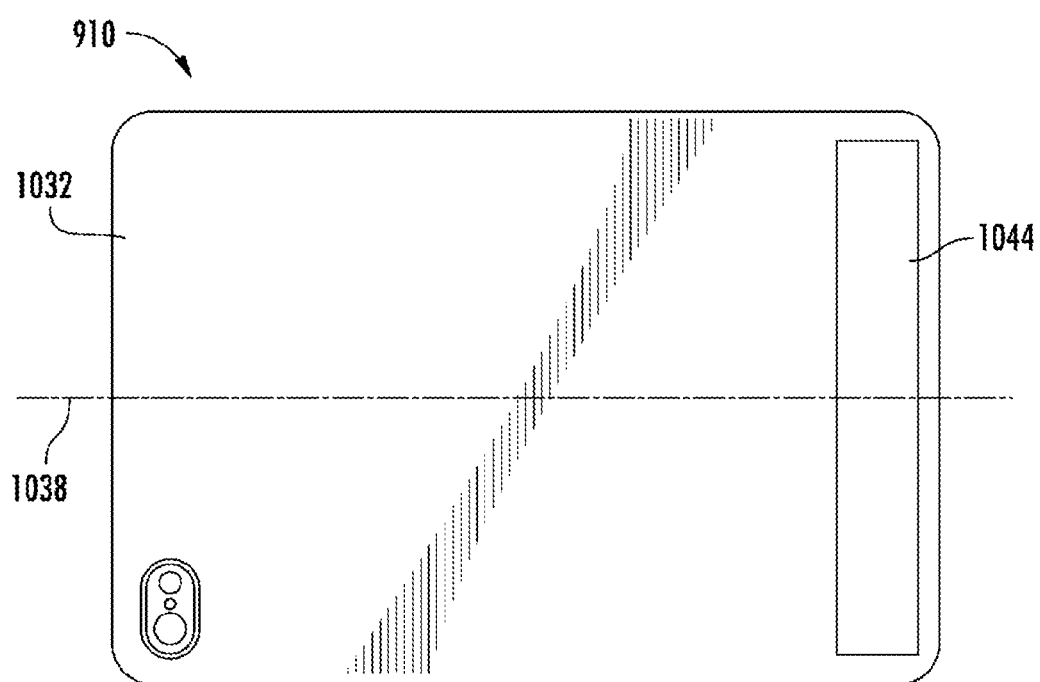

Depicted in FIGS. 12D and 12E are front and back views, respectively, of an embodiment of the user interface device 910 with controls to raise and lower the movable support 1014. In the depicted embodiment, the user interface device 910 includes a touchscreen display 1030 configured to display information to a user and to receive inputs from a user. The user interface device 910 includes a housing 1032 that is located around the touchscreen display 1030 on the front of the user interface device 910, as shown in FIG. 12D, and located over most of the back of the user interface device 910, as shown in FIG. 12E. In the depicted embodiment, the user interface device 910 includes a button 1034 on the front of the housing 1032. The button 1034 may be a hard button (e.g., a mechanical button), or a soft button (e.g., a touch-sensitive area of the housing 1032), or any other type of button. The user may provide inputs to the user interface device 910 by pressing the button 1034.

As shown in FIG. 12D, the depicted embodiment of the user interface device 910 include a first vertical input device 1036 and a second vertical input device 1038. The first and second vertical input devices 1036 and 1038 are configured to receive user inputs to control vertical movements of the movable support 1014. When the user interface device 910 is in the orientation shown in FIG. 12D, any user input into the first vertical input device 1036 can be treated as an input to raise the movable support 1014, and any user input into the second vertical input device 1038 can be treated as an input to lower the movable support 1014. If the user interface device 910 is reoriented (e.g., the user interface device 910 is located on an arm (e.g., the arm 920) that can be rotated 180°, the user interface device 910 may be oriented such that the second vertical input device 1038 is positioned above the button 1034 and the first vertical input device 1036 is positioned below the button 1034. In this orientation, any user input into the second vertical input device 1038 can be treated as an input to raise the movable support 1014, and any user input into the first vertical input device 1036 can be treated as an input to lower the movable support 1014.

Returning to the orientation shown in FIG. 12D, each of the first and second vertical input devices 1036 and 1038 includes directional indicators. More specifically, the first vertical input device 1036 includes a number of directional indicators 10401, 10402, 10403, and 10404 (collectively, directional indicators 1040) and the second vertical input device 1038 includes a number of directional indicators 10421, 10422, 10423, and 10424 (collectively, directional indicators 1042). In the depicted embodiment, the directional indicators 1040 and 1042 are graphics printed or adhered onto a touch-sensitive portion of the housing 1032. In other embodiments, each of the directional indicators 1040 and 1042 is a separate hard button or other user input device. In the depicted embodiment, the first vertical input device 1036 includes four distinct directional indicators 1040 and the second vertical input device 1038 includes four distinct directional indicators 1042. In other embodiments, the first vertical input device 1036 may include any other number of distinct directional indicators 1040 and the second vertical input device 1038 may include any other number of distinct directional indicators 1042. In other embodiments, each of the first vertical input device 1036 and the second vertical input device 1038 includes a single directional indicator that has a gradient (e.g., a color gradient) indicating a direction.

When the user interface device 910 is in the orientation shown in FIG. 12D, a user can press the first vertical input device 1036 to activate the motor 1018 to cause the movable support 1014 to move upward. Similarly, a user can press the second vertical input device 1038 to activate the motor 1018 to cause the movable support 1014 to move downward. In some embodiments, the farther away from a horizontal center 1038 of the user interface device 910 that a user presses on one of the first and second vertical input devices 1036 and 1038, the faster the motor 1018 to cause the movable support 1014 to move upward or downward. In one example, pressing on the first vertical input device 1036 at the directional indicator 10401 causes the motor 1018 to move the movable support 1014 upward at a low speed and pressing on the first vertical input device 1036 at the directional indicator 10404 causes the motor 1018 to move the movable support 1014 upward at a high speed. Pressing on the first vertical input device 1036 at the directional indicator 10402 causes the motor 1018 to move the movable support 1014 upward at a higher speed than when the directional indicator 10401 is pressed. Pressing on the first vertical input device 1036 at the directional indicator 10403 causes the motor 1018 to move the movable support 1014 upward at higher speed than when the directional indicator 10402 is pressed and at a slower speed than when the directional indicator 10404 is pressed. In another example, pressing on the second vertical input device 1038 at the directional indicator 10421 causes the motor 1018 to move the movable support 1014 downward at a low speed and pressing on the second vertical input device 1038 at the directional indicator 10424 causes the motor 1018 to move the movable support 1014 downward at a high speed. Pressing on the second vertical input device 1038 at the directional indicator 10422 causes the motor 1018 to move the movable support 1014 downward at a higher speed than when the directional indicator 10421 is pressed. Pressing on the second vertical input device 1038 at the directional indicator 10403 causes the motor 1018 to move the movable support 1014 downward at higher speed than when the directional indicator 10422 is pressed and at a slower speed than when the directional indicator 10424 is pressed.

As noted above, having an easily-activated mechanism to move the movable support 1014 may be problematic if the mechanism is able to be inadvertently activated. In the embodiment shown in FIG. 12D, a user may be able to inadvertently touch the first and second vertical input devices 1036 and 1038, particularly when touching the touchscreen display 1030 or adjusting a position of the user interface device 910 with respect to the foam-in-bag system 100. The embodiment of the user interface device 910 shown in FIGS. 12D and 12E can reduce inadvertent inputs into the first and second vertical input devices 1036 and 1038 using a touch-sensitive area 1044 on the back of the user interface device 910. In some embodiments, an input into one of the first and second vertical input devices 1036 and 1038 does not result in movement of the movable support 1014 unless the touch-sensitive area 1044 also registers a corresponding touch on the back of the user interface device 910. An example of this is shown in FIG. 12F, where a user's hand 1050 is grasping or pinching the right side of the user interface device 910 with the user's thumb 1052 touching the second vertical input device 1038 on the front of the user interface device 910 and the user's finger 1054 touching the touch-sensitive area 1044 on the back of the user interface device 910. By requiring both an input into one of the first and second vertical input devices 1036 and 1038 and a touch of the touch-sensitive area 1044 to move the movable support 1014, the user will not be able to inadvertently activate motion of the movable support 1014 merely by touching one of the first and second vertical input devices 1036 and 1038.

In the embodiment depicted in FIG. 12E, the touch-sensitive area 1044 is a single touch-sensitive strip adhered to the back of the user interface device 910. In other embodiments, the touch-sensitive area 1044 may include multiple distinct touch-sensitive areas. In other embodiments, the touch-sensitive area 1044 is an integrated part of the housing 1032 (e.g., a part molded into the plastic that forms the housing 1032). In other embodiments, the touch-sensitive area 1044 is a portion of the housing 1032 where one or more pressure sensors inside of the user interface device 910 are capable of detecting pressure applied to that portion of the housing 1032. In some embodiments, the touch-sensitive area 1044 is positioned to be substantially aligned with the first and second vertical input devices 1036 and 1038 (e.g., the touch-sensitive area 1044 is approximately behind the first and second vertical input devices 1036 and 1038). In some embodiments, the touch-sensitive area 1044 is configured to register a touch from any contact. For example, in the embodiment where the touch-sensitive area 1044 is a capacitive touch surface, any touch of an electrical counductor (e.g., the user's thumb 1052 or the user's finger 1054) may be register as a touch. In other embodiments, the touch-sensitive area 1044 is configured to register a touch when at least a predetermined force is applied to the touch-sensitive area 1044. For example, where the touch-sensitive area 1044 is a portion of the housing 1032 and one or more pressure sensors inside of the user interface device 910 are capable of detecting pressure applied to that portion of the housing 1032, a predetermined amount of pressure may need to be applied to the touch-sensitive area 1044 in order to register a touch of the touch-sensitive area 1044. In this last example, the predetermined amount of pressure may be a minimum expected amount of pressure when a user grasps or pinches the side of the user interface device 910 with the first and second vertical input devices 1036 and 1038.

In some embodiments, detected aspects of a user's behavior may be used to control the movement of the movable support 1014. In some embodiments, the user interface device 910 includes an accelerometer and behavior detected by the accelerometer may be used to control the movement of the movable support 1014. For example, when a user is grasping or pinching the first vertical input device 1036 and the touch-sensitive area 1044, the movable support 1014 may be moved upward. As the movable support 1014 may be moved upward, the user may instinctively pull up on the user interface device 910 when an increase in speed is desired or pull down on the user interface device 910 when a decrease in speed is desired. The accelerometer in the user interface device 910 may detect a pull up or a pull down and adjust the speed of the movement of the movable support 1014 accordingly. In some embodiments, the amount of pressure applied by the user to grasp or pinch the user interface device 910 may be used to control the movement of the movable support 1014. In one example, when the user pinches the first vertical input device 1036 and the touch-sensitive area 1044, the movable support 1014 may be moved at a particular speed when the amount for force from the user's pinch is below a predetermined amount of pressure and the movable support 1014 may be moved at a higher speed when the amount of force from the user's pinch is above the predetermined amount of pressure. In other embodiments, any combination of registering a grasp or pinch (e.g., detecting an input into one of the first and second vertical input devices 1036 and 1038 and a touch of the touch-sensitive area 1044) and sensor detection of user behavior may be used to control movement of the movable support 1014.

In some embodiments, foam-in-bag systems are configured to clean the tip of dispensers that dispense foaming chemical precursors into bags. The chemical precursors tend to foam at and near the tip of the dispensers. If left on the tip of the dispenser, the chemical precursors will tend to bond to cure and form an epoxy that is bonded to the dispenser. Such bonding of the epoxy can prevent the chemical precursors from being properly dispensed or from being dispensed at all. In order to prevent the chemical precursors from curing at or near the dispenser and/or bonding to the dispenser, the foam-in-bag system dispenses a chemical solvent at the tip. The chemical solvent dissolves the chemical precursors and weakens any bond between the chemical precursors and the tip of the dispensers. When the next "shot" of chemical precursors is dispensed into a bag, the force of the newly-dispensed chemical precursors tends to cause any solvent-weakened chemical precursors on the tip to dislodge and fall into the bag.

For the solvent to be effective, foam-in-bag machines typically dispense solvent to the tip before a shot (sometimes called a "pre-shot" time period), during the shot, and after the shot (sometimes called a "post-shot" time period). Applying solvent to the tip during the pre-shot period decreases the likelihood that the chemical precursors will bond to the tip of the dispenser. Applying solvent to the tip during the post-shot period decreases the likelihood that any chemical precursors remaining on the tip after the shot will cure on the tip of the dispenser. Foam-in-bag machines tend to start the flow of solvent before a shot and end the flow of solvent after the shot so that solvent flows during the pre-shot time period, during the shot, and during the post-shot time period. In some embodiments, the solvent may include tripropylene glycol monomethyl ether, which is available under the name DAWANOL from the Dow Chemical Company.

It would be advantageous to reduce the amount of chemical solvent used to clean a dispenser. In the past, some foam-in-bag systems reduce the amount of solvent used by adding an agitant, such as compressed gas, to the solvent. The addition of the agitant to the solvent can reduce the flow rate of solvent significantly. For example, when the agitant is added to solvent, a solvent flow rate of 1 milliliter per second would be as effective as a solvent flow rate of 6 milliliters per second without the agitant. The reduced flow rate of the solvent due to the addition of the agitant reduces cost and waste of the solvent. However, it also increases complexity of the foam-in-bag system because of need of the foam-in-bag system to have an agitation component that adds the agitant to the solvent.

Figure 13A:
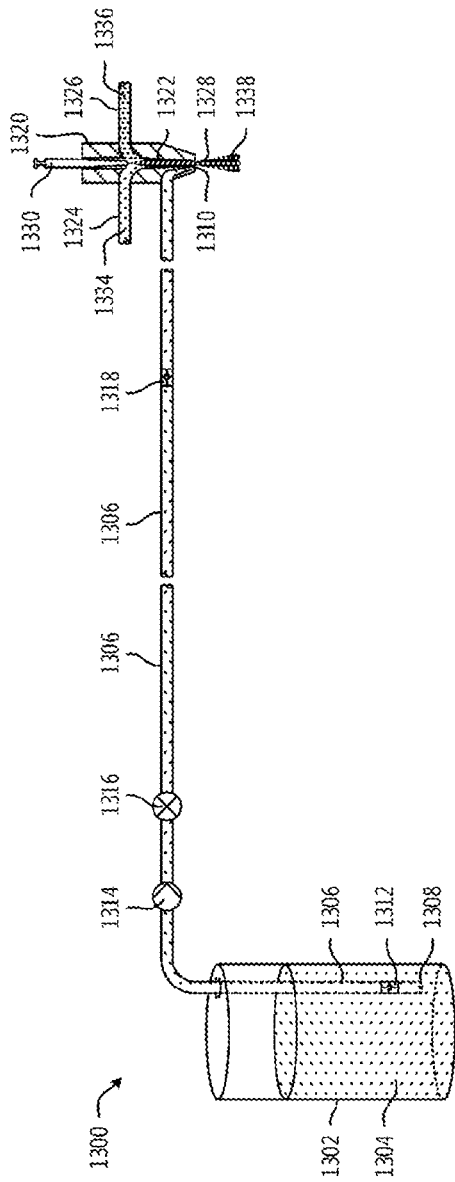
FIG. 13A depicts an embodiment of a system that dispenses solvent in a controlled manner to limit the amount of solvent used.

Depicted in FIG. 13A is an embodiment of a system 1300 that dispenses solvent in a controlled manner to limit the amount of solvent used. The system 1300 includes a source 1302 of a solvent 1304. In some examples, the source 1302 includes a drum, a barrel, a tank, a vat, a bottle, or another container that is capable of holding the solvent 1304. In the depicted embodiment, the source 1302 is in the form of a drum. The system 1300 further includes a feed line 1306 that is configured to transport the solvent 1304 from a first end 1308 to a second end 1310 of the feed line 1306. In the depicted embodiment, the first end 1308 of the feed line 1306 is located inside the solvent 1304 in the source 1302. The feed line 1306 is configured to convey solvent 1304 from the source 1302 via the first end 1308 and to feed the solvent to the second end 1310.

The system 1300 includes an inlet check value 1312 located near the first end 1308. The inlet check value 1312 is configured to prevent bleeding of the solvent from the feed line 1306 back in to the source 1304 and to prevent loss of prime and/or introduction of air into the feed line 1306. The system 1300 includes a pump 1314 on the feed line 1306 downstream of the inlet check valve 1312. The pump 1314 is configured to draw the solvent through the feed line 1306 from the first end 1308 to the second end 1310. In some embodiments, the pump 1314 includes one or more of a diaphragm pump, a peristaltic pump, a rotary pump, an impeller pump, or any other type of pump. In some embodiments, as is discussed below, the pump 1314 can be controlled to control a flow rate of the solvent 1304.

The system further includes a pressure transducer 1316 configured to measure pressure in the feed line 1306. In the depicted embodiment, the pressure transducer 1316 is located downstream of the pump 1316, where the pressure transducer 1316 is configured to detect pressure in the feed line 1306 between the pump 1314 and the second end 1310. In some instances, an increased pressure detected by the pressure transducer 1316 indicates a clog or partial clog of the second end 1310 of the feed line 1306. The system 1300 further includes an outlet check valve 1318 located near the second end 1310 of the feed line 1306. The outlet check valve 1318 is configured to deter unintended draining of the solvent 1304 from the feed line 1306 out of the second end 1310.

In the depicted embodiment, the second end 1310 of the feed line 1306 is located in a dispenser 1320 configured to dispense foaming chemical precursors. The dispenser 1320 includes a mixing chamber 1322 that is in fluid communication with each of a first precursor feed line 1324 and a second precursor feed line 1326. Below the mixing chamber 1322, the dispenser 1320 has a tip 1328 for dispensing mixed foaming chemical precursors. The dispenser 1320 also has a valving rod 1330. When the valving rod 1330 is in the open orientation shown in FIG. 13A, the valving rod 1320 is retracted from the mixing chamber 1322, a first chemical precursor 1334 is permitted to flow from the first precursor feed line 1324 into the mixing chamber 1322, and a second chemical precursor 1336 is permitted to flow from the second precursor feed line 1326 into the mixing chamber 1332. The first and second chemical precursors 1334 and 1336 form a mixture 1338 that is dispensed from the tip 1328 as it is begins to react to form foam. The valving rod 1330 can be moved from the depicted open orientation to a closed orientation where the valving rod 1330 fills the mixing chamber to prevent flow of the first precursor feed line 1324 and the second precursor feed line 1326 into the mixing chamber 1322. In some embodiments, when the valving rod 1330 is in the closed orientation, the end of the valving rod 1330 extends beyond the tip 1328 to prevent the curing of the first and second chemical precursors 1334 and 1336 over the tip 1328.

In the depicted embodiment, the second end 1310 of the feed line 1306 is located in the dispenser 1320 in proximity to the tip 1328. When the pump 1314 operates, the solvent 1304 flows through the feed line 1306 and the solvent 1304 flows out of the second end 1310 near the tip 1328. The system 1300 may be configured to dispense the solvent 1304 during a pre-shot time period, during a shot, and during a post-shot time period. To accomplish this dispensing of the solvent 1304 in the depicted embodiment, the pump 1314 begins to operate before the valving rod 1330 is retracted from the closed orientation, the pump 1314 continues operating while the valving rod 1330 is not in the closed orientation, and the pump 1314 continues operating after the valving rod 1330 is returned to the closed orientation.

In some embodiments, the amount of solvent used by the system 1300 can be reduced by controlling the pump 1314 to vary the flow rate of the solvent 1304 during the pre-shot, shot, and post-shot time periods. For example, more of the solvent 1304 may be needed to clear residue of chemical precursors during the post-shot time period than is needed during the shot and/or during the pre-shot time period. In this example, the flow rate of the solvent 1304 can be lower during the pre-shot time period and/or the shot than during the post-shot time period. Depicted in FIG. 13B is a chart showing an example of flow rates of the solvent 1304 caused by controlling the pump 1314 over the course of a shot of the first and second chemical precursors.

Figure 13B:
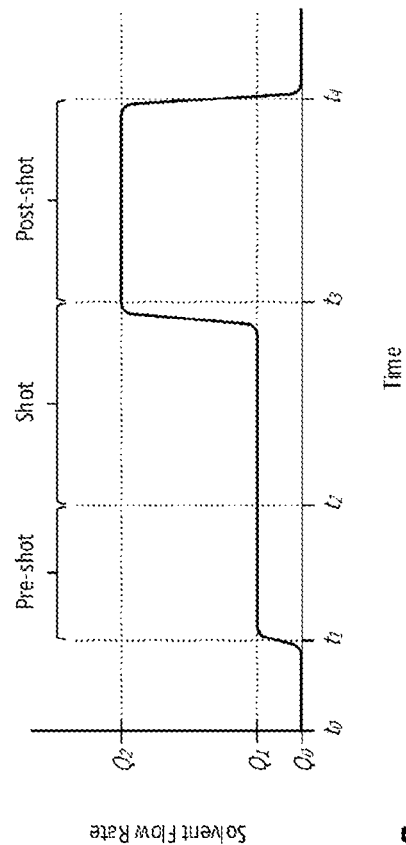
FIG. 13B depicts a chart showing an example of flow rates of the solvent caused by controlling the pump shown in FIG. 13A over the course of a shot of the first and second chemical precursors.

In the chart in FIG. 13B, at time $t_0$, the pump 1314 is inactive and the flow rate of the solvent 1304 is $Q_0$ (e.g., no flow of the solvent 1304). A pre-shot time period is depicted between time $t_1$ and time $t_2$. In some embodiments, the time $t_1$ is a time determined as a specific amount of time before the expected start of a shot at the time $t_2$. Near the time $t_1$, the flow rate of the solvent 1304 is increased to a flow rate $Q_1$ by controlling the pump 1314 to operate such that the flow rate of the solvent 1304 reaches the flow rate $Q_1$. In some embodiments, the flow rate $Q_1$ is in a range between about 0.05 milliliters per second to about 0.2 milliliters per second. In the depicted embodiment, the solvent 1304 continues to flow at the flow rate $Q_1$ for the remainder of the pre-shot time period.

In the depicted embodiment, the shot begins at the time $t_2$ and continues until a time $t_3$. In some embodiments, the time period of the shot may be any time that the dispenser permits foaming chemical precursors to be dispensed. In the example of the system 1300, the time period of the shot may be any time that the valving rod 1330 does not fully close off the mixing chamber 1322. In the depicted embodiment, the solvent 1304 continues to flow at the flow rate $Q_1$ for a majority of the shot. The portion of the solvent 1304 dispensed during the shot encourages the foaming chemical precursors to be dispensed from the dispenser 1320 without foaming up inside the dispenser 1320 and/or clogging the dispenser 1320.

In the depicted embodiment, the flow rate of the solvent 1304 is increased to a flow rate $Q_2$ before the time $t_3$ so that the flow rate is at or near the flow rate $Q_2$ by the time the shot ends at the time $t_3$. In some embodiments, the flow rate of the solvent 1304 is increased to the flow rate $Q_2$ by controlling the pump 1314 to operate such that the flow rate of the solvent 1304 reaches the flow rate $Q_2$. In some embodiments, the flow rate $Q_2$ is in a range between about 0.4 milliliters per second to about 0.8 milliliters per second. This increased flow rate of the solvent 1304 during the post-shot time period results in flushing out any residual foam near tip 1328 of the dispenser 1320 before the foam has an opportunity to bond to any surface of the dispenser 1320 and/or prevent any foam residue near the tip 1328 of the dispenser 1320 from hardening and/or crusting over.

In the depicted embodiment, the post-shot time period begins at the time $t_3$ and continues until a time $t_4$. In some embodiments, the time $t_4$ is a time determined as a specific amount of time after the end of the shot at the time $t_3$. In some embodiments, the amount of time of the post-shot time period (i.e., the amount of time between the time $t_3$ and the time $t_4$) is in a range from about 30 milliseconds to about 50 milliseconds. In the depicted embodiment, the solvent 1304 continues to flow at the flow rate $Q_2$ for nearly the remainder of the post-shot time period. At or near end of the post-shot time period, the flow rate of the solvent 1304 returns to the flow rate $Q_0$ (e.g., no flow of the solvent 1304). The flow rate of the solvent 1304 can remain at the flow rate $Q_0$ until a new pre-shot time period begins before a subsequent shot. The entire time period shown in the chart in FIG. 13B can be repeated indefinitely as each shot of the chemical precursors is dispensed into a different bag. In some embodiments, a total amount of the solvent 1304 dispensed during the pre-shot time period, during the dispensing of the shot, and during the post-shot time period is less than or equal to about 2 milliliters.

The chart shown in FIG. 13B is one example of a way in which the flow rate of the solvent 1304 can be controlled over the course of the pre-shot time period, the shot, and the post-shot time period. In this embodiment, the flow rate of the solvent 1304 is controlled so that a maximum flow rate of the solvent 1304 during the pre-shot time period is less than a maximum flow rate of the solvent 1304 during the post-shot time period. It will be understood that, in other embodiments, the solvent 1304 can be controlled in other ways so that the maximum flow rate of the solvent 1304 during the pre-shot time period is less than a maximum flow rate of the solvent 1304 during the post-shot time period. For example, in some embodiments, the flow rate of the solvent 1304 can be increased from the flow rate $Q_1$ to the flow rate $Q_2$ earlier during the shot period; in some embodiments, the flow rate of the solvent 1304 can be increased from the flow rate $Q_1$ to an intermediate flow rate at or near the time $t_2$ and then from the intermediate flow rate to the flow rate $Q_2$ at or near the time $t_3$; and, in other embodiments, the flow rate of the solvent 1304 can be controlled in any number of other ways.

Figure 14:
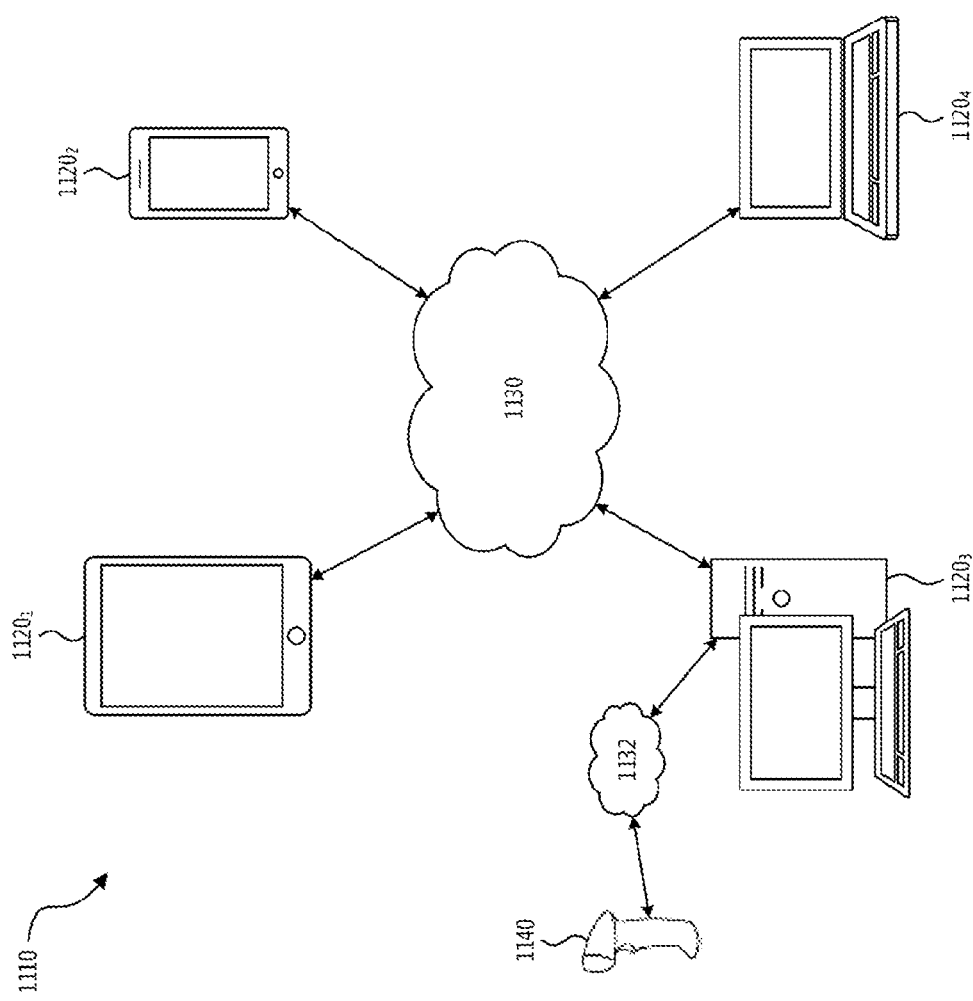
FIG. 14 depicts an example embodiment of a system that may be used to implement some or all of the embodiments described herein.

FIG. 14 depicts an example embodiment of a system 1110 that may be used to implement some or all of the embodiments described herein. In the depicted embodiment, the system 1110 includes computing devices $1120_1$, $1120_2$, $1120_3$, and $1120_4$ (collectively computing devices 1120). In the depicted embodiment, the computing device $1120_1$ is a tablet, the computing device $1120_2$ is a mobile phone, the computing device $1120_3$ is a desktop computer, and the computing device $1120_4$ is a laptop computer. In other embodiments, the computing devices 1120 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 1120 are communicatively coupled to each other via one or more networks 1130 and 1132. Each of the networks 1130 and 1132 may include one or more wired or wireless networks (e.g., a 3G network, the Internet, an internal network, a proprietary network, a secured network). The computing devices 1120 are capable of communicating with each other and/or any other computing devices via one or more wired or wireless networks. While the particular embodiment of the system 1110 in FIG. 14 depicts that the computing devices 1120 communicatively coupled via the network 1130 include four computing devices, any number of computing devices may be communicatively coupled via the network 1130.

In the depicted embodiment, the computing device $1120_3$ is communicatively coupled with a peripheral device 1140 via the network 1132. In the depicted embodiment, the peripheral device 1140 is a scanner, such as a barcode scanner, an optical scanner, a computer vision device, and the like. In some embodiments, the network 1132 is a wired network (e.g., a direct wired connection between the peripheral device 1140 and the computing device 1120₃), a wireless network (e.g., a Bluetooth connection or a WiFi connection), or a combination of wired and wireless networks (e.g., a Bluetooth connection between the peripheral device 1140 and a cradle of the peripheral device 1140 and a wired connection between the peripheral device 1140 and the computing device 1120₃). In some embodiments, the peripheral device 1140 is itself a computing device (sometimes called a "smart" device). In other embodiments, the peripheral device 1140 is not a computing device (sometimes called a "dumb" device).

Figure 15:
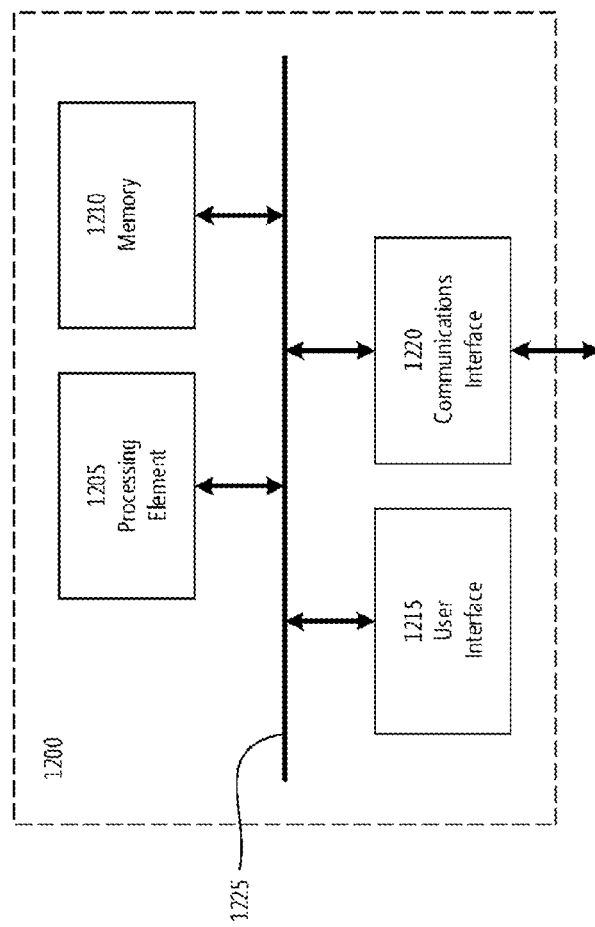
FIG. 15 depicts a block diagram of an embodiment of a computing device, in accordance with the embodiments described herein.

Depicted in FIG. 15 is a block diagram of an embodiment of a computing device 1200. Any of the computing devices 1120 and/or any other computing device described herein may include some or all of the components and features of the computing device 1200. In some embodiments, the computing device 1200 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 1200 includes a processing element 1205, memory 1210, a user interface 1215, and a communications interface 1220. The processing element 1205, memory 1210, a user interface 1215, and a communications interface 1220 are capable of communicating via a communication bus 1225 by reading data from and/or writing data to the communication bus 1225. The computing device 1200 may include other components that are capable of communicating via the communication bus 1225. In other embodiments, the computing device does not include the communication bus 1225 and the components of the computing device 1200 are capable of communicating with each other in some other way.

The processing element 1205 (also referred to as one or more processors, processing circuitry, and/or similar terms used herein) is capable of performing operations on some external data source. For example, the processing element may perform operations on data in the memory 1210, data receives via the user interface 1215, and/or data received via the communications interface 1220. As will be understood, the processing element 1205 may be embodied in a number of different ways. In some embodiments, the processing element 1205 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 1205 is configured for a particular use or configured to execute instructions stored in volatile or nonvolatile media or otherwise accessible to the processing element 1205. As such, whether configured by hardware or computer program products, or by a combination thereof, the processing element 1205 may be capable of performing steps or operations when configured accordingly.

The memory 1210 in the computing device 1200 is configured to store data, computer-executable instructions, and/or any other information. In some embodiments, the memory 1210 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 1210 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 1215 of the computing device 1200 is in communication with one or more input or output devices that are capable of receiving inputs into and/or outputting any outputs from the computing device 1200. Embodiments of input devices include a keyboard, a mouse, a touchscreen display, a touch sensitive pad, a motion input device, movement input device, an audio input, a pointing device input, a joystick input, a keypad input, peripheral device 1140, foot switch, and the like. Embodiments of output devices include an audio output device, a video output, a display device, a motion output device, a movement output device, a printing device, and the like. In some embodiments, the user interface 1215 includes hardware that is configured to communicate with one or more input devices and/or output devices via wired and/or wireless connections.

The communications interface 1220 is capable of communicating with various computing devices and/or networks. In some embodiments, the communications interface 1220 is capable of communicating data, content, and/or any other information, that can be transmitted, received, operated on, processed, displayed, stored, and the like. Communication via the communications interface 1220 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 1220 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 1200 may be located remotely from other components of the computing device 1200 components, such as in a distributed system. Furthermore, one or more of the components may be combined and additional components performing functions described herein may be included in the computing device 1200. Thus, the computing device 1200 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A longitudinal sealer comprising:
a housing configured to be installed in a foam-in-bag system,
an arm movably coupled to the housing; and
a heating element having a leading edge exposed through an exterior surface of the arm;
wherein a position of the arm with respect to the housing is controllable so that the arm is movable between a first location where the leading edge of the heating element is not in contact with a film in a film path of the foam-in-bag system and a second location where the leading edge of the heating element is in contact with the film in the film path of the foam-in-bag system;
wherein, when the housing is installed in the foam-in-bag system, the longitudinal sealer is configured to be communicatively coupled to a controller of the foam-in-bag system;
wherein the controller is configured to control the position of the arm with respect to the housing;
wherein the foam-in-bag system includes an actuator configured to engage the longitudinal sealer to move the arm, and wherein the controller is configured to control the position of the arm with respect to the housing by controlling the actuator; and
wherein the actuator is configured to engage a plunger of the longitudinal sealer and wherein the plunger is configured to contact the arm to cause the arm to rotate in a first rotational direction.

2. The longitudinal sealer of claim 1, further comprising:
a temperature sensor configured to generate one or more signals indicative of one or more temperatures of the heating element.

3. The longitudinal sealer of claim 2, wherein the temperature sensor includes a first resistance temperature detector located on an exterior surface on the heating element.

4. The longitudinal sealer of claim 3, wherein the temperature sensor further includes a second resistance temperature detector embedded within the heating element.

5. The longitudinal sealer of claim 4, wherein the longitudinal sealer is configured to send the one or more signals generated by the temperature sensor to the controller, and wherein the controller is configured to control a temperature of the heating element based on the one or more signals.

6. The longitudinal sealer of claim 5, wherein the controller is configured to control the temperature of the heating element within a range of any one of 1° C., 2° C., or 5° ° C. of a target temperature.

7. The longitudinal sealer of claim 1, wherein the housing further comprises a biasing element configured to bias the arm in a second rotational direction opposite the first rotational direction, whereby the biasing element biases the arm in the second rotational direction unless the plunger exerts a force on the arm so that a torque on the arm by the plunger overcomes a torque on the arm by the biasing element to cause the arm to rotate in the first rotational direction.

8. A longitudinal sealer comprising:
a housing configured to be installed in a foam-in-bag system;
an arm movably coupled to the housing; and
a heating element having a leading edge exposed through an exterior surface of the arm;
wherein a position of the arm with respect to the housing is controllable so that the arm is movable between a first location where the leading edge of the heating element is not in contact with a film in a film path of the foam-in-bag system and a second location where the leading edge of the heating element is in contact with the film in the film path of the foam-in-bag system;
wherein the housing is configured to be installed in and removed from the foam-in-bag system manually without the use of tools.

9. The longitudinal sealer of claim 8, wherein the housing includes a slot configured to be slid into a bracket of the foam-in-bag system.

10. The longitudinal sealer of claim 9, wherein the slot includes a bore, wherein the bracket includes a spring-loaded pin, and wherein the bore is configured to receive a first end of the spring-loaded pin.

11. The longitudinal sealer of claim 10, wherein a second end of the spring-loaded pin includes a handle configured to permit a user to grasp the spring-loaded pin and pull the first end of the spring-loaded pin out of the bore.

12. The longitudinal sealer of claim 8, further comprising:
a temperature sensor configured to generate one or more signals indicative of one or more temperatures of the heating element.

13. The longitudinal sealer of claim 12, wherein the temperature sensor includes a first resistance temperature detector located on an exterior surface on the heating element.

14. The longitudinal sealer of claim 13, wherein the temperature sensor further includes a second resistance temperature detector embedded within the heating element.

15. The longitudinal sealer of claim 14, wherein the longitudinal sealer is configured to send the one or more signals generated by the temperature sensor to a controller, and wherein the controller is configured to control a temperature of the heating element based on the one or more signals.

16. A method comprising:
installing a longitudinal sealer in a foam-in-bag system, wherein the longitudinal sealer includes a housing configured to be installed in the foam-in-bag system, an arm movably coupled to the housing, and a heating element having a leading edge exposed through an exterior surface of the arm;
controlling a position of the arm with respect to the housing so that the arm is movable between a first location where the leading edge of the heating element is not in contact with a film in a film path of the foam-in-bag system and a second location where the leading edge of the heating element is in contact with the film in the film path of the foam-in-bag system;
wherein the housing is configured to be installed in and removed from the foam-in-bag system manually without the use of tools.

17. The method of claim 16, further comprising:
generating, by a temperature sensor of the longitudinal sealer, one or more signals indicative of one or more temperatures of the heating element.

18. The method of claim 17, wherein the temperature sensor includes a first resistance temperature detector located on an exterior surface on the heating element.

19. The method of claim 18, wherein the temperature sensor further includes a second resistance temperature detector embedded within the heating element.

20. The method of claim 19, further comprising:
communicatively coupling the longitudinal sealer to a controller of the foam-in-bag system;
sending, by the longitudinal sealer, the one or more signals generated by the temperature sensor to the controller; and
controlling, by the controller, a temperature of the heating element based on the one or more signals.

* * * * *